US010574127B2

(12) United States Patent
Takizawa et al.

(10) Patent No.: US 10,574,127 B2
(45) Date of Patent: Feb. 25, 2020

(54) ACTUATOR AND COIL UNIT

(71) Applicant: PANASONIC INTELLECTUAL PROPERTY MANAGEMENT CO., LTD., Osaka (JP)

(72) Inventors: Teruyuki Takizawa, Osaka (JP); Hironori Tomita, Nara (JP); Tsutomu Shimomura, Osaka (JP); Masakazu Kobayashi, Osaka (JP); Yasuaki Kameyama, Osaka (JP); Hirohide Ichihashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/088,426

(22) PCT Filed: Mar. 21, 2017

(86) PCT No.: PCT/JP2017/011228
§ 371 (c)(1),
(2) Date: Sep. 25, 2018

(87) PCT Pub. No.: WO2017/169979
PCT Pub. Date: Oct. 5, 2017

(65) Prior Publication Data
US 2019/0379266 A1 Dec. 12, 2019

(30) Foreign Application Priority Data

Mar. 30, 2016 (JP) .................. 2016-068632
Mar. 30, 2016 (JP) .................. 2016-068633
Mar. 30, 2016 (JP) .................. 2016-068634

(51) Int. Cl.
*G03B 17/00* (2006.01)
*H02K 41/035* (2006.01)
(Continued)

(52) U.S. Cl.
CPC ....... *H02K 41/0354* (2013.01); *G03B 17/561* (2013.01); *H02K 3/46* (2013.01);
(Continued)

(58) Field of Classification Search
USPC ......................................... 396/428
See application file for complete search history.

(56) References Cited

U.S. PATENT DOCUMENTS 5,986,377 A * 11/1999 Yamada ................. H02K 1/148
310/216.013
7,185,418 B2 * 3/2007 Miyake .................... H02K 1/14
29/596
(Continued)

FOREIGN PATENT DOCUMENTS

JP 2007-097267 A 4/2007
JP 2008-125289 A 5/2008
(Continued)

OTHER PUBLICATIONS

International Search Report and Written Opinion issued in International Patent Application No. PCT/JP2017/011228, dated Jun. 20, 2017; with partial English translation.

*Primary Examiner* — Rodney E Fuller
(74) *Attorney, Agent, or Firm* — McDermott Will & Emery LLP

(57) ABSTRACT

In an actuator (camera driver) according to the present invention, when a movable unit is in a neutral position in which the movable unit has rotated around neither an axis nor an axis, a first synthetic vector and a second synthetic vector are directed toward an object to be driven with respect to a plane including the both axes. The first synthetic vector is defined by synthesizing together two first vectors, pointing toward a pair of magnetic yokes, of magnetic attraction forces between a pair of first driving magnets and the pair of magnetic yokes. The second synthetic vector is defined by synthesizing together two second vectors, pointing toward a pair of magnetic yokes, of magnetic attraction forces between a pair of second driving magnets and the pair of magnetic yokes.

21 Claims, 25 Drawing Sheets

(51) Int. Cl.
  *G03B 17/56* (2006.01)
  *H02K 11/215* (2016.01)
  *H02K 3/46* (2006.01)
(52) U.S. Cl.
  CPC ....... *H02K 11/215* (2016.01); *H02K 2201/18* (2013.01); *H02K 2203/12* (2013.01)

(56) References Cited

U.S. PATENT DOCUMENTS

| | | | |
|---|---|---|---|
| 7,859,161 B2 * | 12/2010 | Imanishi | H02K 3/522 |
| | | | 310/194 |
| 2002/0047457 A1 * | 4/2002 | Yoshikawa | H02K 3/345 |
| | | | 310/215 |
| 2010/0052461 A1 * | 3/2010 | Sasaki | H02K 3/522 |
| | | | 310/215 |
| 2011/0156512 A1 * | 6/2011 | Shimomura | H02K 1/148 |
| | | | 310/71 |
| 2011/0278983 A1 * | 11/2011 | Kobayashi | H02K 1/148 |
| | | | 310/254.1 |
| 2012/0182472 A1 | 7/2012 | Inata et al. | |
| 2012/0188441 A1 | 7/2012 | Takizawa | |
| 2019/0215463 A1 * | 7/2019 | Shirane | H04N 5/2253 |
| 2019/0238736 A1 * | 8/2019 | Morimitsu | F16M 11/125 |
| 2019/0267880 A1 * | 8/2019 | Ichihashi | G03B 5/00 |

FOREIGN PATENT DOCUMENTS

| | | | |
|---|---|---|---|
| JP | 2014-093876 A | 5/2014 | |
| JP | 5730219 B2 | 6/2015 | |
| JP | 5802192 B2 | 10/2015 | |

* cited by examiner

FIG. 12A
FIG. 12B
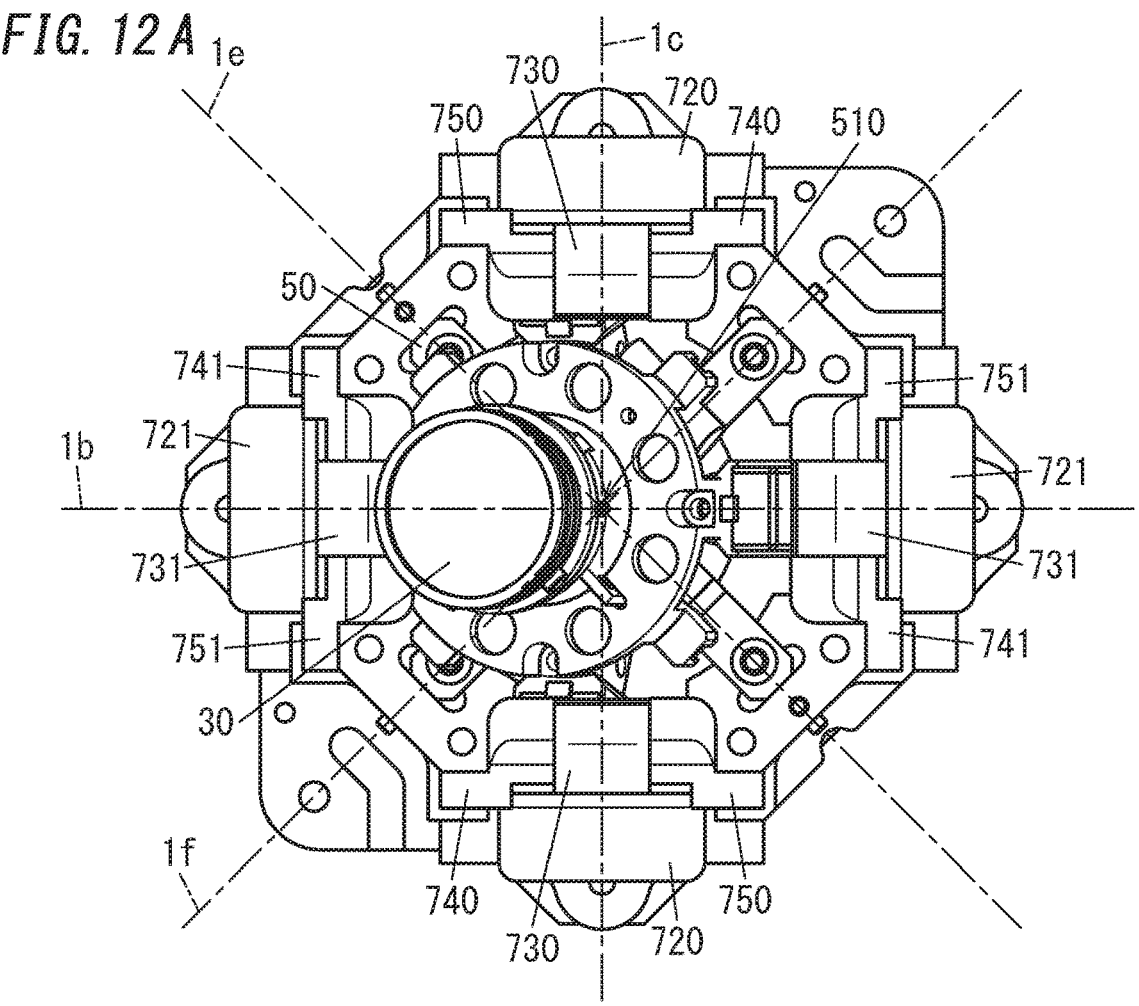
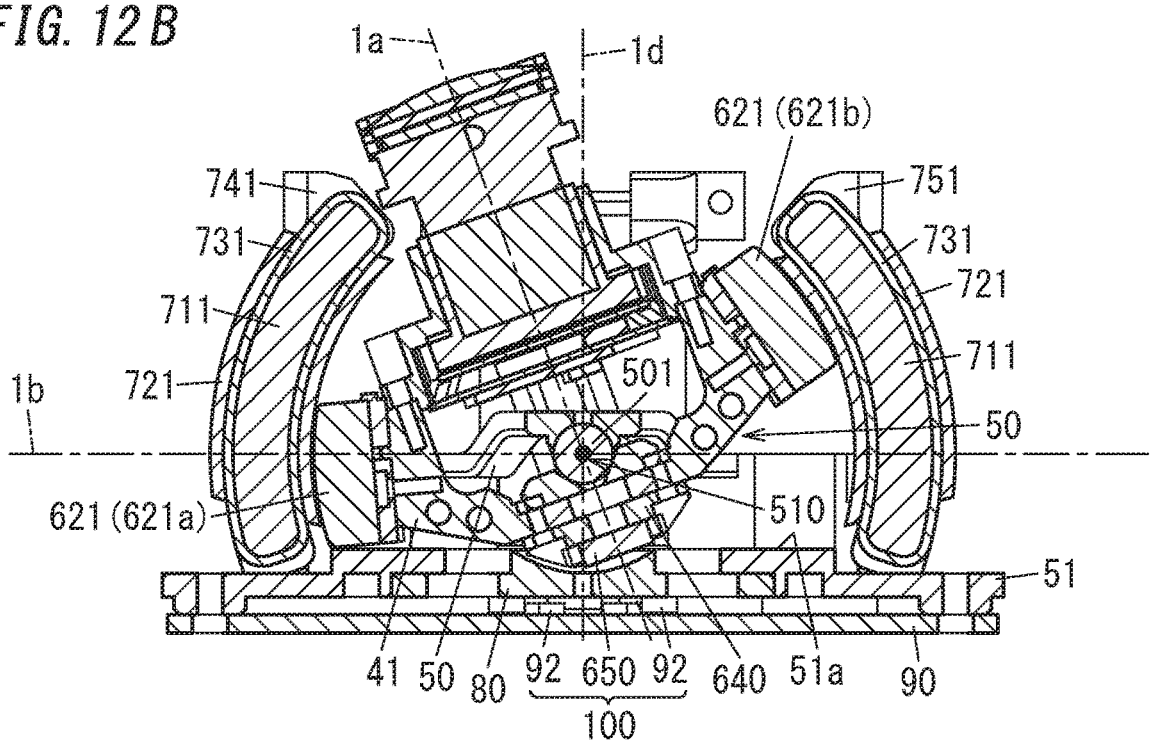

ACTUATOR AND COIL UNIT

CROSS-REFERENCE OF RELATED APPLICATIONS

This application is the U.S. National Phase under 35 U.S.C. § 371 of International Patent Application No. PCT/JP2017/011228, filed on Mar. 21, 2017, which in turn claims the benefit of Japanese Application No. 2016-068632, filed on Mar. 30, 2016, Japanese Application No. 2016-068633, filed on Mar. 30, 2016, and Japanese Application No. 2016-068634, filed on Mar. 30, 2016, the entire disclosures of which Applications are incorporated by reference herein.

TECHNICAL FIELD

The present invention relates to an actuator and a coil unit, and more particularly relates to an actuator and coil unit configured to electromagnetically drive an object to be driven in rotation.

BACKGROUND ART

A camera driver has been known in the art as an actuator for rotating a camera as an object to be driven (see, for example, Patent Literature 1).

The camera driver of Patent Literature 1 includes a movable unit to mount a camera thereon, a first driving unit, a second driving unit, and a detector. The first driving unit electromagnetically drives the movable unit in rotation in panning and tilting directions. The second driving unit electromagnetically drives it in rotation in a rolling direction.

The first driving unit includes a pair of panning driving magnets, a pair of panning magnetic yokes, around each of which a drive coil is wound, a pair of tilting driving magnets, and a pair of tilting magnetic yokes, around each of which a drive coil is wound. The detector includes a tilt detecting magnet held by a movable unit opposite from the camera and a magnetic sensor, and detects the angles of rotation of the movable unit in the panning and tilting directions.

The camera driver of Patent Literature 1 rotates the movable unit by energizing the drive coils wound around the pair of panning magnetic yokes and the drive coils wound around the pair of tilting magnetic yokes. The camera driver has its angle of rotation detected by the detector.

There has been a growing demand for reducing the size of such a camera driver serving as an actuator.

CITATION LIST

Patent Literature

Patent Literature 1: Japanese Patent No. 5802192

SUMMARY OF INVENTION

It is therefore an object of the present invention to provide an actuator and coil unit that may have a reduced size.

An actuator according to a first aspect of the present invention includes a movable unit, a fixed unit, and a driving unit. The movable unit holds an object to be driven. The fixed unit has a second loosely fitting face to be fitted into a first loosely fitting face of the movable unit. The driving unit makes the movable unit electromagnetically drivable and rotatable with respect to the fixed unit. One of the first loosely fitting face or the second loosely fitting face has a recess, and the other has a raised spherical face. A center of rotation of the movable unit is located on a fitting direction in which the raised spherical face is fitted into the recess. The driving unit includes a pair of first driving magnets, a pair of first magnetic yokes, a pair of first drive coils, a pair of second driving magnets, a pair of second magnetic yokes, and a pair of second drive coils. The pair of first driving magnets is provided for the movable unit on a first plane including a first axis and the fitting direction. The first axis is perpendicular to the fitting direction and passes through the center. The pair of first magnetic yokes faces the pair of first driving magnets and is provided for the fixed unit such that a distance from the first magnetic yokes to the center is longer than a distance from the first driving magnets to the center. The pair of first drive coils is wound around the pair of first magnetic yokes. The pair of second driving magnets is provided for the movable unit on a plane including a second axis and the fitting direction. The second axis is perpendicular to the fitting direction and the first axis and passes through the center. The pair of second magnetic yokes faces the pair of second driving magnets and is provided for the fixed unit such that a distance from the second magnetic yokes to the center is longer than a distance from the second driving magnets to the center. The pair of second drive coils is wound around the pair of second magnetic yokes. When the movable unit is in a neutral position in which the movable unit has rotated around neither the first axis nor the second axis, a first synthetic vector, defined by synthesizing together two first vectors, pointing toward the first magnetic yokes, of magnetic attraction forces between the pair of first driving magnets and the pair of first magnetic yokes, is directed toward the object to be driven with respect to a second plane including the first axis and the second axis. A second synthetic vector, defined by synthesizing together two second vectors, pointing toward the second magnetic yokes, of magnetic attraction forces between the pair of second driving magnets and the pair of second magnetic yoke, is also directed toward the object to be driven with respect to the second plane.

An actuator according to a second aspect, which may be implemented in conjunction with the first aspect, further includes a detecting unit. The detecting unit includes a position detecting magnet and a magnetic sensor, and is provided opposite from the object to be driven with respect to the second plane. The position detecting magnet is held by the movable unit. The magnetic sensor detects rotation of the movable unit based on a variation in magnetism caused by allowing the position detecting magnet to rotate as the movable unit rotates.

In an actuator according to a third aspect, which may be implemented in conjunction with the first or second aspect, in a range where the movable unit is rotatable around both of the first axis and the second axis, the first synthetic vector and the second synthetic vector are both directed toward the object to be driven with respect to the second plane.

In an actuator according to a fourth aspect, which may be implemented in conjunction with any one of the first to third aspects, when the movable unit is in the neutral position, respective directions of the two first vectors and respective directions of the two second vectors are tilted with respect to the second plane.

In an actuator according to a fifth aspect, which may be implemented in conjunction with any one of the first to fourth aspects, each of respective faces of the pair of first driving magnets and the pair of first magnetic yokes that face each other is an arc-shaped curved face with a center of arc defined by the center of rotation, and each of respective faces of the pair of second driving magnets and the pair of second magnetic yokes that face each other is an arc-shaped curved face with a center of arc defined by the center of rotation.

In an actuator according to a sixth aspect, which may be implemented in conjunction with any one of the first to fifth aspects, the fixed unit includes a stopper member configured to prevent the movable unit from falling off. The stopper member is provided opposite from the object to be driven with respect to the second plane.

In an actuator according to a seventh aspect, which may be implemented in conjunction with the sixth aspect, the stopper member is non-magnetic.

In an actuator according to an eighth aspect, which may be implemented in conjunction with any one of the first to seventh aspects, the movable unit includes a body provided with a plurality of arms to mount the pair of first driving magnets and the pair of second driving magnets thereon, and the body includes a counterweight provided opposite from the object to be driven with respect to the second plane.

In an actuator according to a ninth aspect, which may be implemented in conjunction with the eighth aspect, the counterweight is non-magnetic.

In an actuator according to a tenth aspect, which may be implemented in conjunction with any one of the first to ninth aspects, a third drive coil configured to rotate the movable unit around the fitting direction is wound around each of the pair of first magnetic yokes and each of the pair of second magnetic yokes.

In an actuator according to an eleventh aspect, which may be implemented in conjunction with any one of the first to tenth aspects, the object to be driven includes an optical element.

In an actuator according to a twelfth aspect, which may be implemented in conjunction with any one of the first to eleventh aspects, the object to be driven is a camera unit including a lens and a photodetector. The actuator further includes a plurality of cables, each having a first end thereof electrically connected to the camera unit and a second end thereof electrically connected to an external circuit. The plurality of cables is grouped into at least two bundles of cables. Each of the at least two bundles of cables includes a flexible portion between the first end and the second end. The respective flexible portions of the at least two bundles of cables are arranged at equal intervals around a circumference of a circle, of which the center is defined by the center of rotation of the movable unit. The respective flexible portions of the at least two bundles of cables have an equal length.

In an actuator according to a thirteenth aspect, which may be implemented in conjunction with the twelfth aspect, each of the at least two bundles of cables is made up of two or more cables. Each of the at least two bundles of cables is provided with a first clamp and a second clamp. The first clamp binds the bundle of cables at one end of the flexible portion of the bundle of cables and is secured to the movable unit. The second clamp binds the bundle of cables at the other end of the flexible portion and is secured to the fixed unit. Between the first clamp and the second clamp of each of the at least two bundles of cables, the two or more cables that form the bundle of cables are separate from each other.

In an actuator according to a fourteenth aspect, which may be implemented in conjunction with the thirteenth aspect, in the at least two bundles of cables, the flexible portion is provided outside of the movable unit and the fixed unit and bent.

In an actuator according to a fifteenth aspect, which may be implemented in conjunction with the fourteenth aspect, the fixed unit includes at least two ribs configured to respectively hold the second clamps of the at least two bundles of cables. The at least two ribs are tilted toward a direction in which the camera unit is arranged with respect to a plane intersecting at right angles with an optical axis of the camera unit when the movable unit is in the neutral position.

In an actuator according to a sixteenth aspect, which may be implemented in conjunction with the fifteenth aspect, in each of the at least two bundles of cables, the second clamp provided for the bundle of cables includes a movement regulating portion configured to regulate movement of the bundle of cables in inserting and removing directions with respect to the fixed unit by abutting on the ribs.

In an actuator according to a seventeenth aspect, which may be implemented in conjunction with any one of the thirteenth to sixteenth aspects, the movable unit includes an outer peripheral guide portion. The outer peripheral guide portion is configured to guide, along an outer periphery of the movable unit, a part of a portion, running from the first end through the first clamp, of one or more of the at least two bundles of cables.

A coil unit according to an eighteenth aspect includes: a coil bobbin having a first curved face and a second curved face, which are curved in an arc direction and which face each other; and a coil wound around the coil bobbin in the arc direction. The coil on the first curved face has the same pitch as the coil on the second curved face.

In a coil unit according to a nineteenth aspect, which may be implemented in conjunction with the eighteenth aspect, the first curved face and the second curved face have a plurality of grooves. Alternatively, both edges, perpendicular to a winding direction of the coil, of the first curved face and both edges, perpendicular to the winding direction of the coil, of the second curved face have a plurality of grooves.

In a coil unit according to a twentieth aspect, which may be implemented in conjunction with the nineteenth aspect, the first curved face and the second curved face have the plurality of grooves formed thereon by continuously providing, in the arc direction, a plurality of projections, each of which is defined by a first plane parallel to the winding direction of the coil and a second plane perpendicular to the winding direction. Alternatively, both edges of the first curved face and both edges of the second curved face have the plurality of grooves formed thereon by continuously providing, in the arc direction, a plurality of projections, each of which is defined by a first plane parallel to the winding direction of the coil and a second plane perpendicular to the winding direction.

An actuator according to a twenty-first aspect includes: the coil unit according to the nineteenth or twentieth aspect; and a driving magnet facing the first curved face and configured to be electromagnetically driven in rotation with respect to the coil unit around an axis of rotation so as to define a circle, of which the circumference is the arc direction.

The present invention contributes to reducing the size of an actuator.

BRIEF DESCRIPTION OF DRAWINGS

FIG. 12A is a perspective view of the camera driver 10 in which the movable unit thereof has rotated;

FIG. 12B is a cross-sectional view thereof;

DESCRIPTION OF EMBODIMENTS

Embodiments of the present invention and variations thereof will be described. Note that those embodiments and their variations are only examples of the present invention and should not be construed as limiting. Rather, those embodiments and variations can be readily modified, combined, or replaced in various manners depending on design choice or any other factor without departing from the true spirit and scope of the invention.

(1) First Embodiment

A camera driver 10 will be described as an exemplary actuator according to a first embodiment with reference to FIGS. 1A through 12.

Figure 1A:
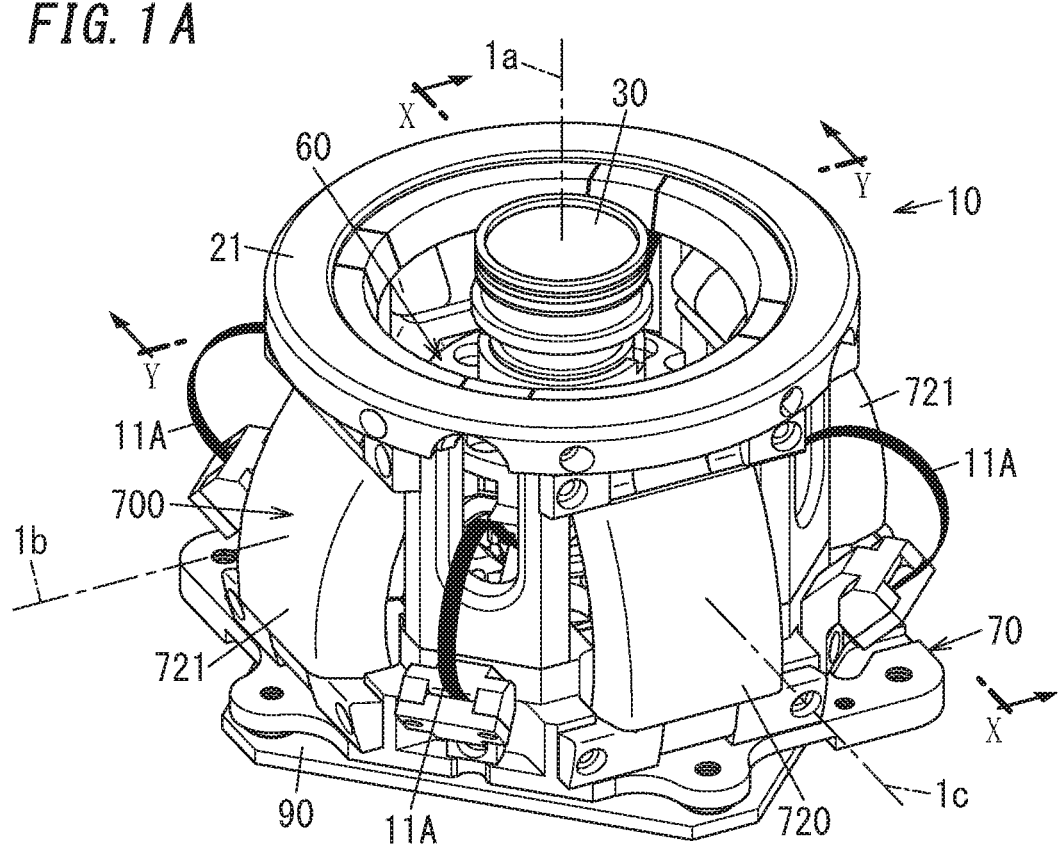
FIG. 1A is a perspective view of a camera driver (actuator) according to a first embodiment of the present invention.
Figure 1B:
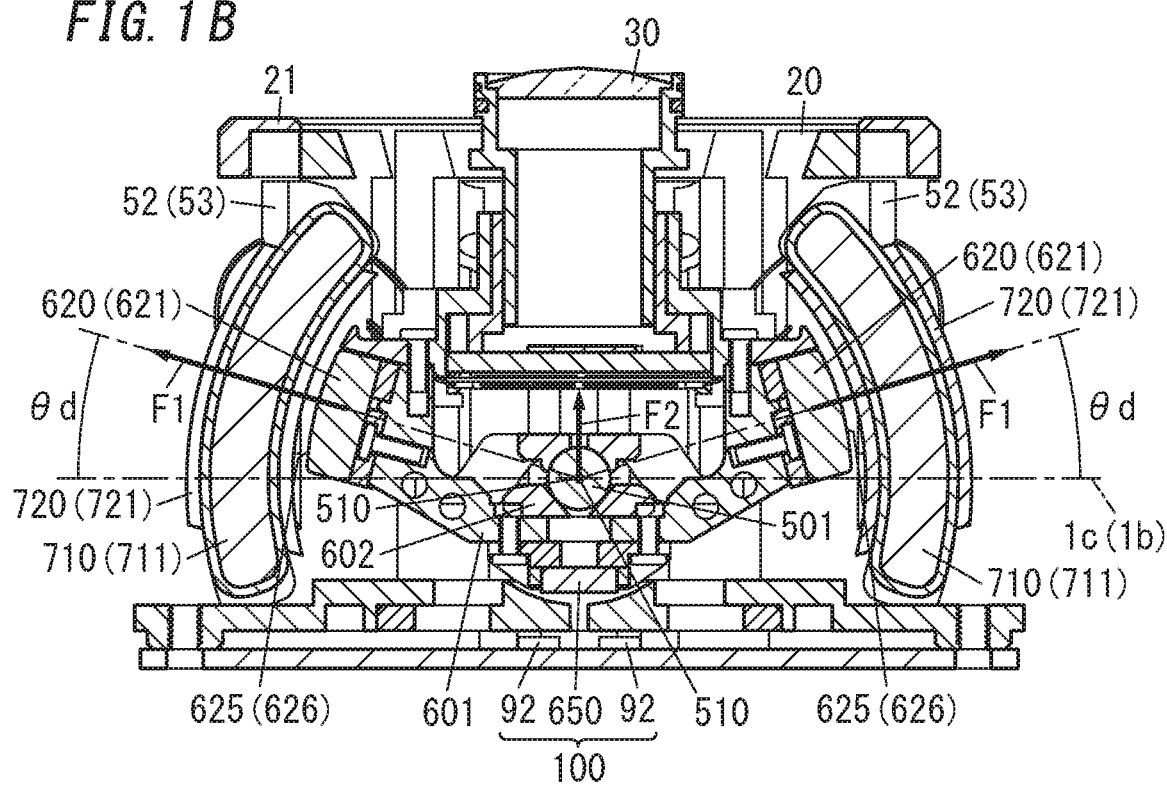
FIG. 1B is a cross-sectional view, taken along a plane X-X (or Y-Y), of the camera driver.
Figure 2:
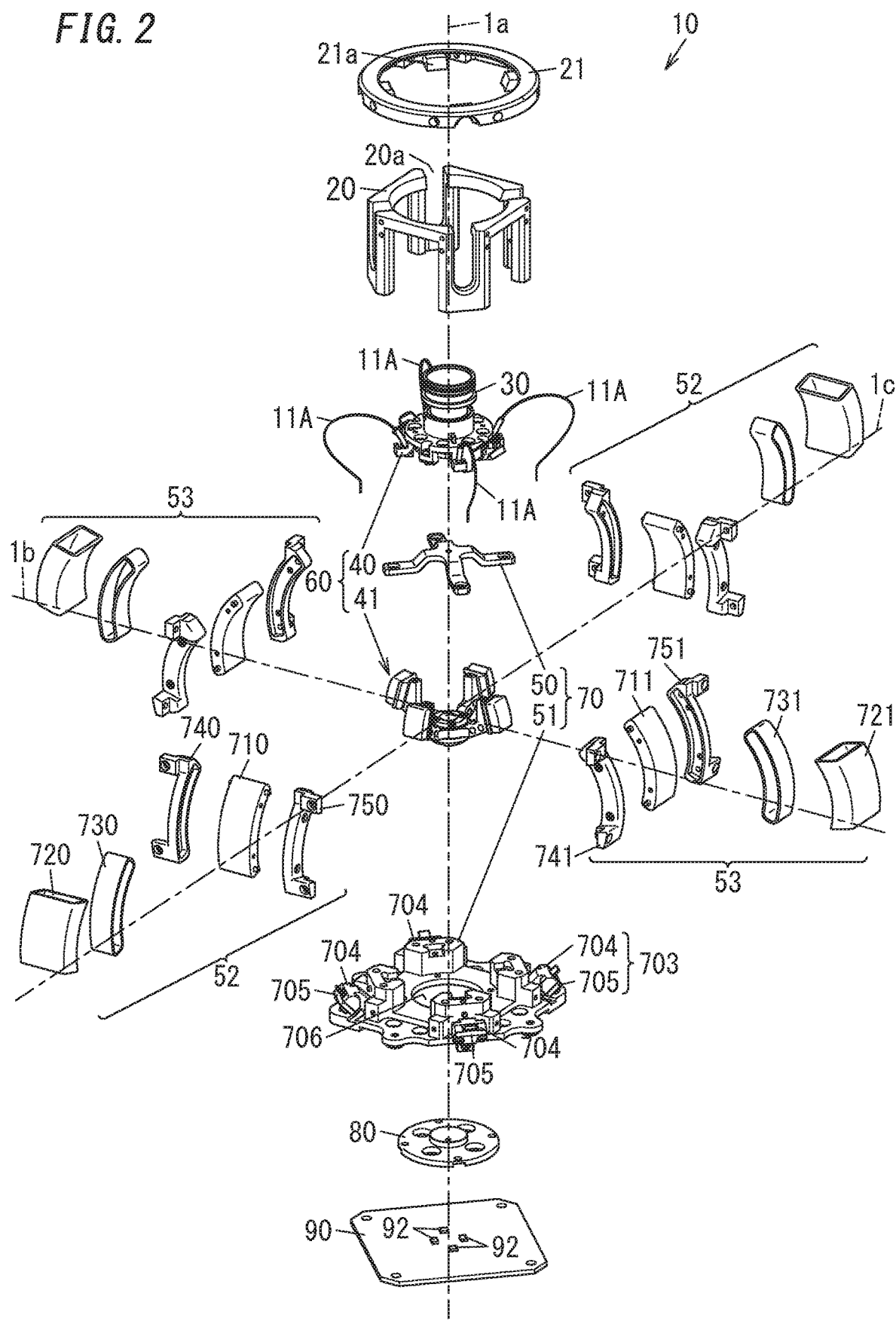
FIG. 2 is an exploded perspective view of the camera driver.

The camera driver 10 includes a first upper ring 20, a second upper ring 21, a camera unit 30, a movable unit 60, a fixed unit 70, a stopper member 80, a printed circuit board 90, a detecting unit 100, and a driving unit 700 as shown in FIGS. 1A, 1B, and 2.

The camera unit 30 includes an image capture device, a lens to form a subject image on an image capturing plane of the image capture device, and a lens barrel to hold the lens, and is configured to convert video produced on the image capturing plane of the image capture device into an electrical signal. Also, a plurality of cables to transmit the electrical signal generated to an external image processor circuit (as an exemplary external circuit) are electrically connected to the camera unit 30 via connectors. In this embodiment, the plurality of cables are fine-line coaxial cables of the same length, and the number of cables provided is forty. Those cables (forty cables) are grouped into four bundles of cables 11A, each consisting of ten cables. Note that the number of the cables provided (e.g., forty) is only an example and should not be construed as limiting. Also, on the drawings to be referred to when this and other embodiments are described, the number of the cables illustrated is smaller than the actual one for the sake of convenience of description.

The movable unit 60 includes a camera holder 40 and a movable base 41 (see FIG. 2). The movable unit 60 is fitted into the fixed unit 70 with some gap left between the movable unit 60 and the fixed unit 70. The movable unit 60 rotates (i.e., rolls) around the optical axis 1a of the lens of the camera unit 30 with respect to the fixed unit 70. The movable unit 60 also rotates around an axis 1b and around an axis 1c with respect to the fixed unit 70. In this case, the axis 1b and the axis 1c are both perpendicular to a fitting direction, in which the movable unit 60 is fitted into the fixed unit 70 while the movable unit 60 is not rotating. Furthermore, these axes 1b and 1c intersect with each other at right angles. A detailed configuration of the movable unit 60 will be described later. The camera unit 30 has been mounted on the camera holder 40. The configuration of the movable base 41 will be described later. Rotating the movable unit 60 allows the camera unit 30 to rotate. In this embodiment, when the optical axis 1*a* is perpendicular to both of the axes 1*b* and 1*c*, the movable unit 60 (i.e., the camera unit 30) is defined to be in a neutral position.

The fixed unit 70 includes a coupling member 50 and a body 51 (see FIG. 2).

The coupling member 50 includes four coupling bars extending from a center portion thereof. Each of the four coupling bars is generally perpendicular to two adjacent coupling bars. Also, each of the four coupling bars is bent such that the tip portion thereof is located under the center portion. The coupling member 50 is screwed onto the body 51 with the movable base 41 interposed between itself and the body 51. Specifically, the respective tip portions of the four coupling bars are screwed onto the body 51.

The fixed unit 70 includes a pair of first coil units 52 and a pair of second coil units 53 to make the movable unit 60 electromagnetically drivable and rotatable (see FIG. 2). The pair of first coil units 52 allows the movable unit 60 to rotate around the axis 1*b*, and the pair of second coil units 53 allows the movable unit 60 to rotate around the axis 1*c*.

Figure 3:
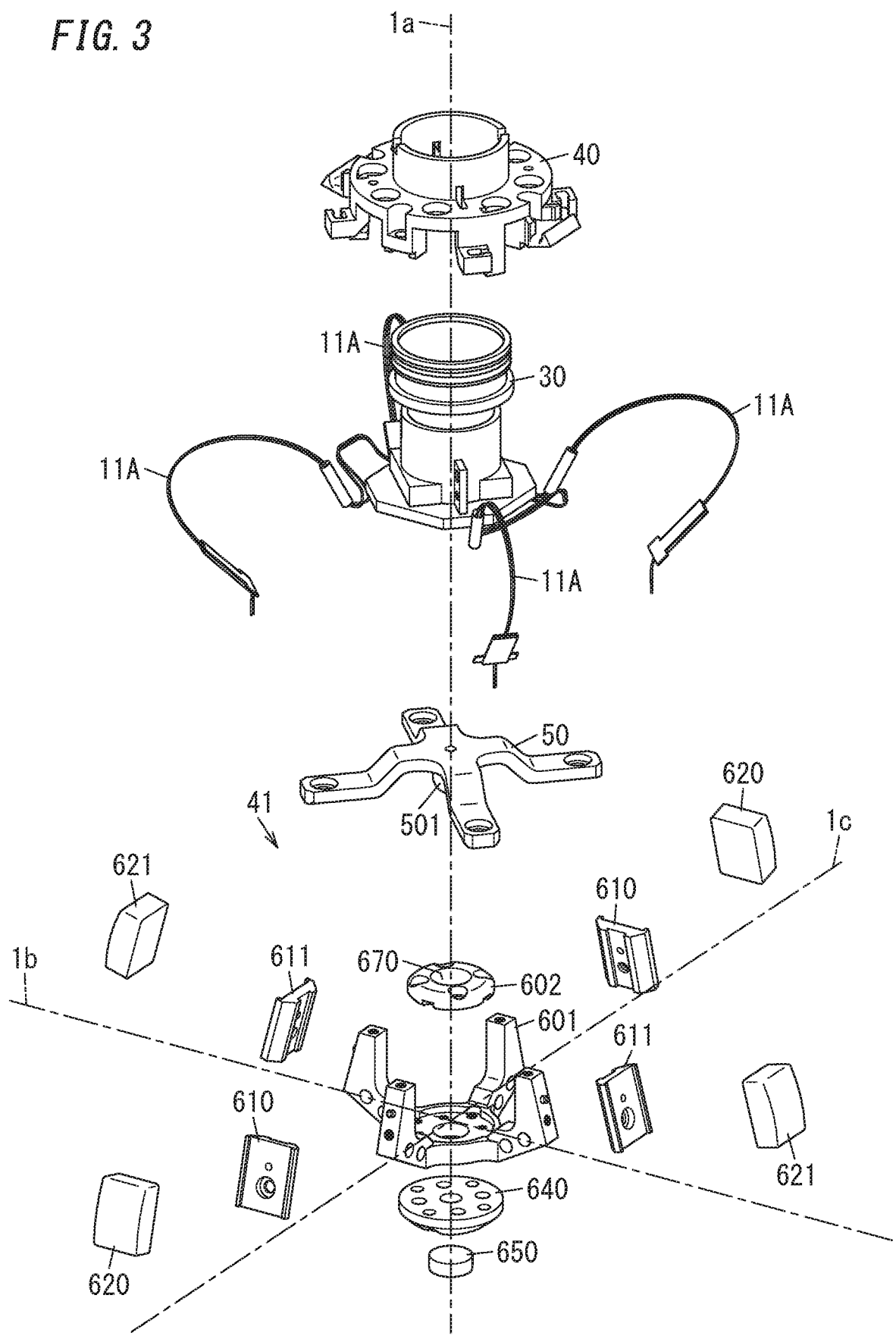
FIG. 3 is an exploded perspective view of a movable unit as a constituent member of the camera driver.
Figure 4A:
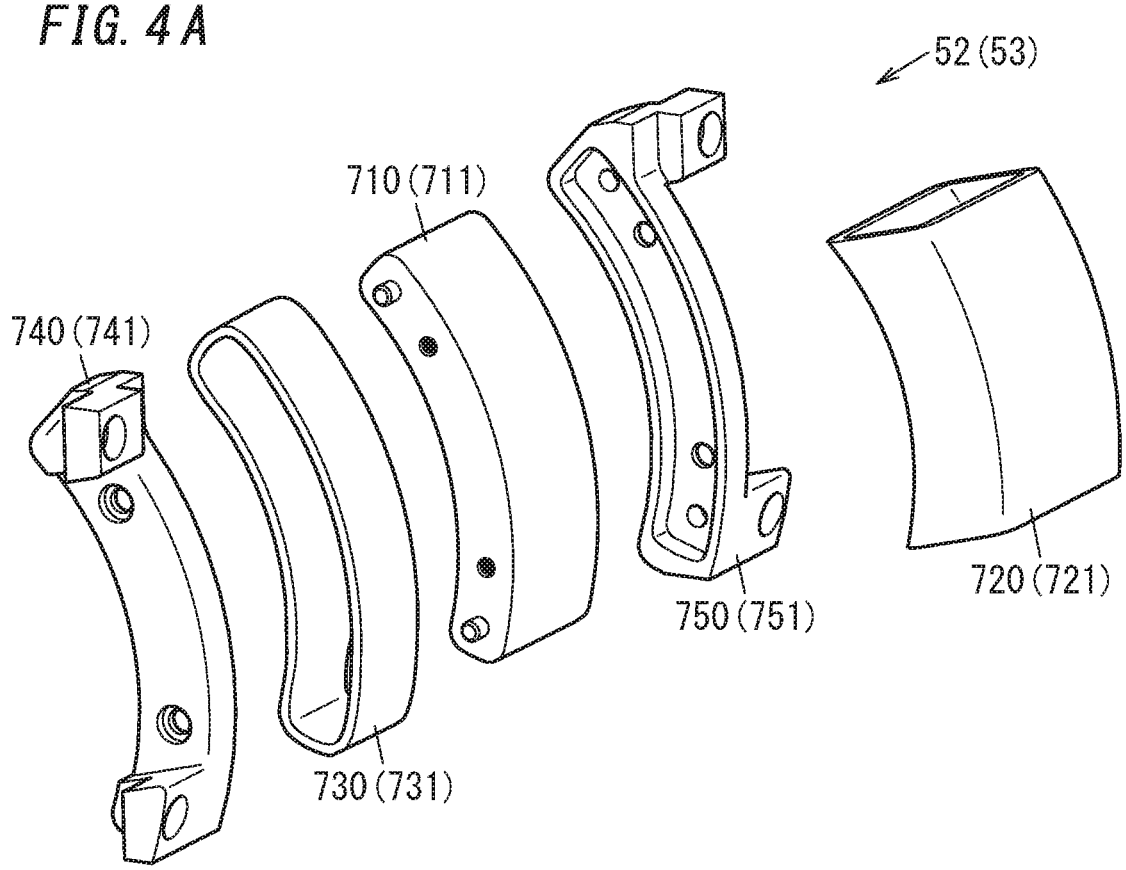
FIG. 4A is an exploded perspective view of a first coil unit (or second coil unit) of the camera driver.
Figure 4B:
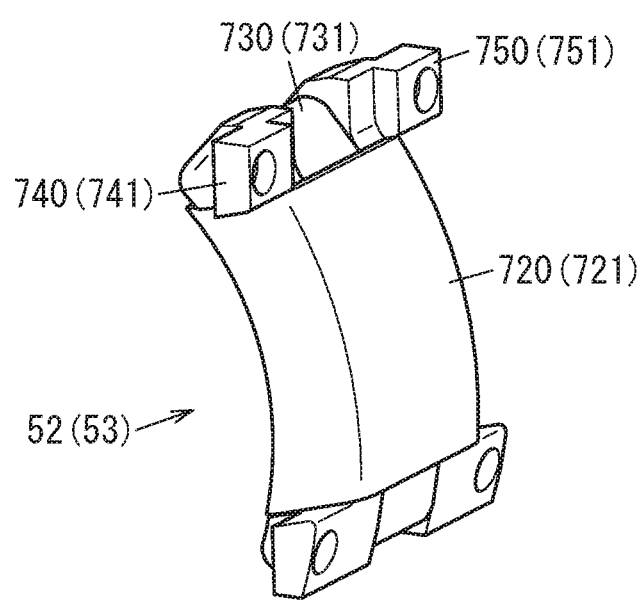
FIG. 4B is a perspective view of the first coil unit (or second coil unit) of the camera driver.

The pair of first coil units 52 each include a magnetic yoke 710 made of a magnetic material, drive coils 720 and 730, and magnetic yoke holders 740 and 750 (see FIGS. 2 and 4A). Each magnetic yoke 710 has the shape of an arc, of which the center is defined by the center 510 of rotation (see FIGS. 1B and 4A). The pair of drive coils 730 are wound around the pair of magnetic yokes 710, of which the winding direction is defined around the axis 1*b*. After each drive coil 730 has been wound around its associated magnetic yoke 710, the magnetic yoke holders 740 and 750 are secured with screws onto the magnetic yoke 710 on both sides of the magnetic yoke 710 along the axis 1*b*. Thereafter, each drive coil 720 is wound around its associated magnetic yoke 710 such that its winding direction is defined around the optical axis 1*a* when the movable unit 60 is in the neutral position (see FIG. 4B). Then, the pair of first coil units 52 are secured with screws onto the first upper ring 20 and the body 51 so as to face each other along the axis c when viewed from the camera unit 30 (see FIGS. 1A and 2). Note that in this embodiment, the winding direction of the coil is a direction in which the number of coil turns increases. Also, a smaller number of cables are illustrated in FIGS. 2 and 3 for each of the four bundles of cables for the sake of convenience of description.

The pair of second coil units 53 each include a magnetic yoke 711 made of a magnetic material, drive coils 721 and 731, and magnetic yoke holders 741 and 751 (see FIGS. 2 and 4A). Each magnetic yoke 711 has the shape of an arc, of which the center is defined by the center 510 of rotation (see FIGS. 1B and 4A). The pair of drive coils 731 are wound around the pair of magnetic yokes 711, of which the winding direction is defined around the axis 1*c*. After each drive coil 731 has been wound around its associated magnetic yoke 711, the magnetic yoke holders 741 and 751 are secured with screws onto the magnetic yoke 711 on both sides of the magnetic yoke 711 along the axis 1*c*. Thereafter, each drive coil 721 is wound around its associated magnetic yoke 711 such that its winding direction is defined around the optical axis 1*a* when the movable unit 60 is in the neutral position (see FIG. 4B). Then, the pair of second coil units 53 are secured with screws onto the first upper ring 20 and the body 51 so as to face each other along the axis 1*b* when viewed from the camera unit 30 (see FIGS. 1A and 2).

The camera unit 30 that has been mounted on the camera holder 40 is fixed onto the movable unit 60 with the coupling member 50 interposed between itself and the movable base 41. The first upper ring 20 is secured with screws onto the body 51 to sandwich the camera unit 30, fixed onto the movable unit 60, between itself and the body 51 (see FIG. 2). The second upper ring 21 is fitted into the first upper ring 20. Specifically, fitting portions 21*a* of the second upper ring 21 are fitted into gaps 20*a* of the first upper ring 20 (see FIGS. 1A and 2).

The stopper member 80 is a non-magnetic member. To prevent the movable unit 60 from falling off, the stopper member 80 is secured with screws onto the other side, opposite from the side to which the coupling member 50 is secured, of the body 51, so as to close an opening 70*b*.

On the printed circuit board 90, assembled are a plurality of (e.g., four) magnetic sensors 92 for detecting a rotational position of the camera unit 30, a circuit for controlling the amount of a current allowed to flow through the drive coils 720, 721, 730, and 731, and other components. In this embodiment, the magnetic sensors 92 may be Hall elements, for example.

Next, the configuration of the movable base 41 will be described.

The movable base 41 has a loosely fitting space, and supports the camera unit 30 thereon. The movable base 41 includes a body 601, a first loosely fitting member 602, a pair of first magnetic back yokes 610, a pair of second magnetic back yokes 611, a pair of first driving magnets 620, and a pair of second driving magnets 621 (see FIGS. 3, 5A, and 5B). The movable base 41 further includes a bottom plate 640 (counterweight) and a position detecting magnet 650 (see FIG. 3).

The body 601 includes a disk portion and four fixing portions (arms) protruding from the outer periphery of the disk portion toward the camera unit 30 (i.e., upward). Two of the four fixing portions face each other along the axis 1*b*, and the other two fixing portions face each other along the axis 1*c*. Each of the four fixing portions has a generally L-shape, and will be hereinafter referred to as an "L-shaped fixing portion." Each of these four L-shaped fixing portions faces, one to one, an associated one of the pair of first coil units 52 or an associated one of the pair of second coil units 53.

The first loosely fitting member 602 has a through hole in a tapered shape. The first loosely fitting member 602 has, as a first loosely fitting face 670, an inner peripheral face of the through hole in the tapered shape (see FIGS. 3 and 5B). The first loosely fitting face 670 has a recess as the through hole described above. The first loosely fitting member 602 is secured with screws onto the disk portion of the body 601 such that the first loosely fitting face 670 is exposed to the loosely fitting space.

The pair of first magnetic back yokes 610 are each provided one to one for an associated one of two, facing the pair of first coil units 52, of the four L-shaped fixing portions. The pair of first magnetic back yokes 610 are secured with a pair of screws onto the two L-shaped fixing portions facing the pair of first coil units 52. The pair of second magnetic back yokes 611 are each provided one to one for an associated one of two, facing the pair of second coil units 53, of the four L-shaped fixing portions. The pair of second magnetic back yokes 611 are secured with a pair of screws onto the two L-shaped fixing portions facing the pair of second coil units 53.

A surface 625, facing an associated one of the pair of first coil units 52, of each of the pair of first driving magnets 620 is a curved face in the shape of an arc, of which the center is defined by the center 510 of rotation. The center of the arc of the curved face of the surface 625 is identical with the center of the arc of the curved face of its associated magnetic yoke 710 (see FIGS. 1B and 5A). A surface 626, facing an associated one of the pair of second coil units 53, of each of the pair of second driving magnets 621 is a curved face in the shape of an arc, of which the center is defined by the center 510 of rotation. The center of the arc of the curved face of the surface 626 is identical with the center of the arc of the curved face of its associated magnetic yoke 711 (see FIGS. 1B and 5A).

The pair of first driving magnets 620 are each provided one to one for an associated one of the pair of first magnetic back yokes 610. The pair of second driving magnets 621 are each provided one to one for an associated one of the pair of second magnetic back yokes 611. This allows the pair of first driving magnets 620 to face the pair of first coil units 52, and also allows the pair of second driving magnets 621 to face the pair of second coil units 53. That is to say, the first driving magnets 620 are arranged to face each other along the axis 1c when viewed from the camera unit 30, and the driving magnets 621 are arranged to face each other along the axis 1b when viewed from the camera unit 30. In other words, the first driving magnets 620 are arranged on a plane including the axis 1c and the fitting direction, and the second driving magnets 621 are arranged on a plane including the axis 1b and the fitting direction.

Figure 5A:
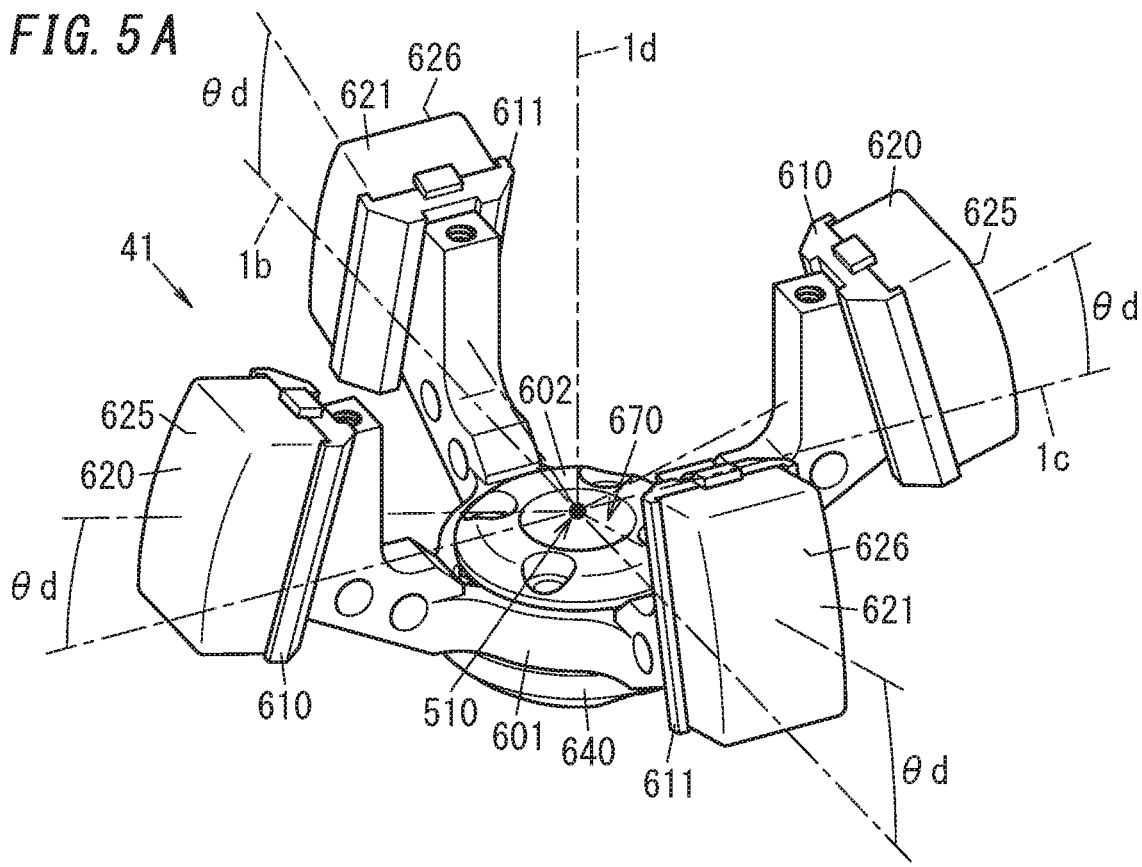
FIG. 5A is a perspective view of a movable base of the camera driver.
Figure 5B:
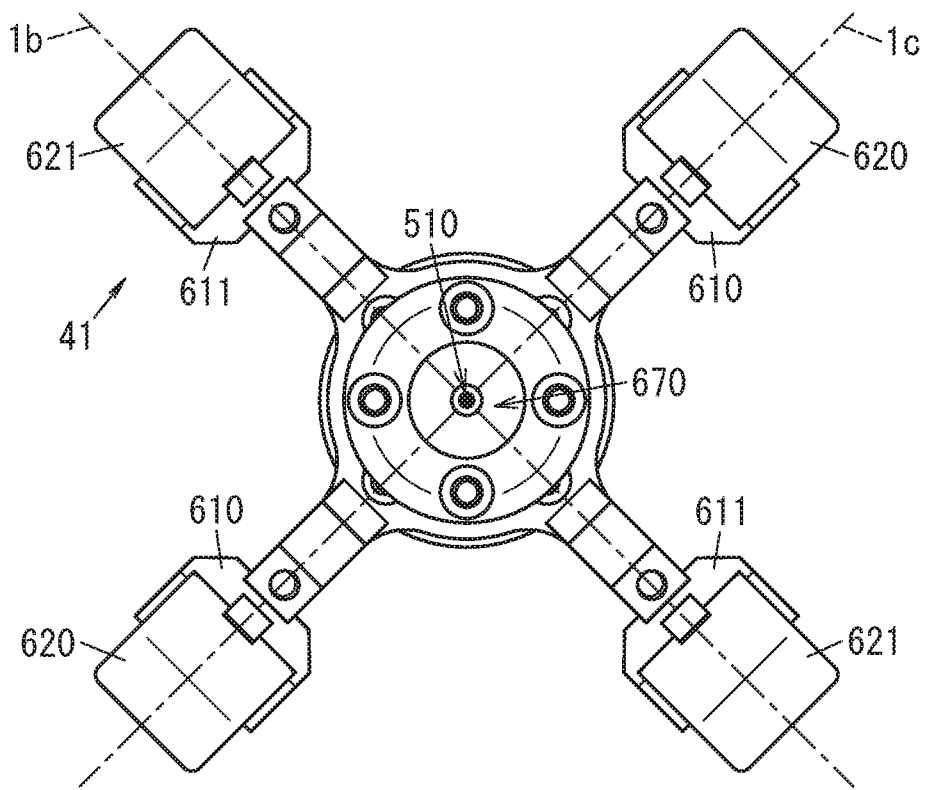
FIG. 5B is a plan view thereof.

Also, as described above, in each of the four L-shaped fixing portions of the body 601, a portion, extended from the outer periphery of the disk portion, of the L-shaped fixing portion tilts toward the camera unit 30 with respect to a plane including the disk portion. Thus, an angle θd is formed between a line segment drawn from the center of each of the first driving magnets 620 through the center 510 of rotation and the axis 1c (see FIG. 5A). Likewise, the same angle θd is also formed between a line segment drawn from the center of each of the second driving magnets 621 through the center 510 of rotation and the axis 1b (see FIG. 5A). In this embodiment, θd suitably falls within a range from 10 degrees to 25 degrees, and particularly suitably 15 degrees. Also, the axis 1d shown in FIG. 5A is perpendicular to both of the axes 1b and 1c. When the camera unit 30 is in the neutral position, the optical axis 1a of the camera unit 30 agrees with the axis 1d.

The bottom plate 640 is a non-magnetic member and may be made of brass, for example. The bottom plate 640 is provided for the other side, opposite from the side with the first loosely fitting member 602, of the body 601 to define the bottom of the movable unit 60 (i.e., the bottom of the movable base 41). The bottom plate 640 is secured with screws onto the body 601. The bottom plate 640 serves as a counterweight. Having the bottom plate 640 serve as a counterweight allows the center 510 of rotation to agree with the center of gravity of the movable unit 60. That is why when external force is applied to the entire movable unit 60, the moment of rotation of the movable unit 60 around the axis 1b and the moment of rotation of the movable unit 60 around the axis 1c both decrease. This allows the movable unit 60 (or the camera unit 30) to be held in the neutral position, or to rotate around the axes 1b and 1c, with less driving force, thus reducing the power consumption of the camera driver 10. Among other things, the amount of drive current to be supplied to hold the movable unit 60 in the neutral position may also be reduced to almost zero.

The position detecting magnet 650 is provided for a center portion of an exposed surface of the bottom plate 640. The four magnetic sensors 92 provided for the printed circuit board 90 and the position detecting magnet 650 together form the detecting unit 100 (see FIG. 1B).

As the movable unit 60 rotates, the position detecting magnet 650 changes its position, thus causing a variation in the magnetic force applied to the four magnetic sensors 92 provided for the printed circuit board 90. The four magnetic sensors 92 detect a variation, caused by the rotation of the position detecting magnet 650, in the magnetic force, and calculate two-dimensional angles of rotation with respect to the axes 1b and 1c. The four magnetic sensors 92 are arranged on the printed circuit board 90 parallel to a plane including the axes 1b and 1c (see FIG. 6). In this case, the four magnetic sensors 92 are arranged so as not to overlap with any of the pair of first driving magnets 620 or any of the pair of second driving magnets 621 when viewed along the optical axis 1a when the movable unit 60 is in the neutral position. Specifically, two (i.e., the magnetic sensors 92a and 92b shown in FIG. 7) of the four magnetic sensors 92 are arranged parallel to an axis 1e, which intersects with each of the axes 1b and 1c at an angle of 45 degrees. The other two (i.e., the magnetic sensors 92c and 92d shown in FIG. 7) are arranged parallel to an axis 1f, which intersects with each of the axes 1b and 1c at an angle of 45 degrees. This reduces the effect of the magnetic force applied by the pair of first driving magnets 620 and the effect of the magnetic force applied by the pair of second driving magnets 621, thus enabling the rotational position of the camera unit 30 to be detected more accurately. Besides, this also reduces the effect of the magnetic force, generated when a current flows through the first coil units 52 and the second coil units 53, on the magnetic sensors 92. In addition, the camera driver 10 further includes, separately from the four magnetic sensors 92, another magnetic sensor for detecting the rotation of the movable unit 60 (i.e., the rotation of the camera unit 30) around the optical axis 1a. Note that the sensor for detecting the rotation around the optical axis 1a does not have to be a magnetic sensor but may also be a gyro sensor, for example.

The coupling member 50 includes, at a center portion thereof (i.e., in a recess formed by respective bends of the four coupling bars), a second loosely fitting member 501 in a spherical shape (see FIGS. 1B and 3). The second loosely fitting member 501 has a second loosely fitting face 502 with a raised spherical surface (see FIG. 6). The spherical second loosely fitting member 501 is bonded with an adhesive onto the center portion (recess) of the coupling member 50. This reduces, compared to a supporting structure in which no spherical second loosely fitting members 501 are embedded in the recess, the length (or the height), measured along the optical axis 1a, of the coupling member 50 when the movable unit 60 is in the neutral position. That is to say, this provides a camera driver 10 with a reduced height.

The coupling member 50 and the first loosely fitting member 602 are joined together. Specifically, the first loosely fitting face 670 of the first loosely fitting member 602 is brought into point or line contact with, and fitted with a narrow gap left into, the second loosely fitting face 502 of the second loosely fitting member 501. This allows the coupling member 50 to pivotally support the movable unit 60 so as to make the movable unit 60 freely rotatable. In this case, the center of the spherical second loosely fitting member 501 defines the center 510 of rotation. That is to say, the center 510 of rotation is provided in the fitting direction described above. In this embodiment, the coupling member 50 has four coupling bars, thus stabilizing the pivotal support compared to a situation where only two coupling bars are provided.

Figure 6:
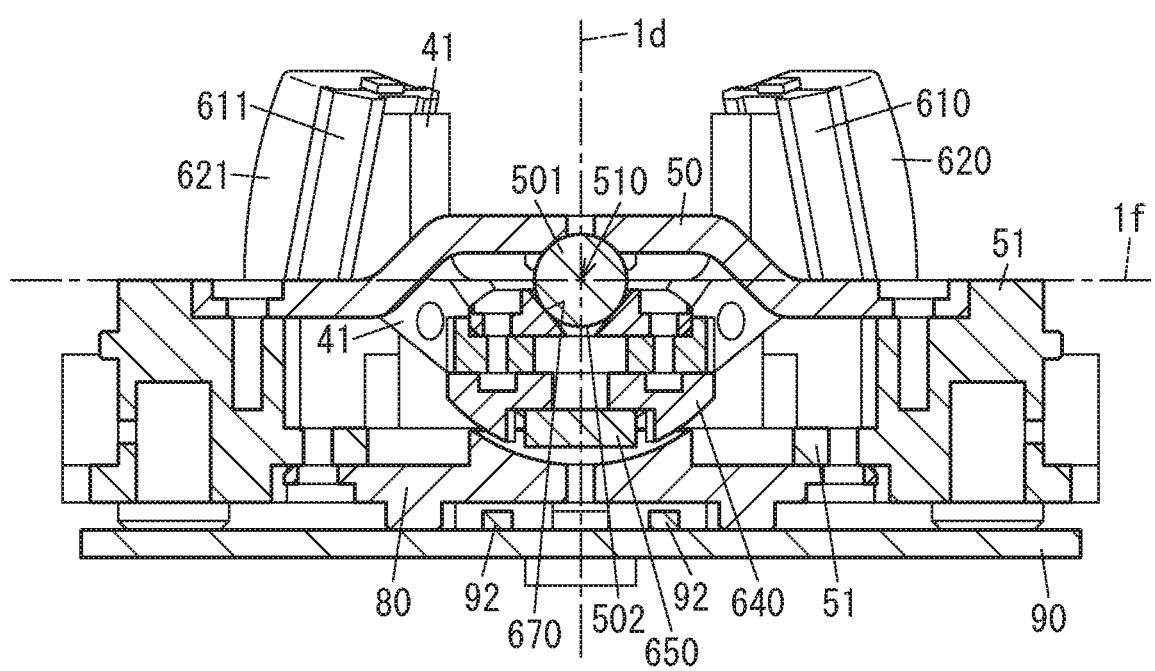
FIG. 6 is a cross-sectional view of the camera driver in a state where the movable base is interposed between a body of a fixed unit, on which a printed circuit board has been mounted, and a coupling member.
Figure 7:
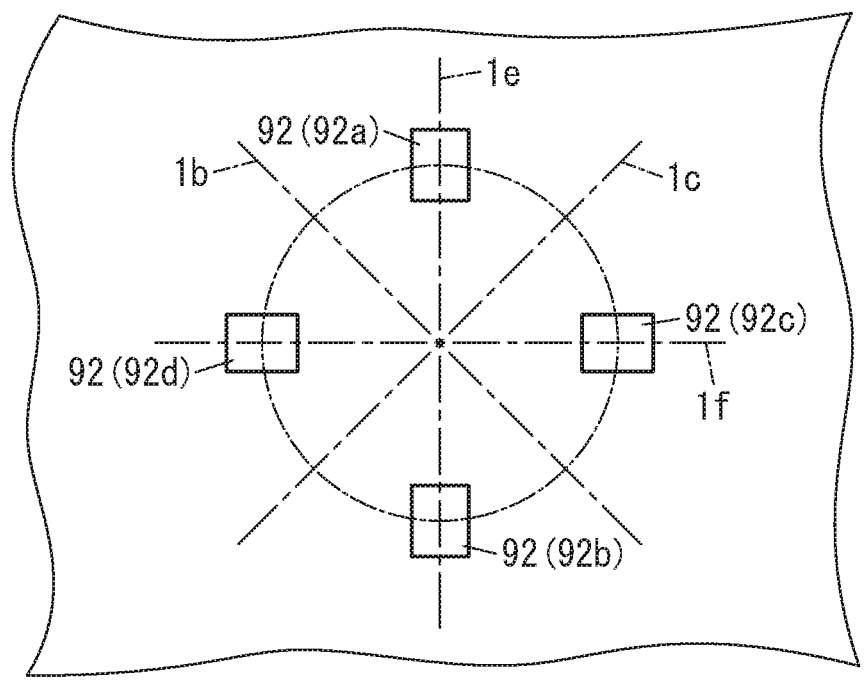
FIG. 7 is a plan view schematically illustrating the printed circuit board of the camera driver.
Figure 8:
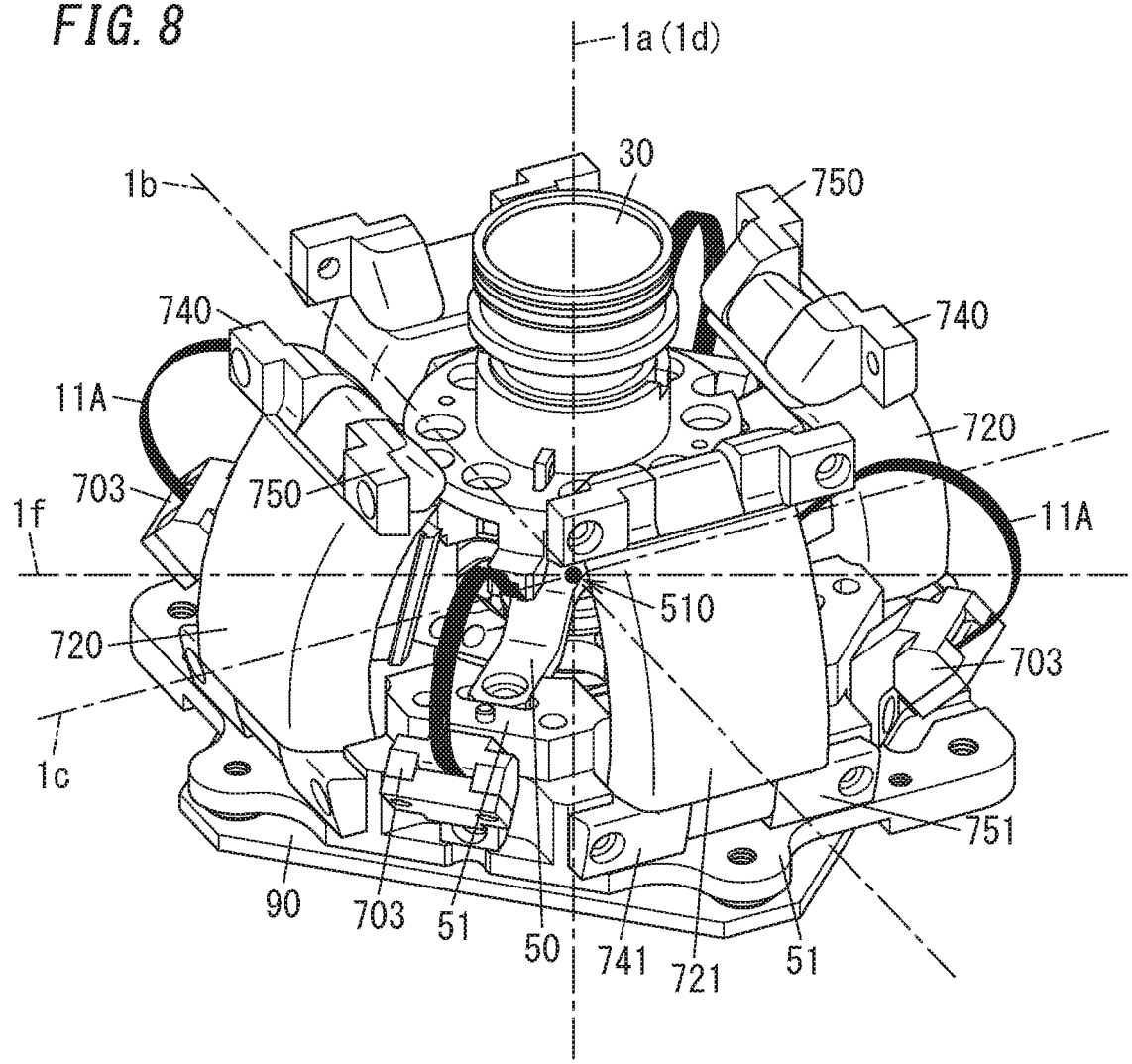
FIG. 8 is a perspective view of the camera driver in a state where a second upper ring is removed therefrom.

The center of the second loosely fitting member 501 (i.e., the center 510) is located outside of the recess of the first loosely fitting face 670 (see FIGS. 1B and 6). This reduces, compared to a situation where the center 510 is located inside of the recess of the first loosely fitting face 670, the height of the first loosely fitting face 670. In addition, this also expands a movable range in which the first loosely fitting face 670 is out of contact with the coupling member 50, and thereby expands the movable range of the movable unit 60 as well.

The stopper member 80 has a recessed inner peripheral face, and is secured onto the body 51 so as to cover the position detecting magnet 650. A gap is left between the recessed inner peripheral face of the stopper member 80 and the bottom of the bottom plate 640. The recessed inner peripheral face of the stopper member 80 and the outer peripheral face of the bottom of the bottom plate 640 have curved faces that face each other. In this case, a gap is also left between the recessed inner peripheral face of the stopper member 80 and the position detecting magnet 650. This gap is wide enough, even when the bottom plate 640 or the position detecting magnet 650 comes into contact with the stopper member 80, for the first driving magnets 620 and the second driving magnets 621 to return to their home positions due their magnetism. This prevents, even when the camera unit 30 is pressed toward the printed circuit board 90, the camera unit 30 from falling off, and also allows the pair of first driving magnets 620 and the pair of second driving magnets 621 to return to their home positions.

Note that the position detecting magnet 650 is suitably arranged inside of the outer periphery of the bottom of the bottom plate 640.

In this case, the pair of first driving magnets 620 serves as attracting magnets, thus producing magnetic attraction forces F1 between the pair of first driving magnets 620 and the magnetic yokes 710 that face the first driving magnets 620. The direction of the magnetic attraction forces F1 produced between the first driving magnets 620 and the magnetic yokes 710 (i.e., the direction of the first vectors) points from the first driving magnets 620 toward the magnetic yokes 710 as shown in FIG. 1B. Likewise, the pair of second driving magnets 621 also serves as attracting magnets, thus producing magnetic attraction forces F between the pair of second driving magnets 621 and the magnetic yokes 711 that face the second driving magnets 621. The direction of the magnetic attraction forces F1 produced between the second driving magnets 621 and the magnetic yokes 711 (i.e., the direction of the second vectors) also points from the second driving magnets 621 toward the magnetic yokes 711 as shown in FIG. 1B.

Actually, when the movable unit 60 is in the neutral position, a centerline, connecting together the center 510 of rotation, the center position of each magnetic yoke 710, and the center position of its associated first driving magnet 620 defines a tilt angle θd upwardly with respect to the axis 1c as shown in FIG. 1B. Likewise, when the movable unit 60 is in the neutral position, a centerline, connecting together the center 510 of rotation, the center position of each magnetic yoke 711, and the center position of its associated second driving magnet 621 also defines a tilt angle θd upwardly with respect to the axis 1b. Since the magnetic attraction is attracting force produced between two objects, each of the vectors (including the first vectors and the second vectors) of the magnetic attraction forces when the movable unit 60 is in the neutral position is parallel to the centerline connecting together the center 510 of rotation, the center position of each magnetic yoke 710, and the center position of an associated first driving magnet 620. Alternatively, each of the vectors of the magnetic attraction forces agrees with the centerline. In this embodiment, each of the vectors of the magnetic attraction forces agrees with the centerline (see FIG. 1B). Thus, the intersection between the respective vectors of the two magnetic attraction forces F1 produced between the pair of first driving magnets 620 and the magnetic yokes 710 that face the first driving magnets 620 agrees with the center 510 of rotation. Likewise, the intersection between the respective vectors of the two magnetic attraction forces F1 produced between the pair of second driving magnets 621 and the magnetic yokes 711 that face the second driving magnets 621 also agrees with the center 510 of rotation.

This relation between the vectors of the magnetic attraction forces F1 and the centerlines makes the angle formed between each of the vectors of the magnetic attraction forces and the axis 1b equal to the tilt angle θd. Thus, when the movable unit 60 is in the neutral position, the magnetic attraction force F1 between each magnetic yoke 711 and an associated second driving magnet 621 is produced opposite from the detecting unit 100 with respect to the plane including the axes 1b and 1c as shown in FIG. 1B. Likewise, the magnetic attraction force F1 between each magnetic yoke 710 and an associated first driving magnet 620 is also produced opposite from the detecting unit 100 with respect to the plane including the axes 1b and 1c.

As shown in FIG. 1B, the magnetic attraction forces F1 become normal forces produced by the second loosely fitting member 501 of the fixed unit 70 with respect to the first loosely fitting member 602. In addition, the two magnetic attraction forces F1 produced between the pair of first driving magnets 620 and the magnetic yokes 710 that face the first driving magnets 620 generate a magnetic attraction force F2 as a synthetic vector along the optical axis 1a when the movable unit 60 is in the neutral position. In the same way, the two magnetic attraction forces F1 produced between the pair of second driving magnets 621 and the magnetic yokes 711 that face the second driving magnets 621 also generate a magnetic attraction force F2 as a synthetic vector along the optical axis 1a when the movable unit 60 is in the neutral position. This force balance resembles the dynamic configuration of a balancing toy, and allows the movable unit 60 to rotate in three axis directions with good stability.

In this case, the direction of the magnetic attraction force F2, which is a synthetic vector of the two magnetic attraction forces F1 produced between the pair of first driving magnets 620 and the magnetic yokes 710, points opposite from the detecting unit 100 with respect to the plane including the axes 1b and 1c (see FIG. 1B). That is to say, a first synthetic vector (representing the magnetic attraction force F2), defined by synthesizing together two first vectors, pointing toward the magnetic yokes 710, of the magnetic attraction forces F1 between the pair of first driving magnets 620 and the pair of magnetic yokes 710, is directed toward the object to be driven (i.e., the camera unit 30) with respect to the plane including the axes 1b and 1c.

In the same way, the direction of the magnetic attraction force F2, which is a synthetic vector of the two magnetic attraction forces F1 produced between the pair of second driving magnets 621 and the magnetic yokes 711, also points opposite from the detecting unit 100 with respect to the plane including the axes 1b and 1c (see FIG. 1B). That is to say, a second synthetic vector (representing the magnetic attraction force F2), defined by synthesizing together two second vectors, pointing toward the magnetic yokes 711, of the magnetic attraction forces F1 between the pair of second driving magnets 621 and the pair of magnetic yokes 711, is directed toward the object to be driven (i.e., the camera unit 30) with respect to the plane including the axes 1b and 1c.

In this embodiment, the pair of first coil units 52, the pair of second coil units 53, the pair of first driving magnets 620, and the pair of second driving magnets 621 together form the driving unit 700. The driving unit 700 includes a first driving unit for rotating the movable unit 60 around the axis 1b, a second driving unit for rotating the movable unit 60 around the axis 1c, and a third driving unit for rotating the movable unit 60 around the optical axis 1a.

The first driving unit includes the pair of magnetic yokes 710 and pair of drive coils 720 of the pair of first coil units 52, and the pair of first driving magnets 620. The second driving unit includes the pair of magnetic yokes 711 and pair of drive coils 721 of the pair of second coil units 53, and the pair of second driving magnets 621. The third driving unit includes the pair of magnetic yokes 710 and pair of drive coils 730 of the pair of first coil units 52, the pair of magnetic yokes 711 and pair of drive coils 731 of the pair of second coil units 53, the pair of first driving magnets 620, and the pair of second driving magnets 621.

In this embodiment, the plurality of cables (i.e., forty cables) is grouped into four bundles of cables 11A, each consisting of ten cables, as described above. The four bundles of cables 11A are drawn outward from the center of movement of the movable unit 60 (i.e., from the center 510) out of the movable unit 60 (i.e., the camera holder 40) and then inserted into the fixed unit 70 (see FIGS. 8, 9A, and 9B). This allows the four bundles of cables to be arranged outside of the movable unit 60 and the fixed unit 70.

Figure 9A:
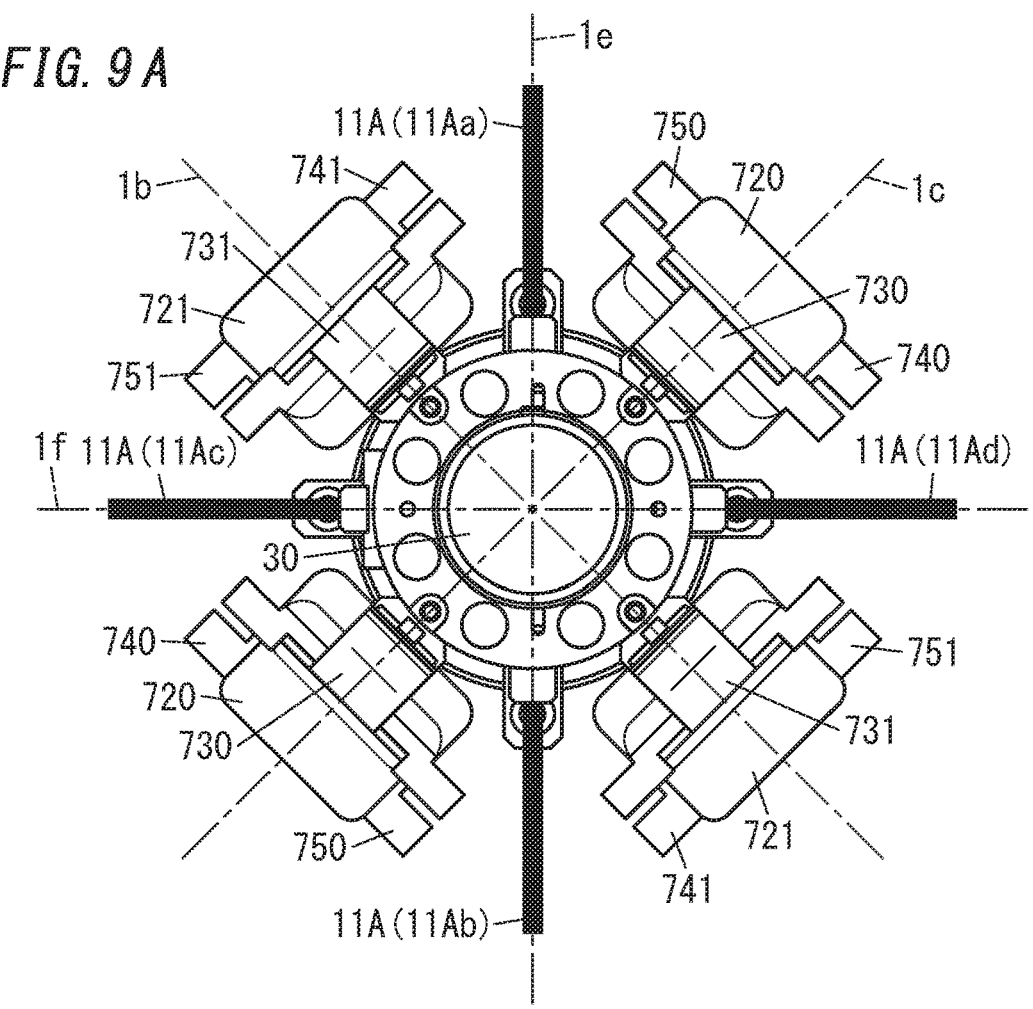
FIG. 9A is a plan view of the camera driver in a state where the body of the fixed unit, a first upper ring, and the second upper ring are removed therefrom.
Figure 9B:
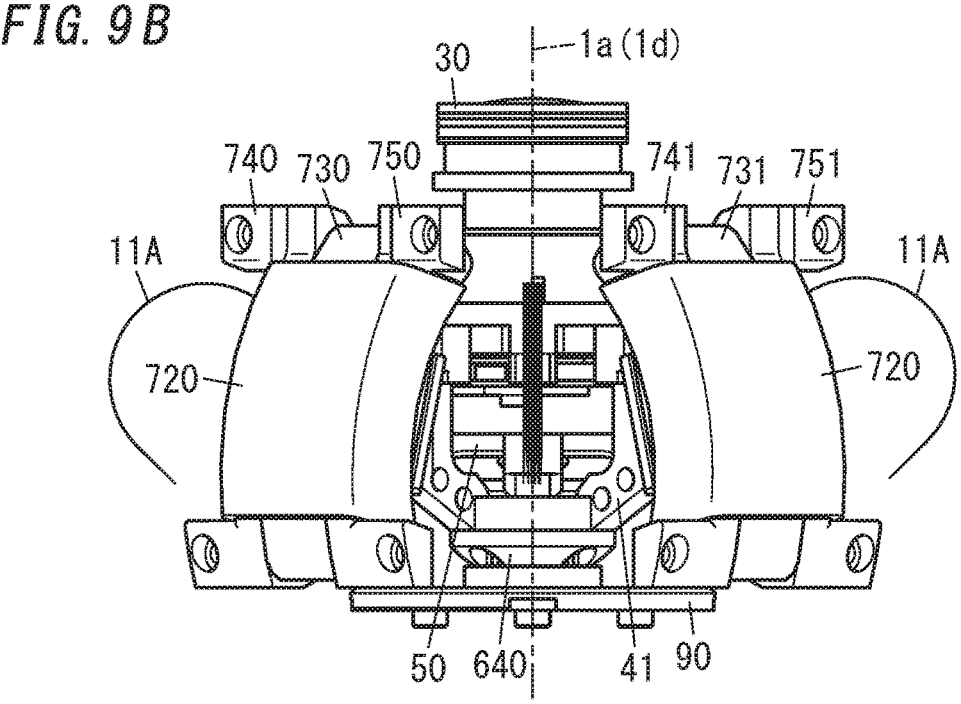
FIG. 9B is a front view thereof.
Figure 10:
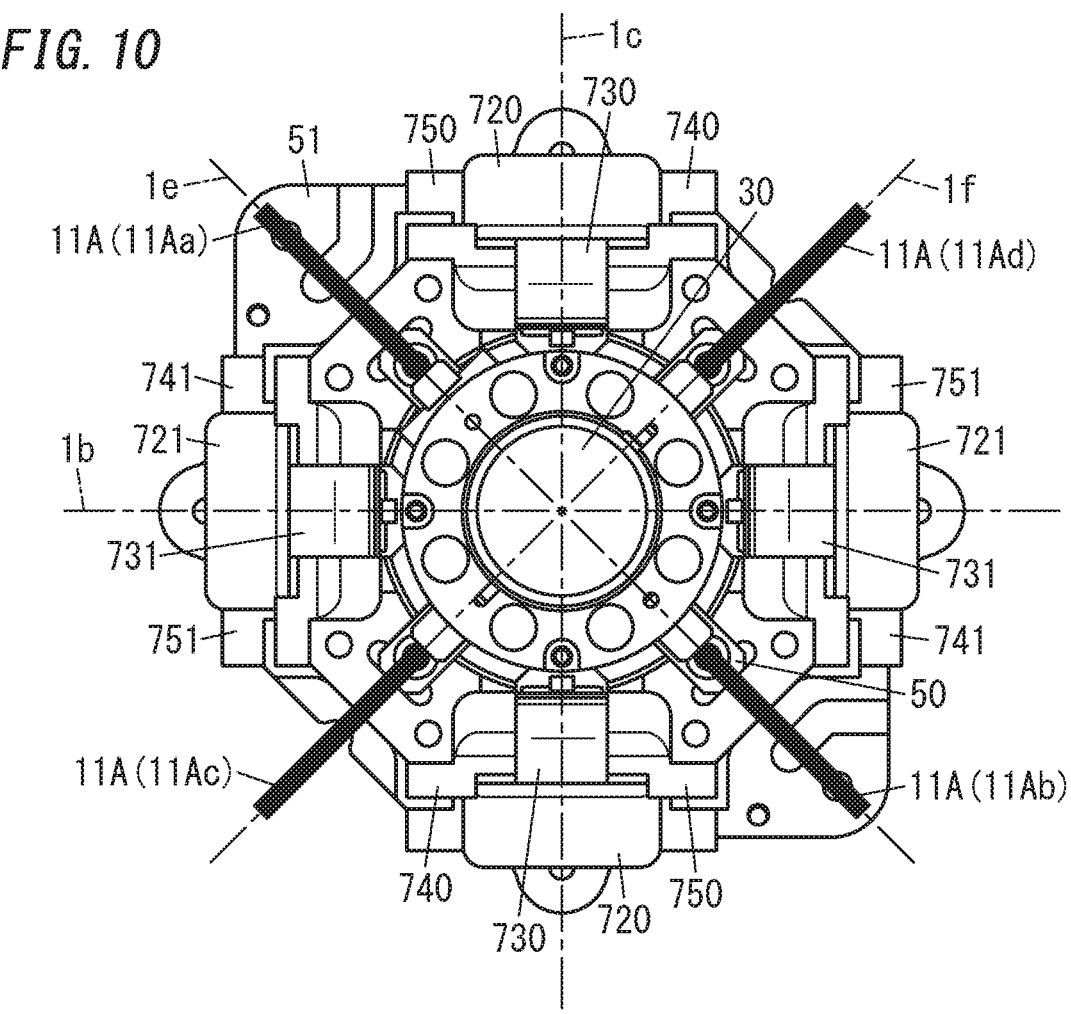
FIG. 10 is a plan view of the camera driver in a state where the first upper ring and the second upper ring are removed therefrom.

Some of the four bundles of cables 11A are arranged in any of the four spaces, defined by the arrangement of the first driving magnets 620 and the second driving magnets 621 (i.e., by the arrangement of the first coil units 52 and the second coil units 53) (see FIGS. 9A, 9B, and 10). Specifically, two bundles of cables 11A (namely, the bundles of cables 11Aa and 11Ab shown in FIGS. 9A and 10), among the four bundles of cables 11A, are arranged along an axis 1e, which intersects with the axes 1b and 1c at an angle of 45 degrees, when viewed from the camera unit 30. The two other bundles of cables 11A (namely, the bundles of cables 11Ac and 11Ad shown in FIGS. 9A and 10) are arranged along an axis 1f, which intersects with the axes 1b and 1c at an angle of 45 degrees, when viewed from the camera unit 30.

In addition, the four bundles of cables 11A are also drawn out so as to tilt toward a direction in which the camera unit 30 is arranged with respect to the plane including the axes 1b and 1c. The angle at which the four bundles of cables 11A are drawn out of the movable unit 60 is suitably approximately 45 degrees.

The body 51 of the fixed unit 70 includes four inlet portions 703 to which the four bundles of cables 11A are inserted (see FIG. 2). The four inlet portions 703 are arranged one to one in the four spaces defined by the arrangement of the pair of first coil units 52 and the pair of second coil units 53 (i.e., by the arrangement of the pair of first driving magnets 620 and the pair of second driving magnets 621) (see FIGS. 2 and 8). The four inlet portions 703 are provided for the body 51 so as to tilt toward a direction in which the camera unit 30 is arranged with respect to the plane including the axes 1b and 1c (see FIG. 8).

Each of the four inlet portions 703 includes a first member 704 and a second member 705 in a plate shape. The first member 704 has a groove on a surface that faces the second member 705. Each of the four bundles of cables 11A is inserted into the groove of the first member 704 of its associated inlet portion 703. After the bundle of cables 11A has been inserted into the first member 704, the bundle of cables 11A inserted is covered with the second member 705, which is then secured with screws onto the first member 704.

A portion (i.e., an exposed portion) of the cables drawn out of the movable unit 60 and then inserted into the fixed unit 70 has the same length in each of the four bundles of cables 11A.

Figure 11:
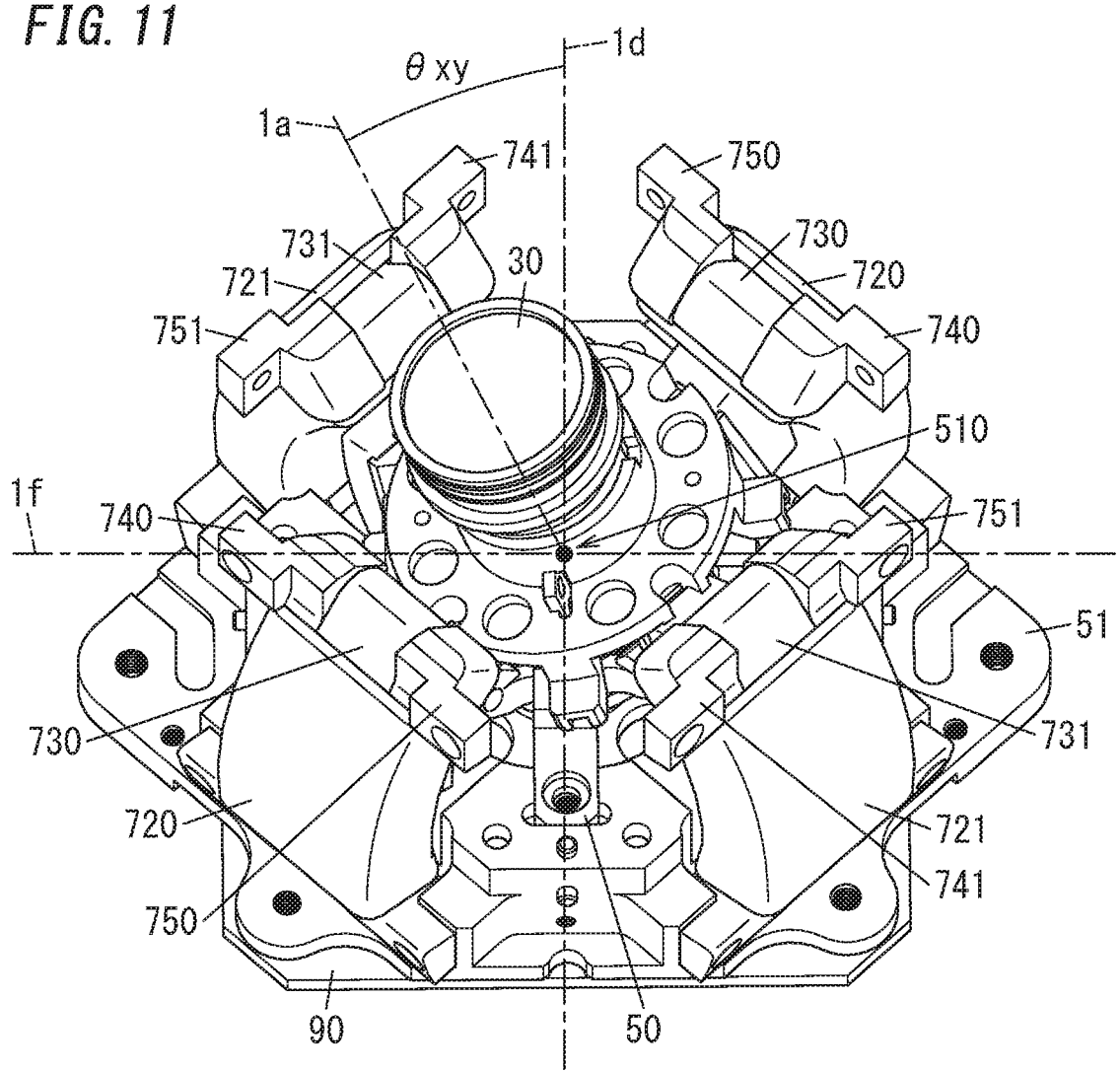
FIG. 11 is a perspective view of the camera driver 10 in which the movable unit thereof has rotated.

The camera driver 10 of this embodiment is able to rotate the movable unit 60 two-dimensionally by simultaneously energizing the pair of drive coils 720 and the pair of drive coils 721. FIG. 11 is a perspective view illustrating a state where the movable unit 60 has been rotated around the axis 1b and around the axis 1c by an angle θxy from the axis 1d toward the axis 1f by simultaneously energizing the pair of drive coils 720 and the pair of drive coils 721.

The range defined by the angle θxy (i.e., a movable range) depends on the positional relationship between the center of the second loosely fitting member 501 (i.e., the center 510) and the recess of the first loosely fitting face 670. According to this embodiment, defining the center of the second loosely fitting member 501 (i.e., the center 510) outside of the recess of the first loosely fitting face 670 ensures a wide movable range for the movable unit 60 as described above. Controlling the positional relationship between the center of the second loosely fitting member 501 (i.e., the center 510) and the recess of the first loosely fitting face 670 makes the movable range of the movable unit 60 adjustable. The movable range (defined by the angle θxy) of the movable unit 60 is suitably a range from 0 degrees to 45 degrees. The movable range is more suitably a range from 20 degrees to 30 degrees, and is most suitably 25 degrees.

In addition, the camera driver 10 is also able to rotate (i.e., roll) the movable unit 60 around the optical axis 1a by simultaneously energizing the pair of drive coils 730 and the pair of drive coils 731.

Next, it will be described with reference to FIGS. 1B, 12A, and 12B how the rotation of the camera unit 30 changes the positional relationship between the movable unit 60 and the detecting unit 100.

FIG. 12A is a plan view illustrating a state where the movable unit 60 has been rotated around the axis 1c by energizing the pair of drive coils 721. FIG. 12B is a cross-sectional view illustrating a state where the movable unit 60 has been rotated around the axis 1c by energizing the pair of drive coils 721. Note that illustration of the second upper ring 21 is omitted in FIGS. 12A and 12B.

If the movable unit 60 has rotated around the axis 1c as shown in FIG. 12A, then the center portion of one (i.e. the second driving magnet 621 (621a)) of the pair of second driving magnets 621 (621a, 621b) moves toward the detecting unit 100 with respect to a plane including the center 510 (see FIG. 12B).

The respective L-shaped fixing portions of the movable base 41 tilt toward a direction in which the camera unit 30 is arranged with respect to a plane including the disk portion of the movable base 41. Thus, the L-shaped fixing portion fixing the second driving magnet 621a does not move from the upper surface 51a of the body 51 of the fixed unit 70 toward the magnetic sensor 92. That is to say, one, located closer to the detecting unit 100, of the two ends of the second driving magnet 621a does not move to reach a position between the position detecting magnet 650 and the magnetic sensor 92.

Likewise, even if the movable unit 60 has rotated around the axis 1b, one, located closer to the detecting unit 100, of the two ends of the first driving magnet 620 does not move to reach a position between the position detecting magnet 650 and the magnetic sensor 92, either.

Therefore, even after the movable unit 60 has rotated, there are less chances of the detecting unit 100 being affected by the magnetic force of the pair of first driving magnets 620 or the magnetic force of the pair of second driving magnets 621. That is to say, even after the movable unit 60 has rotated, the detecting unit 100 is still able to detect the rotational position of the camera unit 30 more accurately.

In addition, as described above, even after the movable unit 60 has rotated, one, located closer to the detecting unit 100, of the two ends of the first driving magnets 620 (or the second driving magnets 621) does not move to reach a position between the position detecting magnet 650 and the magnetic sensor 92. Thus, even if the movable unit 60 has rotated around the axis 1b, the magnetic attraction force F2 is still directed opposite from the detecting unit 100 with respect to the plane including the axes 1b and 1c (see FIG. 1B). Likewise, even if the movable unit 60 has rotated around the axis 1c, the magnetic attraction force F2 is also directed opposite from the detecting unit 100 with respect to the plane including the axes 1b and 1c (see FIG. 1B).

Essentials of First Embodiment (1.1) An actuator (such as a camera driver 10) includes a movable unit 60, a fixed unit 70, a driving unit 700, and a detecting unit 100. The movable unit 60 holds an object to be driven (such as a camera unit 30) thereon. The fixed unit 70 allows the movable unit 60 to be fitted thereto by providing a gap between itself and the movable unit 60. The driving unit 700 makes the movable unit 60 electromagnetically drivable and rotatable with respect to the fixed unit 70. The detecting unit 100 includes a position detecting magnet 650 held by the movable unit 60 and a magnetic sensor 92. The magnetic sensor 92 detects rotation of the movable unit 60 based on a variation in magnetism caused by allowing the position detecting magnet 650 to rotate as the movable unit 60 rotates. A center 510 of rotation of the movable unit 60 is located on a fitting direction in which the movable unit 60 is fitted into the fixed unit 70. The driving unit 700 includes a pair of first driving magnets 620, a pair of first magnetic yokes (magnetic yokes 710), a pair of first drive coils (drive coils 720) wound around the pair of first magnetic yokes, a pair of second driving magnets 621, a pair of second magnetic yokes (magnetic yokes 711), and a pair of second drive coils (drive coils 721) wound around the pair of magnetic yokes 711. The pair of first driving magnets 620 is provided for the movable unit 60 on a plane including a first axis (axis 1c), which is perpendicular to a fitting direction and passes through the center 510, and the fitting direction. The pair of magnetic yokes 710 is provided for the fixed unit 70 to face the pair of first driving magnets 620. The pair of second driving magnets 621 is provided for the movable unit 60 on a plane including a second axis (axis 1b), which is perpendicular to the fitting direction and the first axis and passes through the center 510, and the fitting direction. The pair of second magnetic yokes is provided for the fixed unit 70 to face the pair of second driving magnets 621. When the movable unit 60 is in a neutral position in which the movable unit 60 has rotated around neither the first axis nor the second axis, a synthetic vector of magnetic attraction forces F1 between the pair of first driving magnets 620 and the pair of first magnetic yokes, and a synthetic vector of the magnetic attraction forces F1 between the pair of second driving magnets 621 and the pair of second magnetic yokes are directed toward the opposite side from the detecting unit 100 with respect to a plane including the first axis and the second axis.

In a camera driver serving as a conventional actuator, each driving magnet is located in a space between a detecting unit for having a magnetic sensor detect the (angle of) rotation and the center of rotation. Thus, the magnetic force of the driving magnet is likely to affect the magnetic sensor of the detecting unit. This increases the chances of the detecting unit's failing to detect an accurate angle of rotation of an object to be driven such as a camera.

According to this configuration (1.1), when the movable unit 60 is in a neutral position, the magnetic attraction force F2, which is a synthetic vector of the magnetic attraction forces F1 between the pair of first driving magnets 620 and the pair of first magnetic yokes, is generated on the opposite side from the detecting unit 100 with respect to a plane including an axis 1b and an axis 1c. Likewise, when the movable unit 60 is in the neutral position, the magnetic attraction force F2, which is the synthetic vector of the magnetic attraction forces F between the pair of second driving magnets 621 and the pair of second magnetic yokes, is also generated on the opposite side from the detecting unit 100 with respect to the plane including the axis 1b and the axis 1c. Thus, compared to a situation where the magnetic attraction force F2 as a synthetic vector is generated on the same side as the detecting unit 100 with respect to the plane including the axis 1b and the axis 1c, the effect of the magnetic forces of the pair of first driving magnets 620 and the magnetic forces of the pair of second driving magnets 621 on the detecting unit 100 is less significant. This allows the camera driver 10 of this embodiment to more accurately detect the angle of rotation of the object to be driven that has rotated.

(1.2) In the actuator of (1.1), in a range where the movable unit 60 is rotatable around both of the first axis and the second axis, the synthetic vector defined between the pair of first driving magnets 620 and the pair of first magnetic yokes and the synthetic vector defined between the pair of second driving magnets 621 and the pair of second magnetic yokes are directed toward the opposite side from the detecting unit 100 with respect to the plane including the first axis and the second axis.

According to this configuration (1.2), even if the movable unit 60 has rotated, the effect of the magnetic forces of the pair of first driving magnets 620 and the magnetic forces of the pair of second driving magnets 621 on the detecting unit 100 is insignificant. This allows the camera driver 10 of this embodiment to more accurately detect, even if the movable unit 60 has rotated, the angle of rotation of the object to be driven (such as the camera unit 30) that has rotated.

(1.3) In the actuator of (1.1) or (1.2), when the movable unit 60 is in the neutral position, respective directions of the vectors representing the magnetic attraction forces F1 between the pair of first driving magnets 620 and the pair of first magnetic yokes and respective directions of the vectors representing the magnetic attraction forces F1 between the pair of second driving magnets 621 and the pair of second magnetic yokes are tilted with respect to the plane including the first axis and the second axis.

According to this configuration (1.3), compared to a situation where the magnetic attraction force is generated on the same side as the detecting unit 100 with respect to the plane including the axis 1b and the axis 1c, the effect of the magnetic forces of the pair of first driving magnets 620 and the magnetic forces of the pair of second driving magnets 621 on the detecting unit 100 is less significant. This allows the camera driver 10 according to this embodiment to more accurately detect the angle of rotation of the object to be driven (such as the camera unit 30) that has rotated.

(1.4) In the actuator of any one of (1.1) to (1.3), each of respective faces of the pair of first driving magnets 620 and the pair of first magnetic yokes that face each other is an arc-shaped curved face with a center of arc defined by the center 510 of rotation, and each of respective faces of the pair of second driving magnets 621 and the pair of second magnetic yokes that face each other is an arc-shaped curved face with a center of arc defined by the center 510 of rotation.

This configuration (1.4) makes the gap between an associated pair of first driving magnet 620 and magnetic yoke 710 and the gap between an associated pair of second driving magnet 621 and magnetic yoke 711 both constant. This allows, even if the movable unit 60 has rotated, the respective gaps to be kept constant.

(1.5) In the actuator of any one of (1.1) to (1.4), the fixed unit 70 includes, between the position detecting magnet 650 held by the movable unit 60 and the magnetic sensor 92, a stopper member 80 configured to prevent the movable unit 60 from falling off.

This configuration (1.5) substantially prevents the movable unit 60 from falling off.

(1.6) In the actuator of (1.5), the stopper member 80 is non-magnetic.

This configuration (1.6) allows the detecting unit 100 to detect, even if the stopper member 80 is provided between the position detecting magnet 650 and the magnetic sensor 92, the rotation of the movable unit 60 accurately.

(1.7) In the actuator of any one of (1.1) to (1.6), the movable unit 60 includes a body 601 provided with a plurality of arms to mount the pair of first driving magnets 620 and the pair of second driving magnets 621 thereon, and the body 601 includes a counterweight (bottom plate 640) on the same side as the detecting unit 100 with respect to the plane including the first axis and the second axis.

This configuration (1.7) allows the camera driver 10 to bring the center 510 of rotation into agreement with the center of gravity of the movable unit 60. This reduces the moment of rotation of the movable unit 60 around the axis 1b and the moment of rotation of the movable unit 60 around the axis 1c, thus allowing the movable unit 60 to maintain the neutral position, or rotate around the axis 1b or 1c, with less driving force. This reduces the power consumption of the camera driver 10.

(1.8) In the actuator of (1.7), the counterweight is non-magnetic.

This configuration (1.8) allows the detecting unit 100 to accurately detect the rotation of the movable unit 60 without being affected by the bottom plate 640.

(1.9) In the actuator of any one of (1.1) to (1.8), a pair of third drive coils (drive coils 730 and 731) configured to rotate the movable unit 60 around the fitting direction is wound around the pair of first magnetic yokes and the pair of second magnetic yokes.

This configuration (1.9) allows the camera driver 10 to electromagnetically drive (i.e., roll) the movable unit 60 (e.g., the camera unit 30) in rotation around the fitting direction (i.e., around the optical axis 1a).

(1.10) The actuator of any one of (1.1) to (1.9) further includes, as the object to be driven, the camera unit 30. The camera unit 30 is provided on the opposite side from the detecting unit 100 with respect to the plane including the first axis and the second axis.

This configuration (1.10) allows the camera driver 10 to more accurately detect the angle of rotation of the camera unit 30 that has rotated.

(2) Second Embodiment

A second embodiment will be described with reference to FIGS. 13A-20. The following description of the second embodiment will be focused on a configuration related to cabling applicable to the camera driver 10 described above. In the following description, any constituent member of the second embodiment having the same function as the counterpart of the first embodiment described above will be designated by the same reference sign as that counterpart's, and description thereof will be omitted as appropriate herein. Note that the second embodiment will be described with the second upper ring 21, described for the first embodiment, removed. Since the second embodiment will be described as if the second upper ring 21 were nonexistent, the first upper ring 20 will be hereinafter simply referred to as the "upper ring 20" in the following description of the second embodiment.

Figure 13A:
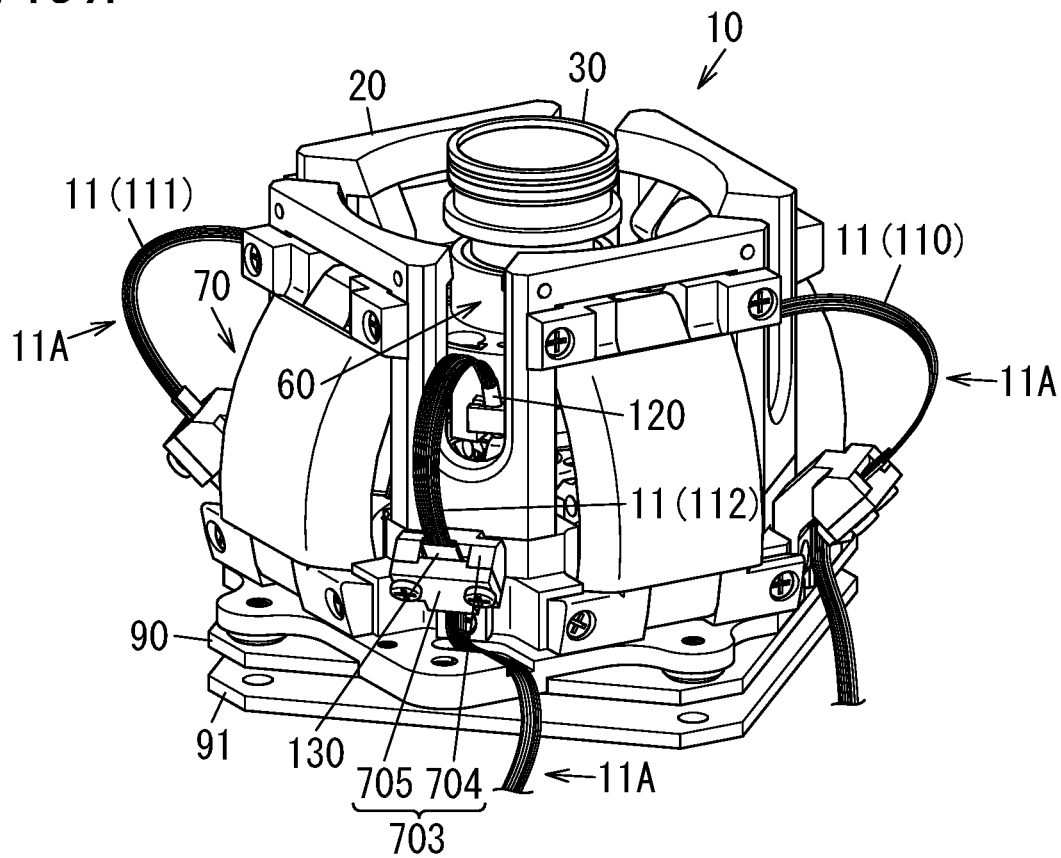
FIG. 13A is a perspective view, as viewed from above, of a camera driver according to a second embodiment of the present invention.
Figure 13B:
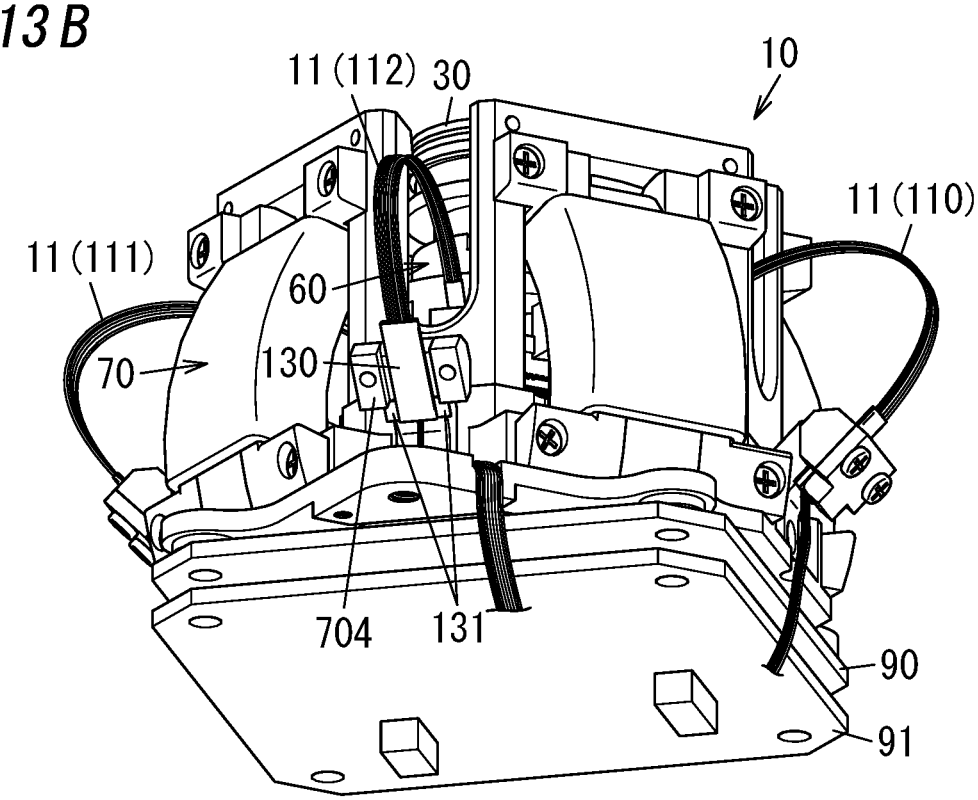
FIG. 13B is a perspective view, as viewed from below, of the camera driver, from which a second member thereof is removed.
Figure 14:
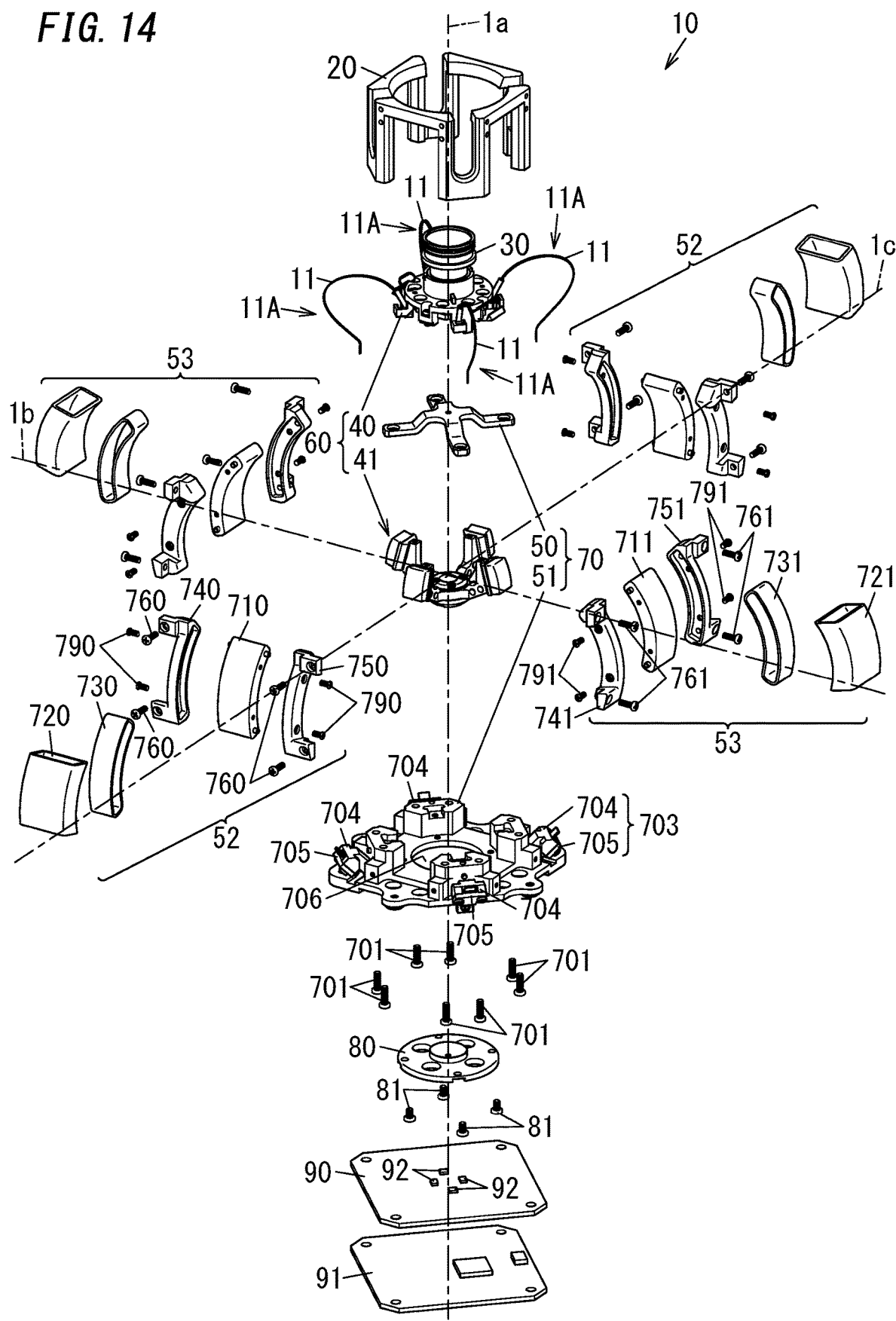
FIG. 14 is an exploded perspective view of the camera driver.

As shown in FIGS. 13A and 14, the camera driver 10 includes a plurality of cables 11, the upper ring 20, the camera unit 30, the movable unit 60, the fixed unit 70, the stopper member 80, and printed circuit boards 90 and 91.

Figure 19A:
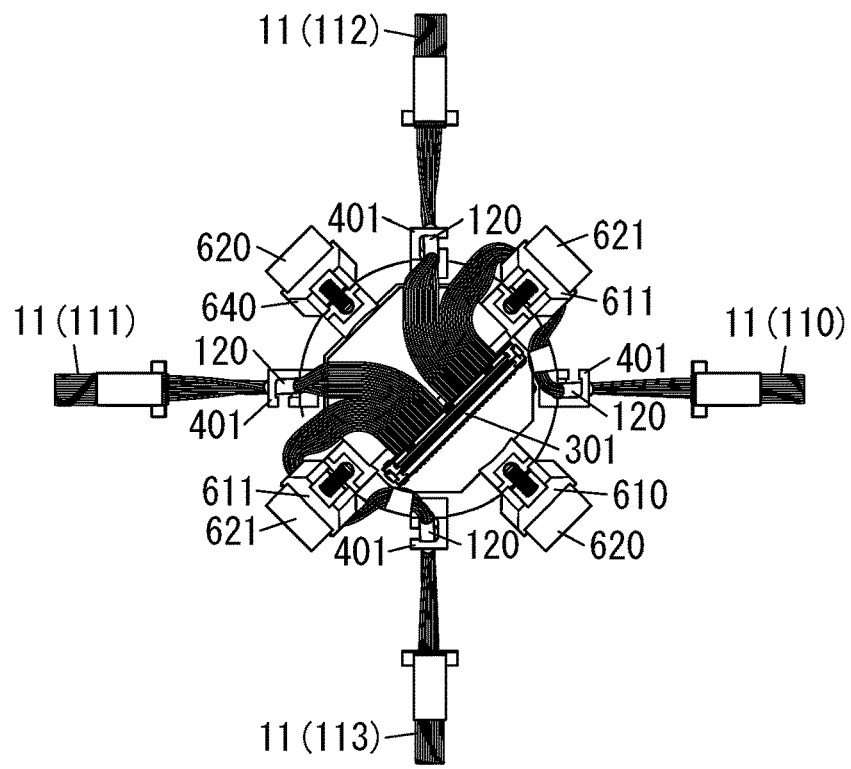
FIG. 19A is a bottom view of the camera driver in which the camera unit and the camera holder are assembled together.

The plurality of cables 11 are connected to a connector 301, which is electrically connected to the camera unit 30 (see FIG. 19A). The camera unit 30 transmits an electrical signal generated by the low voltage differential signaling (LVDS) method through the plurality of cables 11 toward an image processor circuit 15 (an exemplary external circuit), which is provided outside of the camera driver (see FIG. 20). In this embodiment, the plurality of cables 11 are also fine-line coaxial cables, each having the same length, as in the first embodiment described above, and the number of the cables provided is also forty. Note that the LVDS method is only an example and should not be construed as limiting. Likewise, the number of cables provided (e.g., forty) is also only an example and should not be construed as limiting.

The plurality of cables 11 (forty cables) is grouped into four bundles of cables 11A, each consisting of ten cables. Each of the four bundles of cables 11A is provided with a first clamp 120, which is located closer to the center of the bundle than one end thereof connected to the connector 301, and a second clamp 130, which is located closer to the center of the bundle than the other end thereof (see FIGS. 18A and 18B). A portion, located between the first and second clamps 120 and 130, of each of the four bundles of cables 11A will be hereinafter referred to as a flexible portion 110, 111, 112, or 113. These flexible portions 110-113 are as long as each other.

The movable unit 60 of this embodiment also includes, as in the first embodiment, the camera holder 40 and the movable base 41 (see FIG. 14). The movable unit 60 is rotatable around the optical axis 1a, around the axis 1c, and around the axis 1b with respect to the fixed unit 70.

The fixed unit 70 also includes, as in the first embodiment, the coupling member 50 and the body 51 (see FIG. 14).

The fixed unit 70 also includes, as in the first embodiment, the pair of first coil units 52 and the pair of second coil units 53 (see FIG. 14).

The pair of first coil units 52 each include, as in the first embodiment, the magnetic yoke 710, the drive coils 720 and 730, and the magnetic yoke holders 740 and 750 (see FIG.

14). After each drive coil 730 has been wound around its associated magnetic yoke 710, the magnetic yoke holders 740 and 750 are secured with four screws 790 onto the magnetic yoke 710 on both sides thereof (see FIG. 14). The pair of first coil units 52 are each secured with four screws 760 onto the upper ring 20 and the body 51 (see FIGS. 14 and 16B).

The pair of second coil units 53 each include, as in the first embodiment, the magnetic yoke 711, the drive coils 721 and 731, and the magnetic yoke holders 741 and 751 (see FIG. 14).

After each drive coil 731 has been wound around its associated magnetic yoke 711, the magnetic yoke holders 741 and 751 are secured with four screws 791 onto the magnetic yoke 711 on both sides thereof (see FIG. 14). The pair of second coil units 53 are each secured with four screws 761 onto the upper ring 20 and the body 51 (see FIGS. 14 and 16B).

The upper ring 20 sandwiches the camera unit 30, fixed onto the movable unit 60, between itself and the body 51 and is secured with eight screws 701 onto the body 51 (see FIG. 14).

The stopper member 80 is secured with four screws 81 onto the other side, opposite from the side to which the coupling member 50 is secured, of the body 51, so as to close an opening 706, as shown in FIG. 14.

On each of the printed circuit boards 90 and 91, assembled are a plurality of (e.g., four) magnetic sensors 92 for detecting a rotational position of the camera unit 30, a circuit for controlling the amount of a current allowed to flow through the drive coils 720, 721, 730, and 731, and other components. In this embodiment, the magnetic sensors 92 may be Hall elements, for example, as in the first embodiment.

Next, the configuration of the movable base 41 will be described.

The movable base 41 has a loosely fitting space, and supports the camera unit 30 thereon. The movable base 41 includes, as in the first embodiment, the body 601, the first loosely fitting member 602, the pair of first magnetic back yokes 610, the pair of second magnetic back yokes 611, the pair of first driving magnets 620, and the pair of second driving magnets 621 (see FIG. 15). The movable base 41 further includes the bottom plate 640 and the position detecting magnet 650 (see FIG. 15).

The body 601 includes, as in the first embodiment, the disk portion and the four fixing portions (L-shaped fixing portions) protruding from the outer periphery of the disk portion toward the camera unit 30 (i.e., upward). The respective tips, protruding toward the camera unit 30 (i.e., upward), of the four L-shaped fixing portions are secured with screws 410 onto the camera holder 40 (see FIG. 15).

Figure 15:
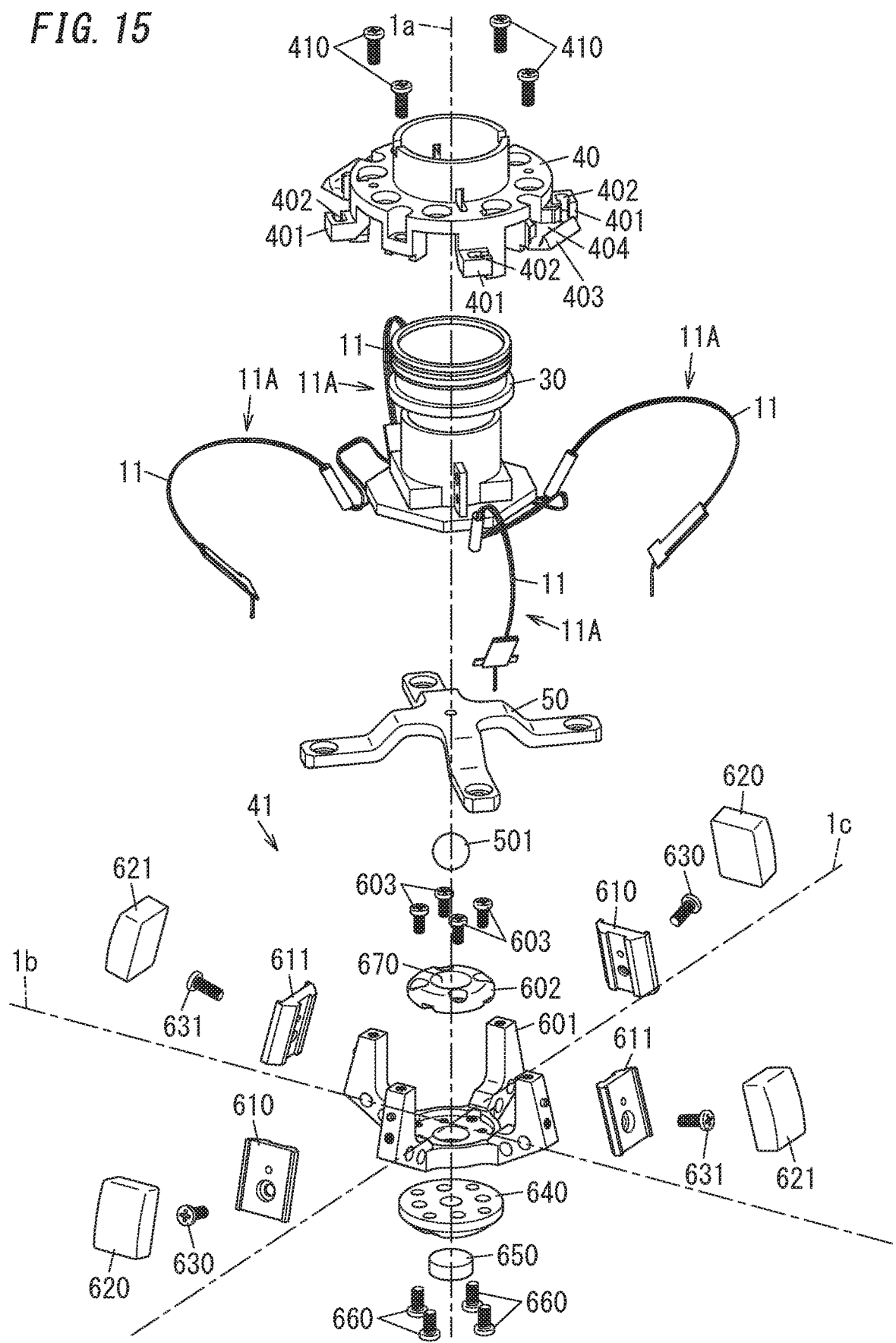
FIG. 15 is an exploded perspective view of a movable unit as a constituent member of the camera driver.
Figure 17A:
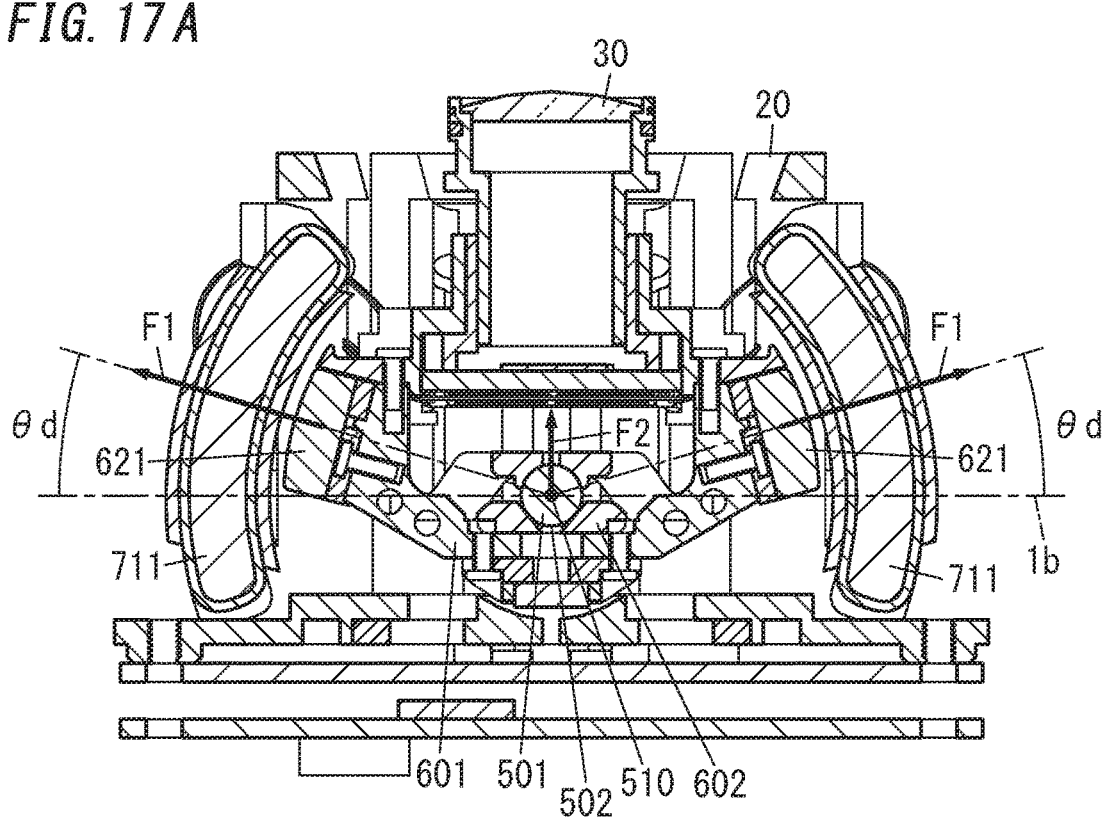
FIG. 17A is a cross-sectional view, taken along a plane X-X, of the camera driver.
Figure 17B:
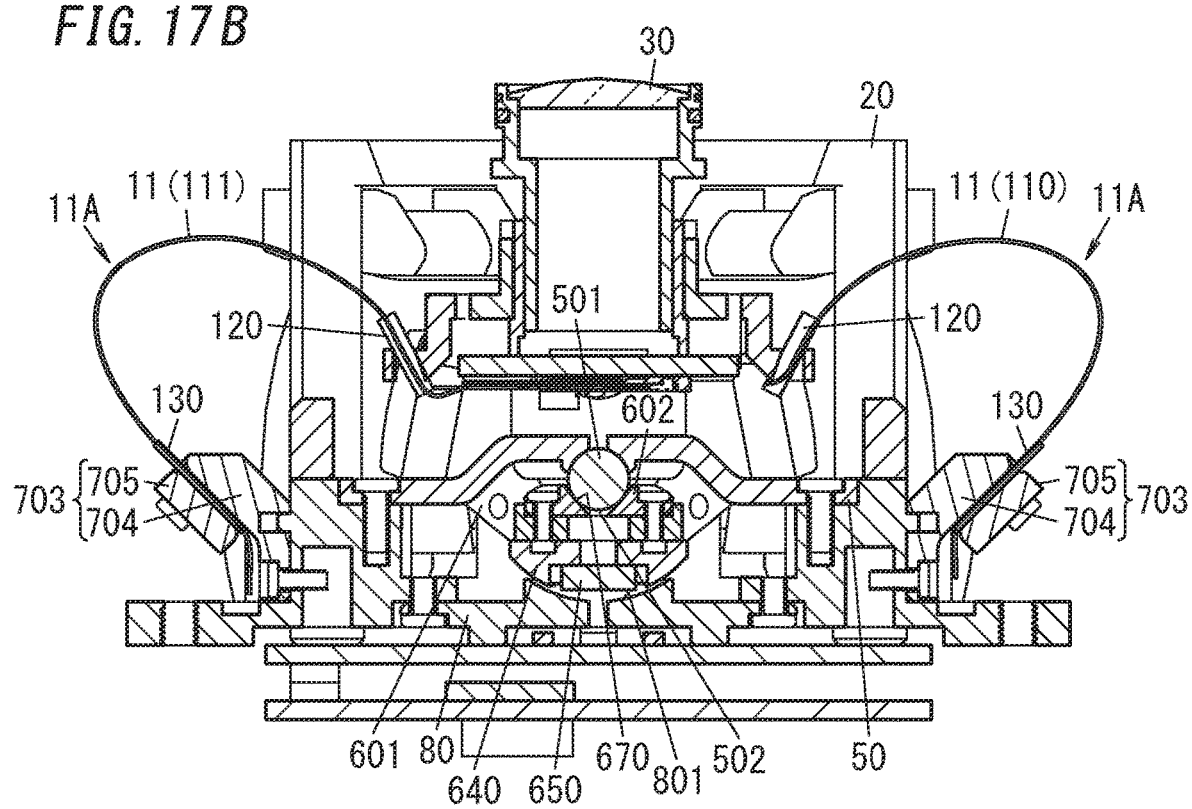
FIG. 17B is a cross-sectional view, taken along a plane Z-Z, of the camera driver.

As in the first embodiment, the first loosely fitting member 602 has, as the first loosely fitting face 670, an inner peripheral face of the through hole in the tapered shape (see FIGS. 15 and 17B). The first loosely fitting member 602 is secured with four screws 603 onto the disk portion of the body 601 such that the first loosely fitting face 670 is exposed to the loosely fitting space as shown in FIG. 15.

The pair of first magnetic back yokes 610 are secured with a pair of screws 630 onto the two L-shaped fixing portions facing the pair of first coil units 52 (see FIG. 15). The pair of second magnetic back yokes 611 are secured with a pair of screws 631 onto the two L-shaped fixing portions facing the pair of second coil units 53 (see FIG. 15).

As in the first embodiment, the pair of first driving magnets 620 are each provided one to one for an associated one of the pair of first magnetic back yokes 610, and the pair of second driving magnets 621 are each provided one to one for an associated one of the pair of second magnetic back yokes 611.

The bottom plate 640 is a non-magnetic member and may be made of brass, for example. The bottom plate 640 also defines, as in the first embodiment, the bottom of the movable unit 60 (i.e., the bottom of the movable base 41). The bottom plate 640 is secured with four screws 660 onto the body 601 as shown in FIG. 15, and serves as a counterweight.

The position detecting magnet 650 is provided for a center portion of an exposed surface of the bottom plate 640.

As in the first embodiment, the printed circuit board 90 is provided with the four magnetic sensors 92. The four magnetic sensors 92 calculate, as in the first embodiment, two-dimensional angles of rotation with respect to the axes 1b and 1c. In addition, the camera driver 10 further includes, as in the first embodiment, another magnetic sensor for detecting the rotation of the movable unit 60 (i.e., the rotation of the camera unit 30) around the optical axis 1a. Note that the sensor for detecting the rotation around the optical axis 1a does not have to be a magnetic sensor but may also be a gyro sensor, for example.

The coupling member 50 includes, as in the first embodiment, the second loosely fitting member 501 in a spherical shape (see FIG. 15). The second loosely fitting member 501 has a second loosely fitting face 502 with a raised spherical surface (see FIGS. 17A and 17B). The first loosely fitting face 670 of the first loosely fitting member 602 is brought into point or line contact with, and fitted with a narrow gap left into, the second loosely fitting face 502 of the second loosely fitting member 501. This allows the coupling member 50 to pivotally support the movable unit 60 so as to make the movable unit 60 freely rotatable, as in the first embodiment.

The stopper member 80 has, as in the first embodiment, the recessed inner peripheral face 801 (see FIG. 17B), and is secured onto the body 51 so as to cover the position detecting magnet 650. A gap is left between the recessed inner peripheral face of the stopper member 80 and the bottom of the bottom plate 640. The recessed inner peripheral face of the stopper member 80 and the outer peripheral face of the bottom of the bottom plate 640 have curved faces that face each other. In this case, a gap is also left between the recessed inner peripheral face 801 of the stopper member 80 and the position detecting magnet 650.

Note that the position detecting magnet 650 is suitably arranged inside the outer periphery of the bottom of the bottom plate 640.

In this embodiment, the pair of first driving magnets 620 serves as attracting magnets, thus producing magnetic attraction forces between the pair of first driving magnets 620 and the magnetic yokes 710 that face the first driving magnets 620. Likewise, the pair of second driving magnets 621 also serves as attracting magnets, thus producing magnetic attraction forces between the pair of second driving magnets 621 and the magnetic yokes 711 that face the second driving magnets 621. The magnetic attraction forces have already been described for the first embodiment, and description thereof will be omitted herein.

Figure 16A:
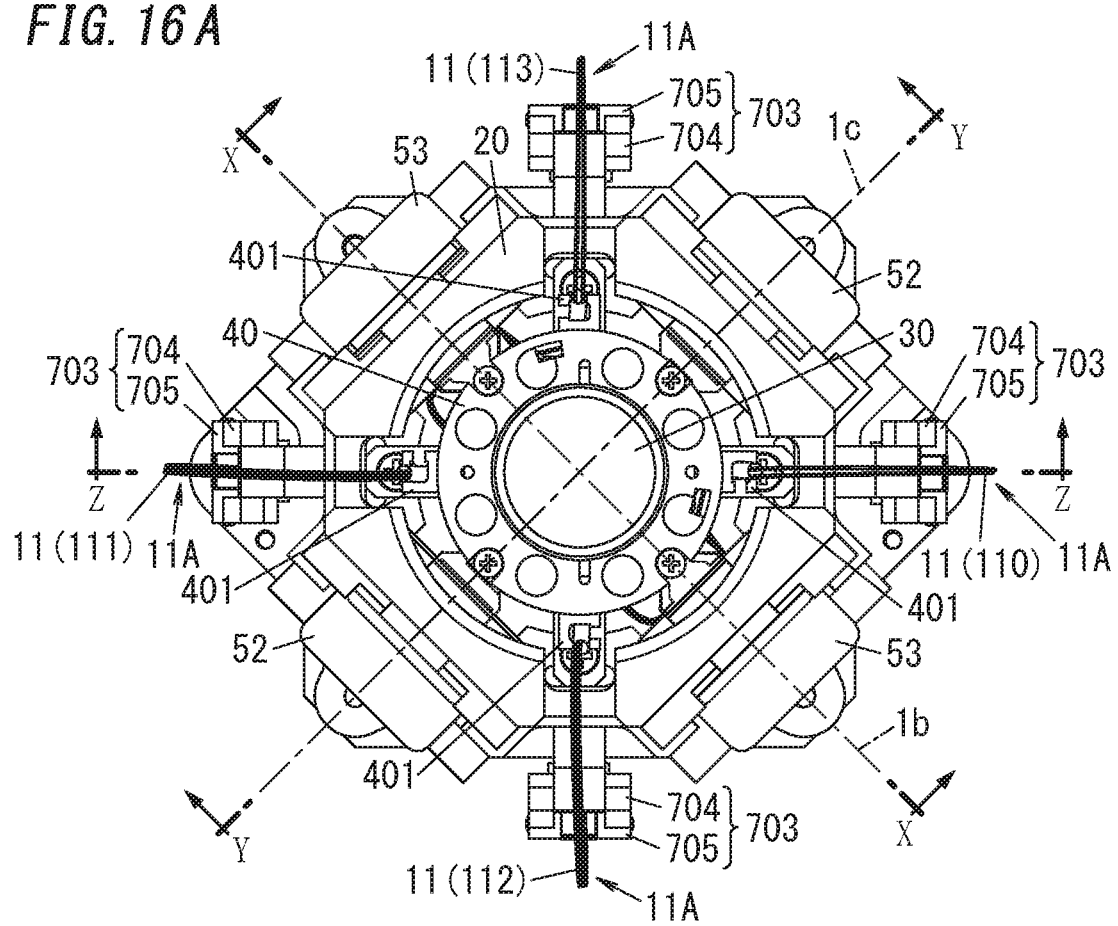
FIG. 16A is a plan view of the camera driver.
Figure 16B:
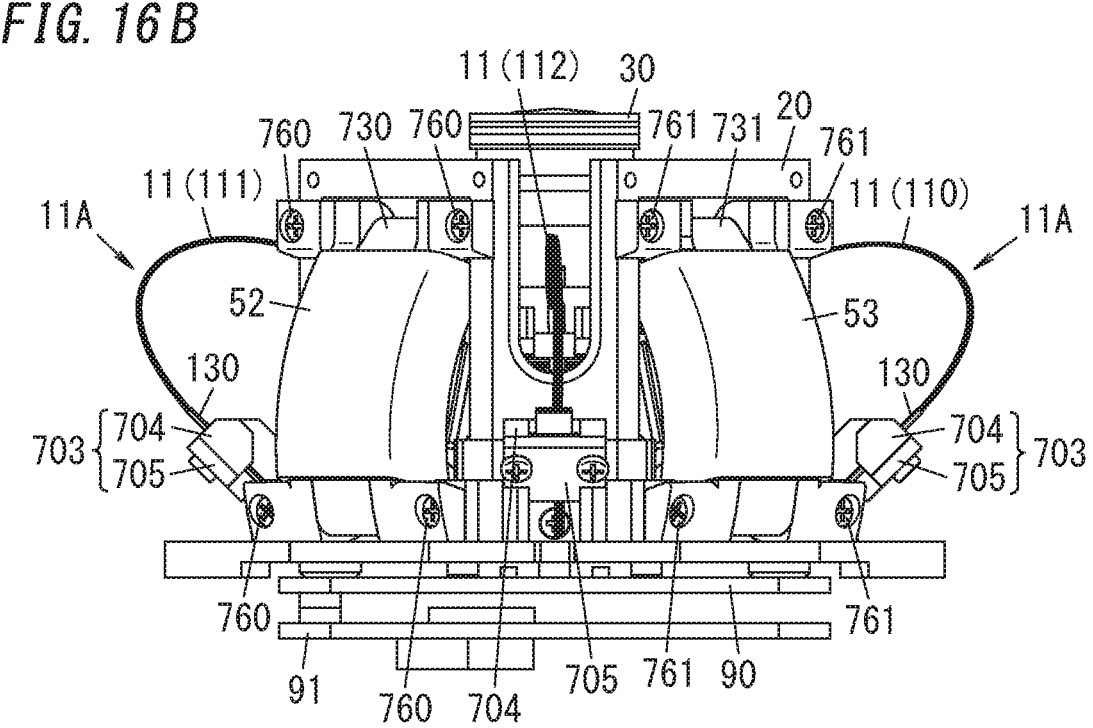
FIG. 16B is a front view of the camera driver.

In this embodiment, the four bundles of cables 11A are also drawn, as in the first embodiment, outward from the center of movement of the movable unit 60 (i.e., from the center of the second loosely fitting member 501) out of the movable unit 60 (i.e., the camera holder 40) and then inserted into the fixed unit 70 (see FIGS. 16A, 16B, and 17B). This allows the four bundles of cables 11A (specifically, the flexible portions 110-113 thereof) to be arranged and bent outside of the movable unit 60 and the fixed unit 70.

The camera holder 40 includes four outlet portions 401 for guiding and drawing out the four bundles of cables 11A into the gap between the pair of first driving magnets 620 and the pair of second driving magnets 621 and the camera unit 30 (see FIG. 16A). The four outlet portions 401 are arranged, one to one, in the four spaces defined by the arrangement of the pair of first driving magnets 620 and the pair of second driving magnets 621 (i.e., by the arrangement of the pair of first coil units 52 and the pair of second coil units 53) (see FIGS. 16A, 18A, and 18B). Specifically, the four outlet portions 401 are each arranged to define an angle of 90 degrees with respect to their adjacent outlet portions 401 (see FIG. 16A).

Each outlet portion 401 has, on one surface thereof, an opening 402 running from the top through the bottom thereof. An associated bundle of cables 11A is passed through each opening 402 (see FIG. 15). Each of the four bundles of cables 11A is passed through the opening 402 of an associated one of the outlet portions 401 from the printed circuit board 90 toward the camera unit 30 such that the first clamp 120 comes into contact with the inner periphery of the opening 402. The first clamp 120 is bonded with adhesive onto (the outlet portion 401 of) the movable unit 60. In this embodiment, the first clamp 120 may be configured as, for example, an adhesive tape for packing or binding. For each of the four bundles of cables 11A, an adhesive tape is wound, as the first clamp 120, around the bundle of cables 11A depending on the length from the connector 301 through an associated one of the outlet portions 401. Also, each of the flexible portions 110-113 drawn out from an associated outlet portion 401 toward the camera unit 30 suitably defines an angle of approximately 45 degrees with respect to a plane including the axes 1b and 1c. Optionally, the gap between each opening 402 and an associated first clamp 120 may also be filled with an elastic resin material instead of the adhesive.

The body 51 of the fixed unit 70 includes, as in the first embodiment, the four inlet portions 703 (see FIG. 16A).

Each of the four inlet portions 703 includes, as in the first embodiment, the first member 704 and the second member 705 in a plate shape. The first member 704 has a groove on a surface that faces the second member 705. The second clamp 130 of each of the four bundles of cables 11A is inserted into the groove of the first member 704 of its associated inlet portion 703. In this embodiment, the second clamp 130 may be configured, for example, as an adhesive tape for packing or binding, and binds the cables 11 together in a state where those cables are arranged in line (i.e., in a flat shape) such that the cables 11 being bound together do not protrude out of the groove of the first member 704 (see FIGS. 13A and 13B). In addition, each of the second clamps 130 has a pair of raised movement regulating portions 131 at one end thereof. That is to say, the second clamp 130 has a T-shape. Each pair of movement regulating portions 131 abuts on an associated inlet portion 703, thus preventing the bundle of cables 11A, bound together by the second clamp 130, from moving along the groove (i.e., in the inserting and removing directions). After the bundle of cables 11A has been inserted into the first member 704, the bundle of cables 11A inserted is covered with the second member 705, which is then secured with screws onto the first member 704.

As described above, in the four bundles of cables 11A, the flexible portions 110-113 thereof, running from the first clamp 120 through the second clamp 130, have the same length. Also, the four outlet portions 401 have the same shape and the four inlet portions 703 have the same shape. Thus, when the camera unit 30 is in the neutral position, the flexible portions 110-113 have the same (curved) shape from a point where the flexible portions 110-113 are drawn out of the movable unit 60 through a point where the flexible portions 110-113 are inserted into the fixed unit 70. That is to say, the respective flexible portions have the same curvature in the direction in which those flexible portions are drawn out of the movable unit 60 through the fixed unit 70. Allowing the respective flexible portions 110-113 to have the same shape when the camera unit 30 is in the neutral position makes the tensions applied to the flexible portions 110-113 at this time uniform. Thus, this facilitates bringing the camera unit 30 into the neutral position, compared to a situation where the tensions applied to the flexible portions 110-113 are not uniform.

Furthermore, the flexible portions 110-113 are suitably each located between their associated inlet portion 703 and the tip of the camera unit 30 (see FIG. 17B). This shortens the length of the flexible portions 110-113, compared to a situation where the flexible portions go beyond the tip of the camera unit 30. Thus, when the camera unit 30 rotates, the magnitude of displacement of the flexible portions 110-113 decreases, thus reducing the tensions applied to the flexible portions 110-113.

Each of the four bundles of cables 11A connected to the connector 301 needs to be drawn out of their associated outlet portion 401. Thus, two 11A of the four bundles of cables 11A have a different length from the connector 301 through the outlet portions 401 from the other two bundles of cables 11A (see FIG. 19A).

Thus, it is necessary to iron out the difference in the length from a first end connected to the connector 301 through the first clamp 120 (i.e., the length of a first portion) among the plurality of cables. Attempting to draw the cables out of the outlet portions 401 without ironing out the difference would make the bending radius of one bundle of cables 11A, of which the first portion is longer than that of any of the other bundles of cables 11A, smaller than that of the other bundles of cables 11A, thus applying excessive force to the cable. That is why such an attempt to draw the cables out of the outlet portions 401 without ironing out the difference in length would cause deterioration in the quality of the signal and other harmful effects.

Figure 18A:
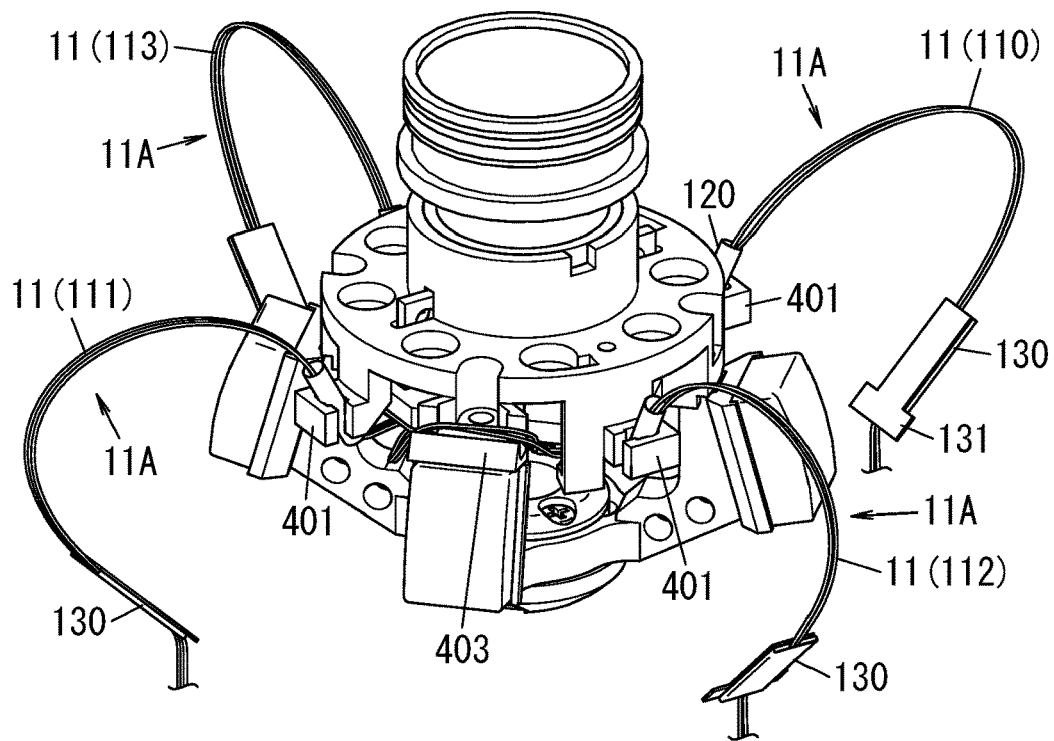
FIG. 18A is a perspective view, as viewed from above, of the camera driver in which a camera unit, a camera holder, and a movable unit are assembled together.
Figure 18B:
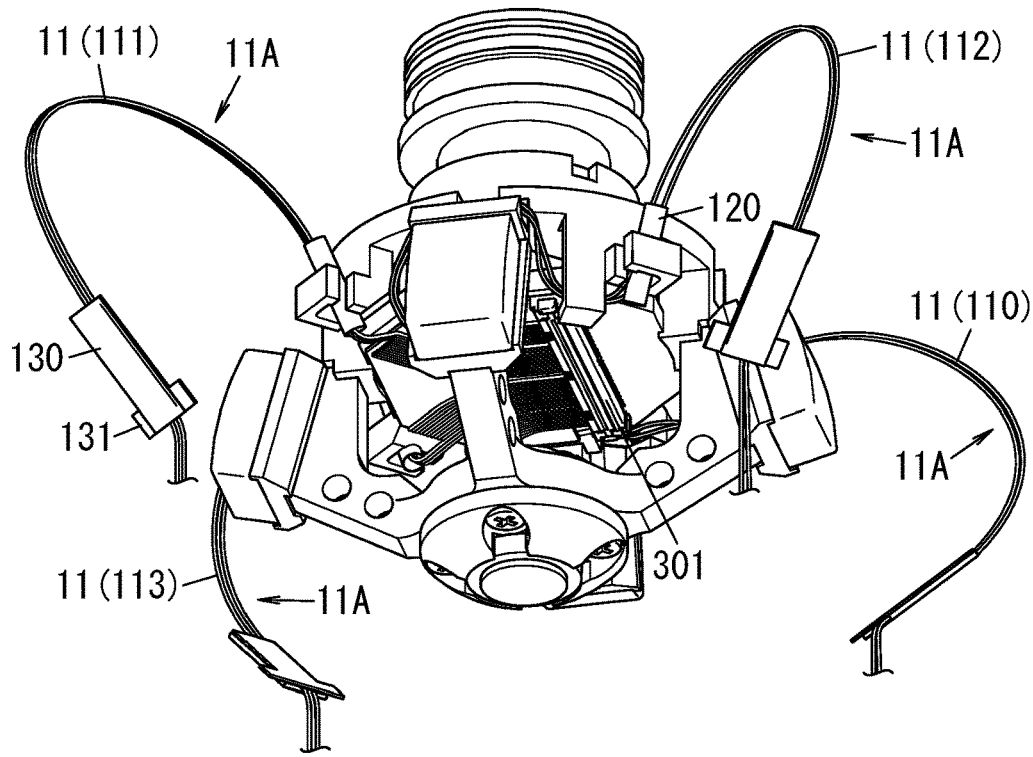
FIG. 18B is a perspective view, as viewed from below, of the camera driver in which the camera unit, the camera holder, and the movable unit are assembled together.
Figure 19B:
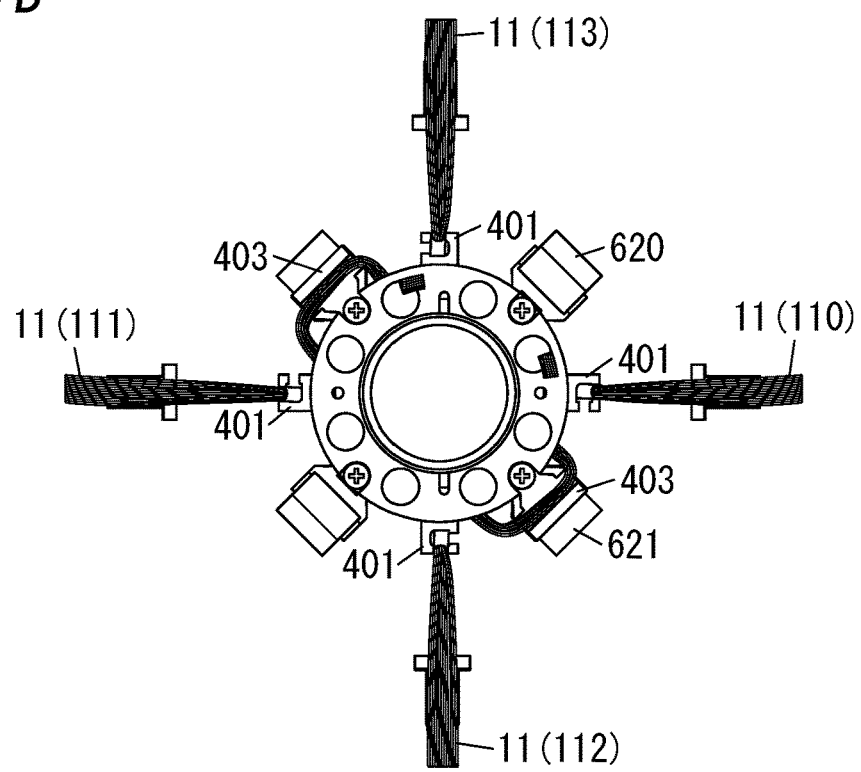
FIG. 19B is a plan view of the camera driver in which the camera unit and the camera holder are assembled together.
Figure 20:
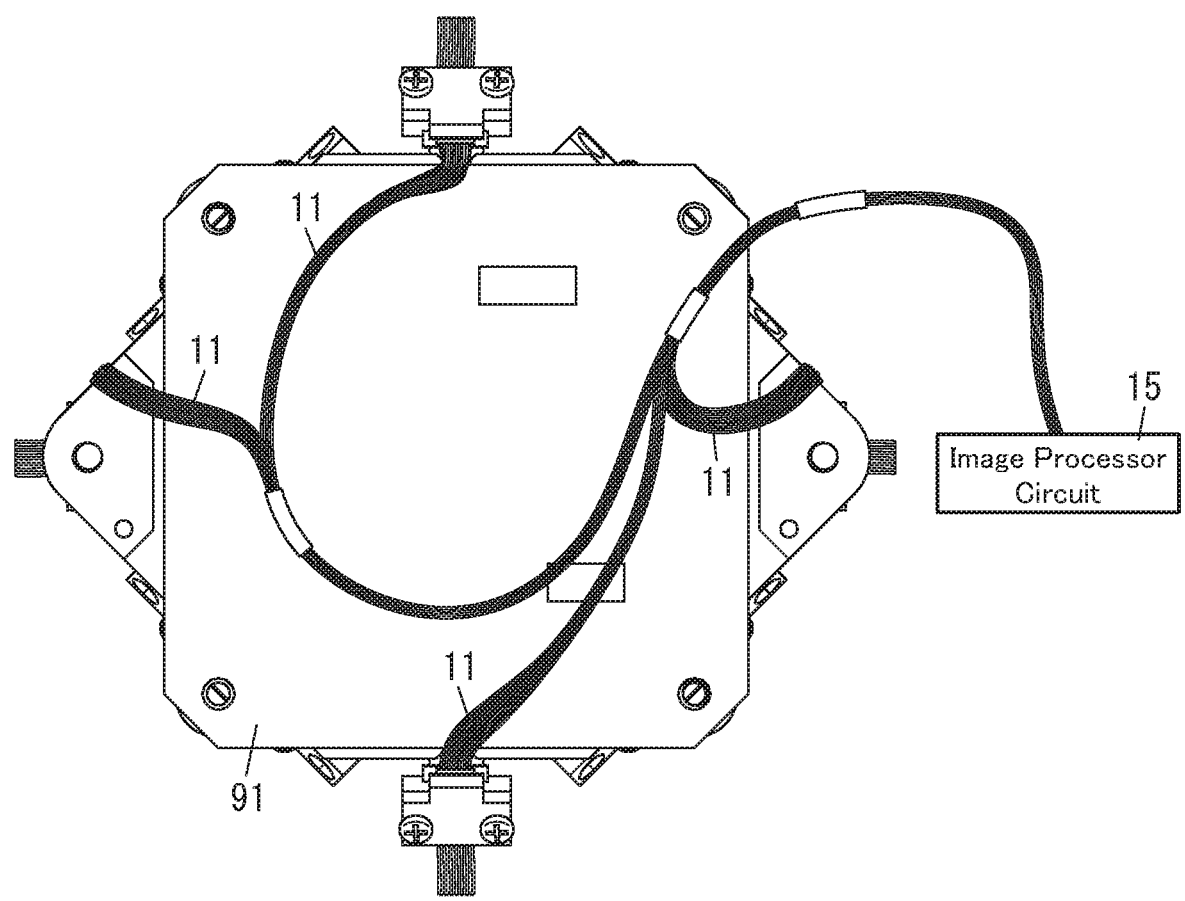
FIG. 20 is a bottom view of the camera driver.

Thus, the camera holder 40 of this embodiment provides an outer peripheral guide portion 403 for each of the two bundles of cables 11A, of which the first portion is longer than that of the other bundles of cables 11A (see FIGS. 18A and 19B). The outer peripheral guide portion 403 has a groove to guide, along the outer periphery of the bottom of the movable unit 60, a part of the portion running from the first end through the first clamp 120. That part of the portion running from the first end through the first clamp 120 is drawn out of the movable unit 60, passed through the groove of the outer peripheral guide portion 403, and inserted into the movable unit 60.

Of the four bundles of cables 11A, two bundles of cables 11A have a different length from the first end through the first clamp 120 from the other two bundles of cables 11A, and therefore, a second portion, running from the second clamp 130 through the tip (the second end), of the former two also has a different length from that of the latter two. Thus, the cable lengths are adjusted on the printed circuit board 91 such that the respective second ends of the four bundles of cables 11A are aligned with each other (see FIG. 20). Adjusting the cable lengths allows the four bundles of cables 11A to be electrically connected to the image processor circuit 15 with their respective second ends aligned with each other.

In this embodiment, the flexible portions 110-113 are arranged outside of the movable unit 60 and the fixed unit 70 and bent. This allows, when the movable unit 60 is in the neutral position, the synthetic vector of the tensions applied to the respective bundles of cables 11A to have the same direction as the magnetic attraction force F2, thus stabilizing the orientation of the camera unit 30.

Also, in the embodiment described above, the first and second clamps 120 and 130 are configured as adhesive tapes. However, this is only an example and should not be construed as limiting. Alternatively, the first clamp 120 may also be a circular cylindrical member with a circular cross section or a cylindrical member with a polygonal cross section. Likewise, the second clamp 130 may also be a circular cylindrical member with a circular cross section or a cylindrical member with a polygonal cross section.

Essentials of Second Embodiment (2.1) A camera driver 10 includes a camera unit 30, a movable unit 60 configured to hold the camera unit 30 thereon, a fixed unit 70 configured to support the movable unit 60 to make the movable unit 60 rotatable, and a plurality of cables 11. Each of the plurality of cables 11 has a first end thereof electrically connected to the camera unit 30 and a second end thereof electrically connected to an external circuit (such as an image processor circuit 15). The plurality of cables 11 is grouped into at least two bundles of cables 11A. Each of the at least two bundles of cables 11A includes a flexible portion (flexible portions 110-113) between the first end and the second end. The respective flexible portions of the at least two bundles of cables 11A are arranged at equal intervals around a circumference of a circle, of which the center is defined by the center 510 of rotation of the movable unit 60. The respective flexible portions of the at least two bundles of cables 11A have an equal length.

A camera driver is known which has the ability to rotate around three axes. In the known camera driver, cables connecting the camera unit to an external circuit are spirally wound around a projection in which a known fixed unit is provided. Winding the cables spirally around the projection allows the tensions of the cables to be concentrated at a point in the direction in which the projection projects. Thus, even though the orientation of the camera unit is stabilized, chances are that friction increases too much at a point of contact between the projection and an inner contact face of the movable unit to allow the camera unit to rotate smoothly.

In contrast, in the camera driver 10 of (2.1), at least two bundles of cables 11A are arranged at equal intervals around a circumference of a circle, of which the center is defined by the center 510 of rotation of the movable unit 60. This allows the camera driver 10 to stabilize the orientation of the camera unit 30 when the movable unit 60 is in the neutral position. In addition, the respective flexible portions of the at least two bundles of cables 11A have an equal length. This allows the tensions applied from the respective bundles of cables 11A to the movable unit 60 to be distributed uniformly.

(2.2) In the camera driver 10 of (2.1), each of the at least two bundles of cables 11A is made up of two or more cables 11. Each of the at least two bundles of cables 11A is provided with a first clamp 120 and a second clamp 130. The first clamp 120 binds the bundle of cables 11A at one end of the flexible portion of the bundle of cables 11A and is secured to the movable unit 60. The second clamp 130 binds the bundle of cables 11A at the other end of the flexible portion and is secured to the fixed unit 70. Between the first clamp 120 and the second clamp 130 of each of the at least two bundles of cables 11A, the two or more cables 11 that form the bundle of cables 11A are separate from each other.

This configuration (2.2) allows the camera driver 10 to reduce the chances of the cables being twisted by the rotation of the camera unit 30.

(2.3) In the camera driver 10 of (2.1) or (2.2), when the camera unit 30 is in the neutral position, at least two bundles of cables 11A have the same curvature in a direction in which the at least two bundles of cables 11A extend from the first clamp 120 through the second clamp 130.

This configuration (2.3) allows the camera driver 10 to make the tensions applied from the respective bundles of cables 11A to the movable unit 60 even more uniform.

(2.4) In the camera driver 10 of (2.2) or (2.3), in the at least two bundles of cables 11A, the flexible portion is provided outside of the movable unit 60 and the fixed unit 70 and bent.

This configuration (2.4) allows the camera driver 10 to decrease the curvature of the flexible portion and thereby reduce the tension applied from each bundle of cables 11A to the movable unit 60. This enables the camera driver 10 to rotate the camera unit 30 more smoothly.

(2.5) In the camera driver 10 of any one of (2.2) to (2.4), the fixed unit 70 includes at least two ribs (inlet portions 703) configured to respectively hold the second clamps 130 of the at least two bundles of cables 11A. The at least two ribs are tilted toward a direction in which the camera unit 30 is arranged with respect to a plane intersecting at right angles with an optical axis $1a$ of the camera unit 30 when the movable unit 60 is in the neutral position.

This configuration (2.5) allows the camera driver 10 to hold the flexible portions 110-113 in a bent state.

(2.6) In the camera driver 10 of (2.5), in each of the at least two bundles of cables 11A, the second clamp 130 provided for the bundle of cables 11A includes a movement regulating portion 131. The movement regulating portion 131 is configured to regulate movement of the bundle of cables in inserting and removing directions with respect to the fixed unit 70 by abutting on the rib.

This configuration (2.6) allows the camera driver 10 to reduce the chances of the second clamp being dislocated.

(2.7) In the camera driver 10 of any one of (2.2) to (2.6), in each of the at least two bundles of cables 11A, the second clamp 130 flatly binds together two or more cables 11 that form the bundle of cables 11A.

This configuration (2.7) allows the camera driver 10 to reduce the load applied to the respective cables when the bundle of cables 11A is attached to the fixed unit 70 and thereby reduce the chances of the cables snapping.

(2.8) In the camera driver 10 of any one of (2.2) to (2.7), the length from the first end through the first clamp in one bundle of cables 11A of the at least two bundles of cables 11A is different from the length from the first end through the first clamp in the other bundles of cables 11A of the at least two bundles of cables 11A.

This configuration (2.8) allows the camera driver 10 to determine the position from which the bundle of cables 11A is drawn out according to the length from the first end through the first clamp.

(2.9) In the camera driver 10 of any one of (2.2) to (2.8), the movable unit 60 holds the first clamp 120 with a resin adhesive.

This configuration (2.9) allows the camera driver 10 to secure the first clamp 120 onto the movable unit 60 with a resin adhesive.

(2.10) In the camera driver 10 of any one of (2.2) to (2.8), the movable unit 60 holds the first clamp 120 with an elastic resin material.

This configuration (2.10) allows the camera driver 10 to secure the first clamp 120 onto the movable unit 60 with an elastic resin material.

(2.11) In the camera driver 10 of any one of (2.2) to (2.10), the movable unit 60 includes an outer peripheral guide portion 403. The outer peripheral guide portion 403 is configured to guide, along an outer periphery of the movable unit 60, a part of a portion, running from the first end through the first clamp 120, of one or more bundles of cables 11A among the at least two bundles of cables 11A.

This configuration (2.11) allows the camera driver 10 to iron out the difference in the length of that portion from the first end through the first clamp 120 among the respective bundles of cables 11A, while reducing the deterioration in the quality of an electrical signal due to bending the bundles of cables 11A.

(2.12) In the camera driver 10 of (2.11), that part of the portion, running from the first end through the first clamp 120, of the at least one bundle of cables 11A is drawn out of the movable unit 60, passed through the outer peripheral guide portion 403, and inserted again into the movable unit 60.

This configuration (2.12) allows the camera driver 10 to iron out the difference in the length of that portion running from the first end through the first clamp 120 among the respective bundles of cables 11A, while reducing the deterioration in the quality of an electrical signal due to bending the bundles of cables 11A.

(2.13) The camera driver 10 of any one of (2.1) to (2.12) further includes a driving unit configured to rotate the movable unit 60 with respect to the fixed unit 70. The driving unit includes: a first driving unit configured to rotate the movable unit 60 around a first axis of rotation (i.e., the axis 1b) passing through the center 510 of rotation; and a second driving unit configured to rotate the movable unit 60 around a second axis of rotation (i.e., the axis 1c) passing through the center 510 of rotation and perpendicular to the first axis of rotation. The first driving unit includes a pair of first driving magnets 620 and a pair of first coil units 52. The pair of first driving magnets 620 is held, on the first axis of rotation, by the movable unit 60 so as to be symmetric to each other with respect to a third axis of rotation (i.e., the optical axis 1a) passing through the center 510 of rotation and perpendicular to the first axis of rotation and the second axis of rotation. The pair of first coil units 52 is held by the fixed unit 70 so as to face the pair of first driving magnets 620. The second driving unit includes a pair of second driving magnets 621 and a pair of second coil units 53. The pair of second driving magnets 621 is held, on the second axis of rotation, by the movable unit 60 so as to be symmetric to each other with respect to the third axis of rotation. The pair of second coil units 53 is held by the fixed unit 70 so as to face the pair of second driving magnets 621. The pair of first coil units 52 includes first magnetic yokes (magnetic yokes 710) and first drive coils (drive coils 720) wound around the first magnetic yokes. The second coil units 53 include second magnetic yokes (magnetic yokes 711) and second drive coils (drive coils 721) wound around the second magnetic yokes.

This configuration (2.13) allows the camera driver 10 to electromagnetically drive the camera unit 30 in rotation around the first axis of rotation and the second axis of rotation.

(2.14) In the camera driver 10 of (2.13), the driving unit further includes a third driving unit configured to rotate the movable unit 60 around the third axis of rotation. The third driving unit includes two pairs of third drive coils (including a pair of drive coils 730 and a pair of drive coils 731). One pair of third drive coils (the drive coils 730) of the two pairs of third drive coils is wound around the first magnetic yokes of the pair of first coil units 52. The other pair of third drive coils (the drive coils 731) of the two pairs of third drive coils is wound around the second magnetic yokes of the pair of second coil units 53.

This configuration (2.14) allows the camera driver 10 to electromagnetically drive the camera unit 30 in rotation around the third axis of rotation.

(2.15) In the camera driver 10 of (2.13) or (2.14), the at least two bundles of cables 11A are four bundles of cables 11A. The respective flexible portions of the four bundles of cables 11A are arranged on a one-to-one basis in four spaces defined by mutually adjacent ones of first coil units 52 in the pair of first coil units 52 and second coil units 53 in the pair of second coil units 53.

This configuration (2.15) allows the camera driver 10 to further stabilize the orientation of the camera unit 30 when the movable unit 60 is in the neutral position.

(2.16) In the camera driver 10 of any one of (2.13) to (2.15), the movable unit 60 includes a guide portion (outlet portion 401). The guide portion guides the respective flexible portions of the at least two bundles of cables 11A such that the flexible portions are drawn out into the space between the pair of first driving magnets 620 and the camera unit 30 and between the pair of second driving magnets 621 and the camera unit 30.

This configuration (2.16) allows the camera driver 10 to draw out the flexible portions 110-113 into the space between the pair of first driving magnets 620 and the camera unit 30 and between the pair of second driving magnets 621 and the camera unit 30.

(3) Third Embodiment

A third embodiment will be described with reference to FIGS. 21A-25B. The following description of the third embodiment will be focused on a configuration related to a coil unit applicable to the camera driver 10 that has already been described for the first embodiment. In the following description, any constituent member of the third embodiment having the same function as the counterpart of the first embodiment described above will be designated by the same reference sign as that counterpart's, and description thereof will be omitted as appropriate herein.

As in the first embodiment, the camera driver 10 of this embodiment also includes the first upper ring 20, the second upper ring 21, the camera unit 30, the movable unit 60, the fixed unit 70, the stopper member 80, the printed circuit board 90, the detecting unit 100, and the driving unit 700 (see FIG. 2 and FIGS. 1A and 1B).

The movable unit 60 of this embodiment also includes, as in the first embodiment, the camera holder 40 and the movable base 41 (see FIG. 2).

The fixed unit 70 also includes, as in the first embodiment, the coupling member 50 and the body 51 (see FIG. 2).

The fixed unit 70 includes, as in the first embodiment, the pair of first coil units 52 and the pair of second coil units 53 to make the movable unit 60 electromagnetically drivable and rotatable (see FIG. 2).

Figure 22:
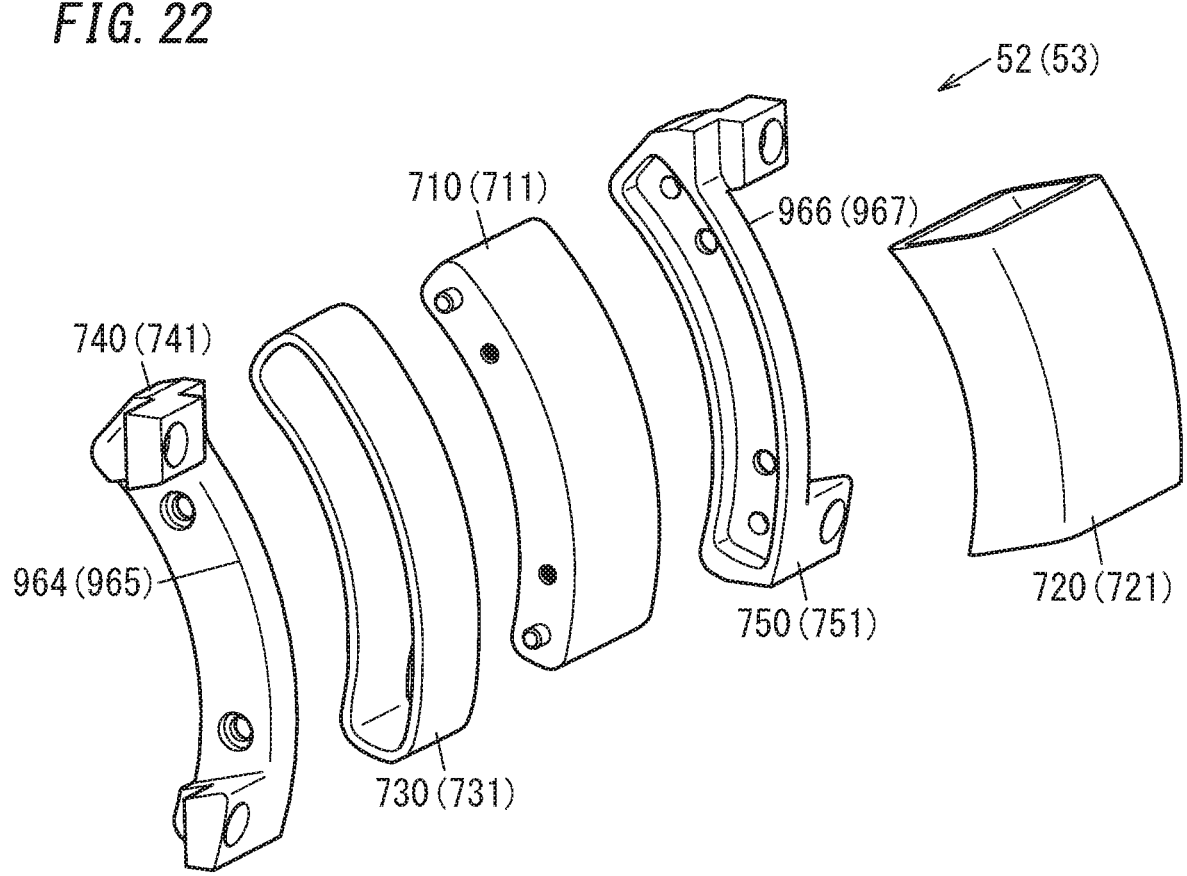
FIG. 22 is an exploded perspective view of a first coil unit (or second coil unit) of the camera driver.

The pair of first coil units 52 each include, as in the first embodiment, the magnetic yoke 710, the drive coils 720 and 730, and the magnetic yoke holders 740 and 750 (see FIGS. 2 and 22).

The pair of second coil units 53 each include, as in the first embodiment, the magnetic yoke 711, the drive coils 721 and 731, and the magnetic yoke holders 741 and 751 (see FIGS. 2 and 22).

In the following description, it will be described how to wind each drive coil 720 (or 721) around the magnetic yoke holders 740 and 750 (or 741 and 751). Note that the drive coil 730 (or 731) is wound in the same way as the conventional method, and description thereof will be omitted herein.

Figure 21A:
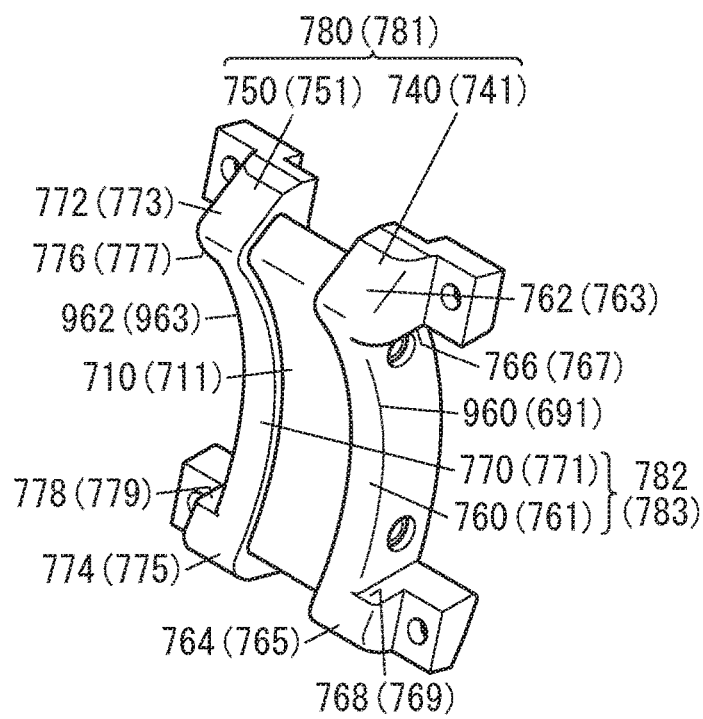
FIG. 21A is a perspective view of a magnetic yoke and a pair of magnetic yoke holders as constituent members of a camera driver (actuator) according to a third embodiment of the present invention.

As described for the first embodiment, the magnetic yoke holders 740 and 750 (or 741 and 751) are secured with screws onto both sides of the magnetic yoke 710 (or 711) (see FIG. 21A).

Figure 21B:
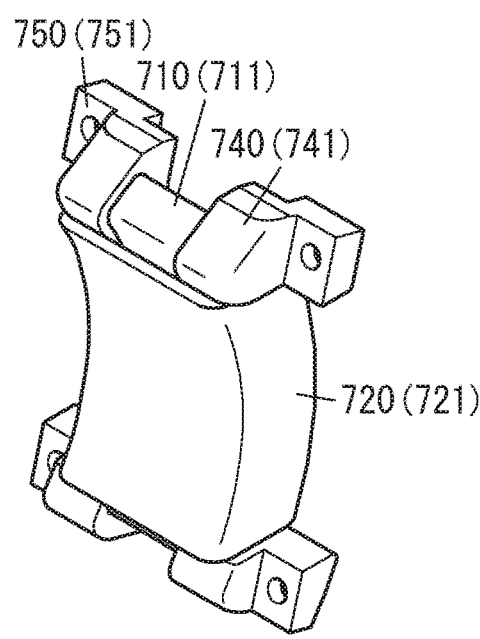
FIG. 21B is a perspective view of a coil unit as a constituent member for the camera driver, from which a drive coil for rolling is removed.

After the drive coil 730 (or 731) has been wound around the magnetic yoke 710 (or 711), the drive coil 720 (or 721) is wound thereon with the magnetic yoke holders 740 and 750 (or 741 and 751) secured to both sides of the magnetic yoke 710 (or 711) (see FIG. 21B). Note that in FIG. 21B, the illustration of the drive coil 730 (or 731) is omitted. In this example, the magnetic yoke holder 740 (or 741) has two curved faces 742 and 744 (or 743 and 745), and the magnetic yoke holder 750 (or 751) has two curved faces 752 and 754 (or 753 and 755).

The magnetic yoke holders 740 and 750 (or the magnetic yoke holders 741 and 751) of this embodiment constitute a coil bobbin 780 (or 781). In addition, the curved face 742 (or 743) of the magnetic yoke holder 740 (or 741) and the curved face 752 (or 753) of the magnetic yoke holder 750 (or 751) define a first curved face 782 (or 783) of the coil bobbin 780 (or 781). Furthermore, the curved face 744 (or 745) of the magnetic yoke holder 740 (or 741) and the curved face 754 (or 755) of the magnetic yoke holder 750 (or 751) define a second curved face 784 (or 785) of the coil bobbin 780 (or 781).

As shown in FIG. 21A, the magnetic yoke holder 740 (or 741) includes a body 760 (or 761) and two flanges 762 and 764 (or 763 and 765). Likewise, as shown in FIG. 21A, the magnetic yoke holder 750 (or 751) also includes a body 770 (or 771) and two flanges 772 and 774 (or 773 and 775). The body 760 (or 761) of the magnetic yoke holder 740 (or 741) and the body 770 (or 771) of the magnetic yoke holder 750 (or 751) together form a drum of the coil bobbin 780 (or 781) and the drive coil 720 (or 721) is wound around this drum. Also, the set of respective flanges 762 and 772 of the magnetic yoke holders 740 and 750 and the set of respective flanges 764 and 774 of the magnetic yoke holders 740 and 750 form a pair of flanges of the coil bobbin 780. Likewise, the set of respective flanges 763 and 773 of the magnetic yoke holders 741 and 751 and the set of respective flanges 765 and 775 of the magnetic yoke holders 741 and 751 form a pair of flanges of the coil bobbin 781.

The flange 762 (or 763) of the magnetic yoke holder 740 (or 741) has a first flange face 766 (or 767) to contact with the drive coil 720 (or 721). The flange 764 (or 765) of the magnetic yoke holder 740 (or 741) has a second flange face 768 (or 769) that will contact with the drive coil 720 (or 721) and is parallel to the first flange face 766 (or 767). Likewise, the flange 772 (or 773) of the magnetic yoke holder 750 (or 751) has a third flange face 776 (or 777) to contact with the drive coil 720 (or 721). The flange 774 (or 775) of the magnetic yoke holder 750 (or 751) has a fourth flange face 778 (or 779) that will contact with the drive coil 720 (or 721) and is parallel to the third flange face 776 (or 777). The first flange face 766 (or 767) and the third flange face 776 (or 777) are provided on the same plane. The second flange face 768 (or 769) and the fourth flange face 778 (or 779) are provided on the same plane.

In this structure, the set of the first flange face 766 (or 767) and the third flange face 776 (or 777) and the set of the second flange face 768 (or 769) and the fourth flange face 778 (or 779) form a pair of flange faces of the coil bobbin 780 (or 781). In addition, since the first flange face 766 (or 767) and the third flange face 776 (or 777) are provided on the same plane and since the second flange face 768 (or 769) and the fourth flange face 778 (or 779) are provided on the same plane, the pair of flange faces of the coil bobbin 780 (or 781) are parallel to each other.

Figure 21C:
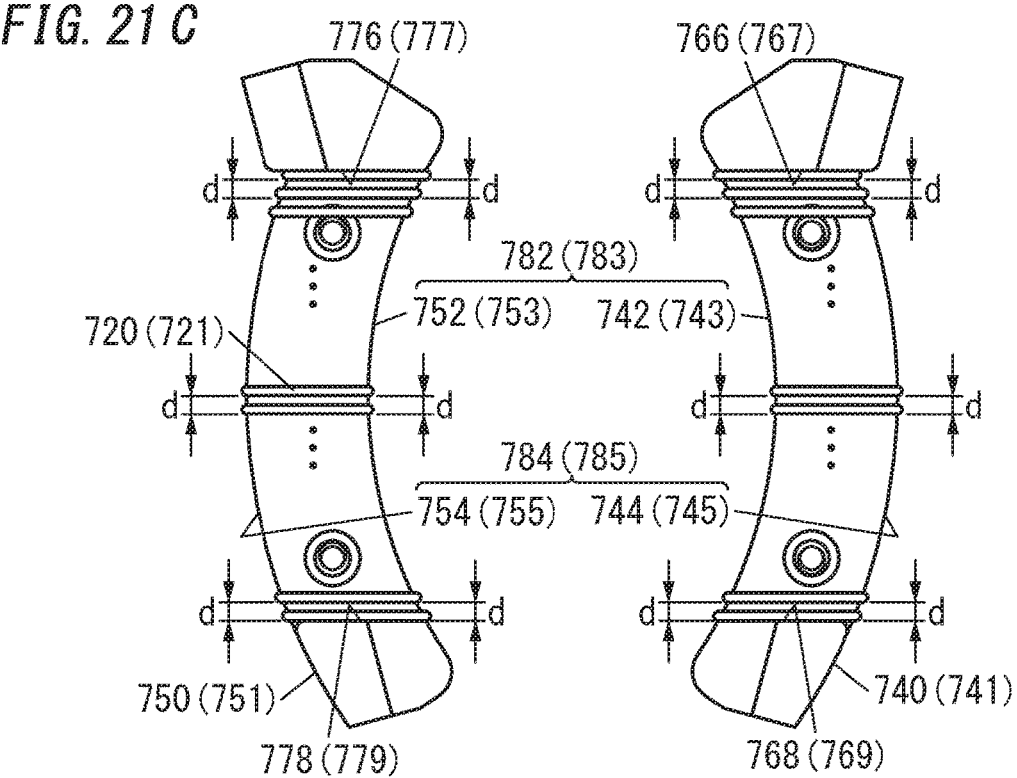
FIG. 21C is a side view of the coil unit of the camera driver.

When the drive coil 720 (or 721) is wound around the coil bobbin 780 (or 781), the total length (i.e., pitch) of the thickness (i.e., the wire diameter) of the drive coil 720 (or 721) and the gap is a constant length d (see FIG. 21C). This makes the pitch at both terminals of the drive coil 720 (or 721) equal to the pitch at a center portion thereof. This contributes to reducing the height of the camera driver 10 compared to a situation where the pitch at both terminals is wider than the pitch at the center portion. Note that in FIG. 21C, the thickness of the coil wire illustrated is greater than the actual thickness thereof, to make the pitch length of the drive coil 720 (or 721) more easily understandable.

Now, a specific example of the first curved face 782 (or 783) and the second curved face 784 (or 785) of the coil bobbin 780 (or 781) will be described. On the first curved face 782 (or 783), a plurality of first projections 900 (or 901) are arranged continuously along the arc of the first curved face 782 (or 783) (see FIGS. 23 and 24). Likewise, on the second curved face 784 (or 785), a plurality of second projections 902 (or 903) are arranged continuously along the arc of the second curved face 784 (or 785) (see FIGS. 23 and 24).

Figure 24:
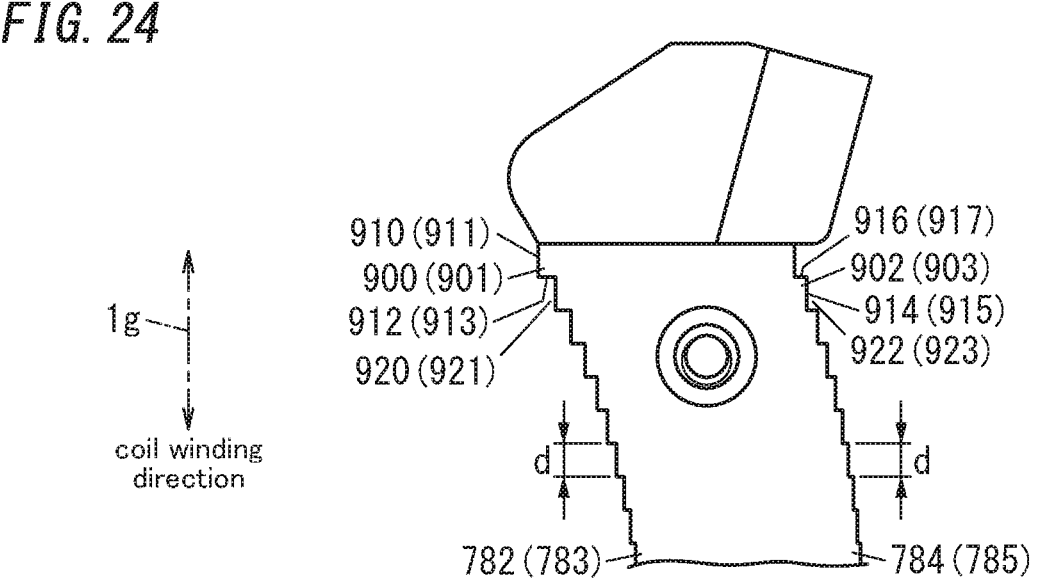
FIG. 24 is an enlarged view of a principal portion A of a magnetic yoke holder for the camera driver.

Specifically, the plurality of first projections 900 (or 901) are made up of planes 910 (or 911) parallel to the winding direction 1g of the drive coil 720 (or 721) and planes 912 (or 913) perpendicular to the winding direction 1g of the drive coil 720 (see FIG. 24). Providing, along the arc of the first curved face 782 (or 783), the plurality of first projections 900 (or 901) for at least both ends of the first curved face 782 (or 783) forms a plurality of grooves 920 (or 921) on the first curved face 782 (or 783) (see FIG. 24). In this structure, the length, measured perpendicularly to the winding direction 1g, of the planes 912 (or 913) becomes shorter toward the center portion thereof. That is to say, the first curved face 782 (or 783) has a stepped shape (defines a stepped portion), of which the grooves 920 (or 921) become shallower toward the center portion. In this case, the grooves 920 (or 921) define the level differences of the stepped shape (stepped portion).

The plurality of second projections 902 (or 903) are made up of planes 914 (or 915) parallel to the winding direction 1g of the drive coil 720 (or 721) and planes 916 (or 917) perpendicular to the winding direction 1g of the drive coil 720 (or 721) (see FIG. 24). Providing, along the arc of the second curved face 784 (or 785), the plurality of second projections 902 (or 903) for at least both ends of the second curved face 784 (or 785) forms a plurality of grooves 922 (or 923) on the second curved face 784 (or 785) (see FIG. 24).

In this structure, the length, measured perpendicularly to the winding direction 1g, of the planes 916 (or 917) becomes shorter toward the center portion thereof. That is to say, the second curved face 784 (or 785) has a stepped shape (defines a stepped portion), of which the grooves 922 (or 923) become shallower toward the center portion. In this case, the grooves 922 (or 923) define the level differences of the stepped shape (stepped portion).

This makes the length, measured in the winding direction 1g of the drive coil 720 (or 721), of the two planes 910 and 914 (or 911 and 915) that are parallel to the winding direction 1g of the drive coil 720 (or 721) equal to the pitch (length d) of the grooves 920 (or 921) (see FIG. 24). As used herein, the "winding direction 1g of the drive coil 720 (or 721)" refers to a straight line running from the flange 762 (or 763) of the magnetic yoke holder 740 (or 741) through the flange 764 (or 765) thereof.

The movable base 41 has a loosely fitting space, and supports the camera unit 30 thereon. The movable base 41 includes, as in the first embodiment, the body 601, the first loosely fitting member 602, the pair of first magnetic back yokes 610, the pair of second magnetic back yokes 611, the pair of first driving magnets 620, and the pair of second driving magnets 621 (see FIG. 3). The movable base 41 further includes the bottom plate 640 (counterweight) and the position detecting magnet 650 (see FIG. 3). The constituent members of the movable base 41 have already been described for the first embodiment, and description thereof will be omitted herein.

As already described for the first embodiment, the angle formed between the line segment drawn from the center of each of the first driving magnets 620 through the center 510 of rotation and the axis 1c is θd. Likewise, the angle formed between the line segment drawn from the center of each of the second driving magnets 621 through the center 510 of rotation and the axis 1b is also θd (see FIG. 1B).

Furthermore, when the movable unit 60 (or the camera unit 30) is in the neutral position, the angle formed between a line passing through the center of each of the first coil units 52 and the center 510 and a plane including the axes 1b and 1c is θd, and the angle formed between a line passing through the center of each of the second coil units 53 and the center 510 and the plane including the axes 1b and 1c is also θd (see FIG. 1B). In this case, the angle formed between the direction in which the coil wire of the drive coil 720 (or 721) runs from the first curved face 782 (or 783) of the coil bobbin 780 (or 781) toward the second curved face 784 (or 785) thereof and the plane including the axes 1b and 1c suitably agrees with θd. Alternatively, the angle formed between the direction in which the coil wire of the drive coil 720 (or 721) runs from the second curved face 784 (or 785) of the coil bobbin 780 (or 781) toward the first curved face 782 (or 783) thereof and the plane including the axes 1b and 1c suitably agrees with θd. That is to say, when the movable unit 60 (or the camera unit 30) is in the neutral position, the direction in which the coil wire of the drive coil 720 (or 721) runs from the first curved face 782 (or 783) toward the second curved face 784 (or 785), or vice versa, is suitably parallel to the line passing through the center 510 and the center of the driving magnet 620 (or 621).

As in the first embodiment, the printed circuit board 90 is provided with the four magnetic sensors 92. The four magnetic sensors 92 calculate, as in the first embodiment, two-dimensional angles of rotation with respect to the axes 1b and 1c. In addition, the camera driver 10 further includes, as in the first embodiment, another magnetic sensor for detecting the rotation of the movable unit 60 (i.e., the rotation of the camera unit 30) around the optical axis 1a. Note that the sensor for detecting the rotation around the optical axis 1a does not have to be a magnetic sensor but may also be a gyro sensor, for example.

The coupling member 50, the second loosely fitting member 501, and the stopper member 80 have already been described for the first embodiment, and description thereof will be omitted herein.

In this embodiment, the pair of first driving magnets 620 also serves, as in the first embodiment, as attracting magnets, thus producing magnetic attraction forces between the pair of first driving magnets 620 and the magnetic yokes 710 that face the first driving magnets 620. Likewise, the pair of second driving magnets 621 also serves as attracting magnets, thus producing magnetic attraction forces between the pair of second driving magnets 621 and the magnetic yokes 711 that face the second driving magnets 621. The magnetic attraction forces have already been described for the first embodiment, and description thereof will be omitted herein.

In this embodiment, the pair of first coil units 52, the pair of second coil units 53, the pair of first driving magnets 620, and the pair of second driving magnets 621 also form, as in the first embodiment, the driving unit 700. The driving unit 700 also includes the first driving unit for rotating the movable unit 60 around the axis 1b, the second driving unit for rotating the movable unit 60 around the axis 1c, and the third driving unit for rotating the movable unit 60 around the optical axis 1a. The first driving unit, the second driving unit, and the third driving unit have already been described for the first embodiment, and description thereof will be omitted herein.

In this embodiment, the four bundles of cables 11A are drawn, as in the first embodiment, outward from the center of movement of the movable unit 60 (i.e., from the center 510) out of the movable unit 60 (i.e., the camera holder 40) and then inserted into the fixed unit 70 (see FIG. 1A and other drawings). This allows the four bundles of cables 11A to be arranged outside of the movable unit 60 and the fixed unit 70. Some of the four bundles of cables 11A are arranged in any of the four spaces, defined by the arrangement of the pair of first driving magnets 620 and the pair of second driving magnets 621 (i.e., by the arrangement of the pair of first coil units 52 and the pair of second coil units 53).

In addition, the four bundles of cables 11A are also drawn out so as to tilt toward a direction in which the camera unit 30 is arranged with respect to the plane including the axes 1b and 1c. The angle at which the four bundles of cables 11A are drawn out of the movable unit 60 is suitably approximately 45 degrees.

The body 51 of the fixed unit 70 includes, as in the first embodiment, four inlet portions 703 into which the four bundles of cables 11A are inserted (see FIG. 2). The four inlet portions 703 are provided for the body 51 so as to tilt toward a direction in which the camera unit 30 is arranged with respect to the plane including the axes 1b and 1c.

The configuration of the four inlet portions 703 is just as already described for the first embodiment, and description thereof will be omitted herein.

As in the first embodiment, a portion (i.e., an exposed portion) of the cables drawn out of the movable unit 60 and then inserted into the fixed unit 70 has the same length in each of the four bundles of cables 11A.

As in the first embodiment, the camera driver 10 of this embodiment is also able to rotate the movable unit 60 two-dimensionally by simultaneously energizing the pair of drive coils 720 and the pair of drive coils 721 (see FIG. 11).

In addition, the camera driver 10 of this embodiment is also able to rotate (i.e., roll), as in the first embodiment, the movable unit 60 around the optical axis 1a by simultaneously energizing the pair of drive coils 730 and the pair of drive coils 731.

Numerous variations of this embodiment will be enumerated below. Any of the variations to be described below may be combined as appropriate with the embodiment described above.

Figure 23:
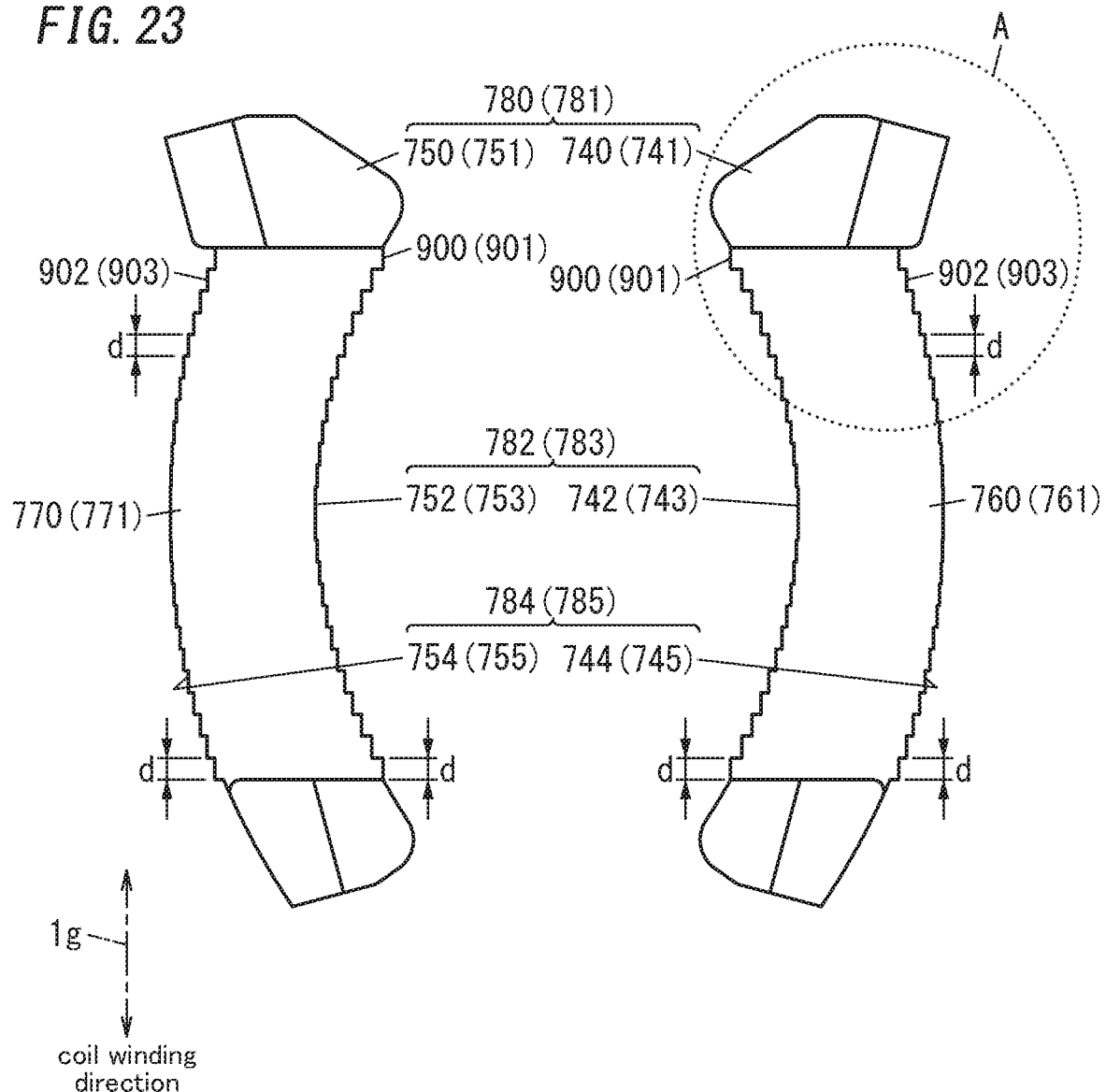
FIG. 23 is a side view of magnetic yoke holders as constituent members for the camera driver.

In the embodiment described above, the shapes of the projections (the shapes of the grooves) formed on the first curved face 782 (or 783) and second curved face 784 (or 785) of the coil bobbin 780 (or 781) are not limited to the shapes shown in FIGS. 23 and 24. Alternatively, the shapes of the projections (the shapes of the grooves) may be any other shapes.

Figure 25A:
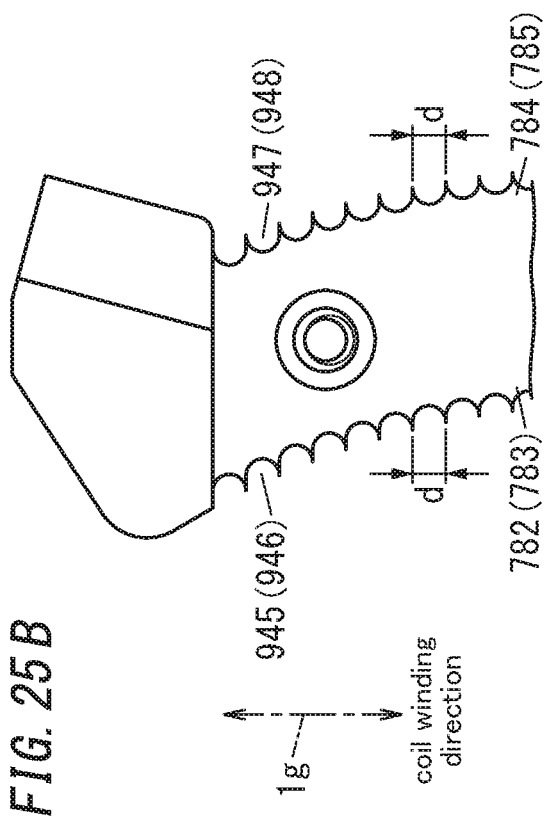
FIGS. 25A-25D are enlarged views illustrating respective principal portions of variations of a magnetic yoke holder for the camera driver.

For example, a plurality of first projections may be provided for the first curved face 782 (or 783) such that a plurality of V-grooves 940 (or 941) are formed on at least both ends of the first curved face 782 (or 783), and a plurality of second projections may be provided for the second curved face 784 (or 785) such that a plurality of V-grooves 942 (or 943) are formed on the second curved face 784 (or 785) (see FIG. 25A). In that case, the interval between a first projection and an adjacent first projection defines the pitch (length d) of the grooves 920 (or 921) (see FIG. 25A). Also, the interval between a second projection and an adjacent second projection defines the pitch (length d) of the grooves 942 (or 943) (see FIG. 25A).

Alternatively, a plurality of first projections may be provided for the first curved face 782 (or 783) such that a plurality of U-grooves 945 (or 946) are formed on the first curved face 782 (or 783), and a plurality of second projections may be provided for the second curved face 784 (or 785) such that a plurality of U-grooves 947 (or 948) are formed on the second curved face 784 (or 785). In that case, the interval between a first end and second end of each U-recess forming the grooves 945 (or 946) on the first curved face 782 (or 783) defines the pitch (length d) of the grooves 945 (or 946) (see FIG. 25B). Also, the interval between a first end and second end of each U-recess forming the grooves 947 (or 948) on the second curved face 784 (or 785) defines the pitch (length d) of the grooves 947 (or 948) (see FIG. 25B).

Figure 25B:
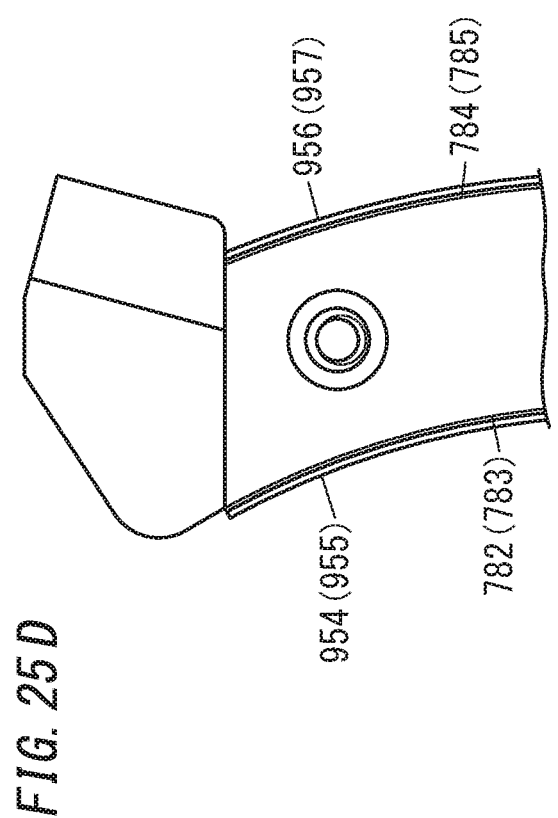
Figure 25C:
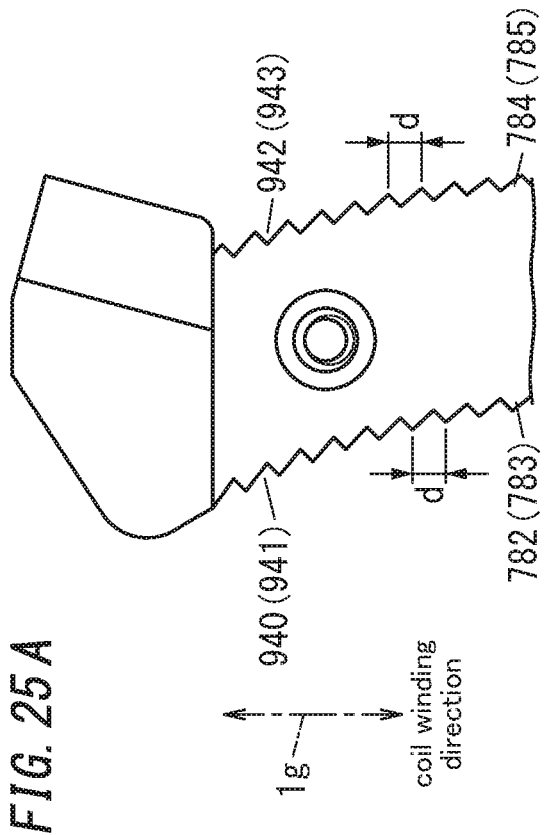

Still alternatively, the first curved face 782 (or 783) and the second curved face 784 (or 785) may also be surfaces 950 and 952 (or 951 and 953) having greater roughness (i.e., having a higher coefficient of friction) than any other portions of the coil bobbin 780 (or 781) (see FIG. 25C). As used herein, the "other portions" refer to, for example, the surface of the pair of flanges of the coil bobbin 780 (or 781) and the rest, other than the first curved face 782 (or 783) and the second curved face 784 (or 785), of the drum of the coil bobbin 780 (or 781).

Figure 25D:
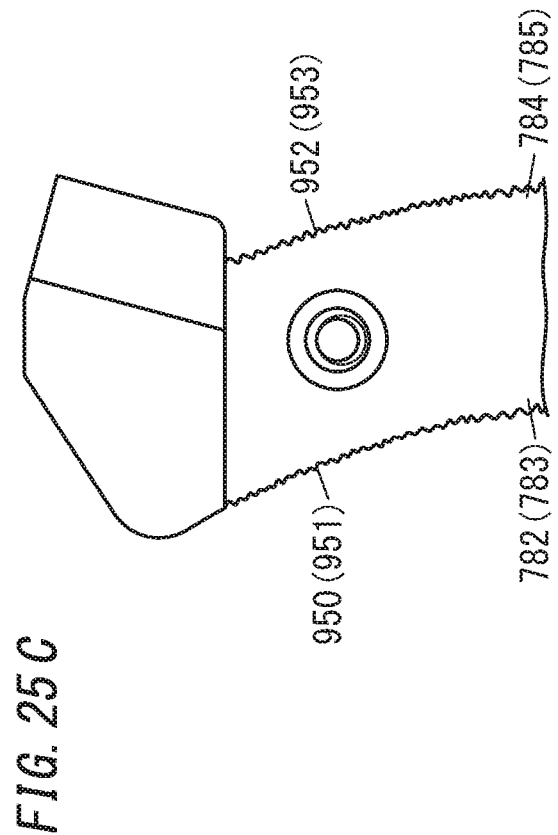

Yet alternatively, members 954 and 956 (or 955 and 957) having a higher coefficient of friction than the surface of the coil bobbin 780 (or 781) may be attached to the first curved face 782 (or 783) and the second curved face 784 (or 785), or fine resin particles in a powder or granular shape may also be applied onto the first curved face 782 (or 783) and the second curved face 784 (or 785) (see FIG. 25D).

In the embodiment described above, the projections (or the grooves) are provided over the entire first curved face 782 (or 783) and entire second curved face 784 (or 785) of the coil bobbin 780 (or 781). However, this is only an example and should not be construed as limiting.

Alternatively, the plurality of first projections 900 (or 901) shown in FIG. 24 may be provided for at least both ends of the two edges 960 and 962 (or 961 and 963), shown in FIG. 21A, of the first curved face 782 (or 783) of the coil bobbin 780 (or 781). In that case, the plurality of second projections 902 (or 903) shown in FIG. 24 are provided for at least both ends of the two edges 964 and 966 (or 965 and 967), shown in FIG. 22, of the second curved face 784 (or 785) of the coil bobbin 780 (or 781). In this case, these edges 960, 962, 964, and 966 (or 961, 963, 965, and 967) are both edges, in a direction perpendicular to the winding direction 1g shown in FIG. 23, of the coil bobbin 780 (or 781).

Still alternatively, the plurality of V-grooves 940 (or 941) shown in FIG. 25A may be provided for at least both ends of the two edges 960 and 962 (or 961 and 963) of the first curved face 782 (or 783) of the coil bobbin 780 (or 781). In that case, the plurality of grooves 942 (or 943) shown in FIG. 25A are provided for at least both ends of the two edges 964 and 966 (or 965 and 967) of the second curved face 784 (or 785).

Yet alternatively, the plurality of U-grooves 945 (or 946) shown in FIG. 25B may be provided for at least both ends of the two edges 960 and 962 (or 961 and 963) of the first curved face 782 (or 783) of the coil bobbin 780 (or 781). In that case, the plurality of U-grooves 947 (or 948) shown in FIG. 25B are provided for at least both ends of the two edges 964 and 966 (or 965 and 967) of the second curved face 784 (or 785).

Yet alternatively, the four edges 960, 962, 964, and 966 (or 961, 963, 965, and 967) shown in FIGS. 21A and 22 may be roughened, compared to the other portions, to have their coefficient of friction increased. Yet alternatively, a member with a higher coefficient of friction than the surface of the coil bobbin 780 (or 781) may be either attached or applied onto the four edges 960, 962, 964, and 966 (or 961, 963, 965, and 967).

Furthermore, in the embodiment described above, the grooves formed on the first curved face 782 (or 783) and second curved face 784 (or 785) of the coil bobbin 780 (or 781) have the same pitch as the drive coil 720 (or 721). However, this is only an example and should not be construed as limiting. Alternatively, the pitch of the grooves of the coil bobbin 780 (or 781) may also be an integral number of times as large as that of the drive coil 720 (or 721). That is to say, the pitch P of the grooves of the coil bobbin 780 (or 781) may be given by P=n×d, where n is an integer equal to or greater than one and d is the pitch of the drive coil 720 (or 721). Optionally, the n value may be increased toward a center portion of the drive coil 720 (or 721).

Essentials of Third Embodiment (3.1) A coil unit (which may be one of a first coil unit 52 or a second coil unit 53) provided for the camera driver 10 serving as an actuator includes a coil bobbin (which may be one of a coil bobbin 780 or a coil bobbin 781) and a coil (which may be one of a drive coil 720 or a drive coil 721). The coil bobbin has a first curved face (which may be a first curved face 782 or a first curved face 783) and a second curved face (which may be a second curved face 784 or a second curved face 785), which are curved in an arc direction and which face each other. The coil is wound around the coil bobbin in the arc direction. The coil on the first curved face has the same pitch as the coil on the second curved face.

A camera driver has been known in the art as a type of actuator for rotating a camera as an object to be driven. A conventional camera driver rotates the camera by energizing drive coils wound around a pair of magnetic yokes. The magnetic yokes are curved along the circumference of a circle, of which the center is defined by the center of rotation. When the coils are wound around the magnetic yokes, the coils are wound radially because the magnetic yokes are curved. That is why two curved faces, facing each other, of each of the magnetic yokes have mutually different coil pitches. This because in the outer one (i.e., the outer surface) of the two surfaces that face each other, a central portion of the outer surface has a different coil pitch from both end portions thereof. Specifically, in the outer surface of panning magnetic yokes, both end portions thereof have a broader coil pitch than a central portion thereof. Likewise, as for the coils wound around respective tilting magnetic yokes, two curved faces that face each other have mutually different coil pitches. Meanwhile, there has been a growing demand for reducing the size (e.g., the height, in particular) of an actuator. Shortening the length of magnetic yokes in the coil winding direction would reduce the height. However, shortening the length of the pair of magnetic yokes in the coil winding direction would require ensuring a broad pitch width for both of the end portions thereof, thus making it difficult to ensure the conventional number of coil turns.

The coil unit with the configuration (3.1) eliminates the need of ensuring a broad pitch width at both ends of the coil bobbin, because the coil on the first curved face has the same pitch as the coil on the second curved face. Thus, even if the length of the coil unit in the winding direction is shorter than in a conventional coil unit, the number of coil turns may still be as large as that of the conventional coil unit. This enables an actuator including such a coil unit to have a reduced height.

(3.2) In the coil unit of (3.1), the first curved face and the second curved face have a plurality of grooves (which may be grooves 920 and 922 or 921 and 923). Alternatively, both edges (which may be edges 960 and 962 or 961 and 963), perpendicular to a winding direction of the coil, of the first curved face and both edges (which may be edges 964 and 966 or 965 and 967), perpendicular to the winding direction of the coil, of the second curved face have a plurality of grooves (which may be grooves 920 and 922 or 921 and 923).

This configuration (3.2) allows a coil wire, forming the coil, to be wound around the coil bobbin along the grooves. This reduces the chances of the coil wire being dislocated in the arc direction on the first curved face and the second curved face.

(3.3) In the coil unit of (3.2), the first curved face and the second curved face each have the plurality of grooves formed thereon by continuously providing, in the are direction, a plurality of projections, each of which is defined by a first plane parallel to the winding direction of the coil and a second plane perpendicular to the winding direction. Alternatively, both edges of the first curved face and both edges of the second curved face each have the plurality of grooves formed thereon by continuously providing, in the arc direction, a plurality of projections, each of which is defined by a first plane parallel to the winding direction of the coil and a second plane perpendicular to the winding direction. In this case, the first plane corresponds to planes 910, 911, 914, and 915, and the second plane corresponds to planes 912, 913, 916, and 917. The projections correspond to a first projection 900 (or 901) and a second projection 902 (or 903).

According to this configuration (3.3), when the coil wire of the coil comes into contact with the first plane, the force of movement in the are direction is less than in a situation where the coil wire comes into contact with a curved face. This reduces the chances of the coil wire of the coil being dislocated from the grooves.

(3.4) In the coil unit of (3.2), the plurality of grooves are either V-grooves or U-grooves.

This configuration (3.4) reduces the chances of the coil shifting in the arc direction by winding the coil wire of the coil in the grooves.

(3.5) In the coil unit of (3.2), the pitch of the plurality of grooves is an integral number of times as large as the pitch of the coil.

This configuration (3.5) allows the coil pitch on the first curved face and the coil pitch on the second curved face to be brought into agreement with each other with reliability.

(3.6) In the coil unit of (3.1), the first curved face and the second curved face have a higher coefficient of friction than any portion of the coil bobbin. Alternatively, both edges of the first curved face and both edges of the second curved face have a higher coefficient of friction than any portion of the coil bobbin.

This configuration (3.6) reduces the chances of the coil wire of the coil wound shifting in the arc direction.

(3.7) In the coil unit of (3.1), a member with a higher coefficient of friction than the coil bobbin is either attached or applied onto the first curved face and the second curved face. Alternatively, a member with a higher coefficient of friction than the coil bobbin is either attached or applied onto both edges of the first curved face and both edges of the second curved face.

This configuration (3.7) reduces the chances of the coil wire of the coil wound shifting in the arc direction.

(3.8) An actuator includes: the coil unit of any one of (3.1) to (3.7); and a driving magnet facing the first curved face and configured to be electromagnetically driven in rotation with respect to the coil unit around an axis of rotation so as to define a circle, of which a circumference is the arc direction.

This configuration (3.8) contributes to reducing the height of an actuator including a coil unit.

(3.9) In the actuator of (3.8), the first curved face is curved along the circumference of a circle, of which the center is defined by the axis of rotation.

This configuration (3.9) enables the actuator to keep a constant distance from the coil unit even if the driving magnets have rotated.

(3.10) The actuator of (3.8) or (3.9) further includes: a movable unit 60 configured to hold the driving magnet 620 (or 621) thereon; and a fixed unit 70 configured to hold the coil unit thereon and support the movable unit 60 such that the movable unit 60 is rotatable. When the movable unit 60 is in the neutral position, a direction in which the coil is wound from the first curved face to the second curved face or from the second curved face to the first curved face in the actuator is parallel to a line passing through the center 510 of rotation and the center of the driving magnet.

This configuration (3.10) enables the actuator to bring the direction in which the coil is wound and the direction in which magnetic attraction force is generated into agreement with each other.

(Variations)

Numerous variations will be enumerated below. Any of the variations to be described below may be combined as appropriate with any of the embodiments described above.

In the embodiments described above, the camera driver 10 has been described as an exemplary actuator. However, this is only an example and should not be construed as limiting. Rather, the actuator may also be implemented as any other type of device as long as the actuator has a structure in which a member held by the movable unit 60 rotates three-dimensionally. Examples of such actuators include not only the camera driver 10 but also a device with an operating lever held by the movable unit 60 (i.e., an input/output operating device).

Alternatively, the actuator may also include, as an object to be driven, a unit in which an optical device emitting light such as an illuminator or a laser pointer is held by the movable unit 60 (i.e., an optical device unit). In a nutshell, the actuator may include, as the object to be driven, any type of unit with an optical axis, i.e., a unit including an optical element (such as a lens, a photodetector, or a light-emitting element) for receiving incoming light from an external device or emanating light toward an external device.

Still alternatively, the actuator may also be a device in which a mirror is held by the movable unit 60 (i.e., a mirror operating device).

Furthermore, the actuator does not always have a structure in which the member held by the movable unit 60 rotates three-dimensionally but may also have a structure in which the member rotates around each of two axes. For example, the movable unit 60 may also be configured to rotate around each of the two axes 1$b$ and 1$c$ with respect to the fixed unit 70. In that case, there is no need to wind the drive coils 730 (or 731) around the magnetic yokes 710 (or 711).

The actuator described above may also be applied to a haptic device. In that case, a constituent element to be rotated (such as a lever) in the haptic device has a contact surface to come into contact with, or into proximity to, an external object or a user. This allows the haptic device to give the external object or the user a feel that the constituent element to be rotated has rotated.

In the embodiments described above, the respective magnetic yokes 710 and 711 have the shape of an arc, of which the center is defined by the center 510 of rotation. However, this is only an example and should not be construed as limiting. Rather, at least a surface, facing the curved face (surface 625) of an associated one of the first driving magnets 620, of each magnetic yoke 710 needs to be a curved face in the shape of an arc, of which the center is defined by the center 510, and the center of the arc of that curved face (surface 625) needs to agree with the center of the arc of the curved face of the first driving magnet 620. Likewise, at least a surface, facing the curved face (surface 626) of an associated one of the second driving magnets 621, of each magnetic yoke 711 needs to be a curved face in the shape of an arc, of which the center is defined by the center 510, and the center of the arc of that curved face (surface 626) needs to agree with the center of the arc of the curved face of the second driving magnet 621.

Furthermore, in the embodiments described above, the plurality of cables is grouped into four bundles of cables 11A. However, this is only an example and should not be construed as limiting. Alternatively, the plurality of cables may be grouped into at least two bundles of cables 11A. The at least two bundles of cables 11A may be drawn out of the movable unit 60 and arranged at equal intervals on the circumference of a circle, of which the center is defined by the center of rotation.

Furthermore, in the embodiments described above, a combination of the four magnetic sensors 92 and the position detecting magnet 650 is used as a detecting unit 100 for detecting the rotation around the axis 1$b$ and the rotation around the axis 1$c$. However, this is only an example and should not be construed as limiting. Alternatively, the rotation around the axis 1$b$ and the rotation around the axis 1$c$ may also be detected by a detecting unit 100 implemented as either a gyro sensor or a combination of a gyro sensor and an acceleration sensor. When either a gyro sensor or a combination of a gyro sensor and an acceleration sensor is used as the detecting unit 100, the detecting unit is provided for the movable unit 60, not for the printed circuit board 90. When the combination of the four magnetic sensors 92 and the position detecting magnet 650 is used as the detecting unit 100, the detecting unit 100 is provided opposite from the camera unit 30 with respect to the plane including the axes 1$b$ and Sc. On the other hand, when either a gyro sensor or a combination of a gyro sensor and an acceleration sensor is used as the detecting unit 100, the detecting unit 100 may be provided opposite from, or on the same side as, the camera unit 30 with respect to the plane including the axes 1$b$ and 1$c$.

Furthermore, in the embodiments described above, the second loosely fitting member 501 is secured onto the fixed unit 70, the first loosely fitting face 670 is provided for the movable unit 60, and the second loosely fitting member 501 with the second loosely fitting face 502 is provided for the fixed unit 70. However, this is only an example and should not be construed as limiting. Alternatively, the second loosely fitting member 501 may be secured to the first loosely fitting member 602 of the movable unit 60. In that case, the first loosely fitting face 670 of the movable unit 60 becomes a raised spherical surface and the second loosely fitting face 502 of the fixed unit 70 comes to have a recess. Then, when the second loosely fitting face 502 has a recess, the recess of the second loosely fitting face 502 corresponds to a center portion (recess) of the coupling member 50 of the fixed unit 70.

(Essentials)

As can be seen from the foregoing description, an actuator (such as a camera driver 10) according to a first aspect includes a movable unit 60, a fixed unit 70, and a driving unit 700. The movable unit 60 holds an object to be driven thereon. The fixed unit 70 has a second loosely fitting face 502 to be fitted into a first loosely fitting face 670 of the movable unit 60. The driving unit 700 makes the movable unit 60 electromagnetically drivable and rotatable with respect to the fixed unit 70. One of the first loosely fitting face 670 or the second loosely fitting face 502 has a recess, and the other has a raised spherical face. A center 510 of rotation of the movable unit 60 is located on a fitting direction in which the raised spherical face is fitted into the recess. The driving unit 700 includes a pair of first driving magnets 620, a pair of first magnetic yokes (magnetic yokes 710), a pair of first drive coils (drive coils 720), a pair of second driving magnets 621, a pair of second magnetic yokes (magnetic yokes 711), and a pair of second drive coils (drive coils 721). The pair of first driving magnets 620 is provided for the movable unit 60 on a first plane including a first axis (axis 1$c$) and the fitting direction. The first axis is perpendicular to the fitting direction and passes through the center 510. The pair of first magnetic yokes faces the pair of first driving magnets 620 and is provided for the fixed unit 70 such that a distance from the first magnetic yokes to the center 510 is longer than a distance from the first driving magnets 620 to the center 510. The pair of first drive coils is wound around the pair of first magnetic yokes. The pair of second driving magnets 621 is provided for the movable unit 60 on a plane including a second axis (axis 1$b$) and the fitting direction. The second axis is perpendicular to the fitting direction and the first axis and passes through the center. The pair of second magnetic yokes faces the pair of second driving magnets and is provided for the fixed unit 70 such that a distance from the second magnetic yokes to the center 510 is longer than a distance from the second driving magnets 621 to the center 510. The pair of second drive coils is wound around the pair of second magnetic yokes. When the movable unit 60 is in a neutral position in which the movable unit 60 has rotated around neither the first axis nor the second axis, a first synthetic vector, defined by synthesizing together two first vectors, pointing toward the first magnetic yokes, of magnetic attraction forces F1 between the pair of first driving magnets 620 and the pair of first magnetic yokes, (i.e., magnetic attraction force F2) is directed toward the object to be driven with respect to a second plane including the first axis and the second axis. Furthermore, a second synthetic vector, defined by synthesizing together two second vectors, pointing toward the second magnetic yokes, of the magnetic attraction forces F1 between the pair of second driving magnets 621 and the pair of second magnetic yokes, is directed toward the object to be driven with respect to the second plane.

According to this configuration, when the movable unit 60 is in the neutral position, the first synthetic vector is directed toward the object to be driven with respect to the second plane. Likewise, when the movable unit 60 is in the neutral position, the second synthetic vector is also directed toward the object to be driven with respect to the second plane.

In a camera driver serving as a conventional actuator, each driving magnet is located opposite from the object to be driven with respect to the second plane. That is to say, the central position of the driving magnet is located more distant from the object to be driven with respect to the center of rotation. Providing a driving magnet for such a conventional actuator requires leaving a space to house a portion of the actuator ranging from at least the driving magnet through one end, located farther away from the object to be driven than the other end, of the driving magnet. That is to say, the length of such an actuator as measured in a direction perpendicular to the first and second axes (hereinafter referred to as a "perpendicular direction") includes the length of the object to be driven in the perpendicular direction and the length of the space in the perpendicular direction.

In contrast, in the actuator according to the first aspect, the first synthetic vector and the second synthetic vector are generated as described above on the same side as the object to be driven with respect to the second plane. That is to say, the central position of the driving magnet is located closer to the object to be driven with respect to the center of rotation. Providing driving magnets (including the first driving magnets 620 and the second driving magnets 621) for the actuator according to the first aspect will make a smaller number of portions of the driving magnets more distant from the object to be driven with respect to the center 510 of rotation, compared to the conventional actuator. This shortens the length of the actuator in the perpendicular direction compared to the conventional actuator. In other words, this configuration contributes to downsizing (reducing the height, in particular).

An actuator according to a second aspect, which may be implemented in conjunction with the first aspect, further includes a detecting unit 100. The detecting unit 100 includes a position detecting magnet 650 and a magnetic sensor 92, and is provided opposite from the object to be driven with respect to the second plane. The position detecting magnet 650 is held by the movable unit 60. The magnetic sensor 92 detects rotation of the movable unit 60 based on a variation in magnetism caused by allowing the position detecting magnet 650 to rotate as the movable unit 60 rotates.

According to this configuration, when the movable unit 60 is in the neutral position, the magnetic attraction force F2 as the first synthetic vector is generated on the opposite side from the detecting unit 100 with respect to a plane including the axis 1b and the axis 1c. In addition, when the movable unit 60 is in the neutral position, the magnetic attraction force F2 as the second synthetic vector is also generated on the opposite side from the detecting unit 100 with respect to the plane including the axis 1b and the axis 1c. Thus, compared to a situation where the magnetic attraction force F2 as the synthetic vector is generated on the same side as the detecting unit 100 with respect to the plane including the axis 1b and the axis 1c, the effect of the magnetic forces of the pair of first driving magnets 620 and the magnetic forces of the pair of second driving magnets 621 on the detecting unit 100 is less significant. This allows the actuator to more accurately detect the angle of rotation of the object to be driven that has rotated.

In an actuator according to a third aspect, which may be implemented in conjunction with the first or second aspect, in a range where the movable unit 60 is rotatable around both of the first axis and the second axis, the first synthetic vector and the second synthetic vector are both directed toward the object to be driven with respect to the second plane.

According to this configuration, even if the movable unit 60 has rotated, the effect of the magnetic forces of the pair of first driving magnets 620 and the magnetic forces of the pair of second driving magnets 621 on the detecting unit 100 is insignificant. This allows the actuator to more accurately detect, even if the movable unit 60 has rotated, the angle of rotation of the object to be driven that has rotated.

In an actuator according to a fourth aspect, which may be implemented in conjunction with any one of the first to third aspects, when the movable unit 60 is in the neutral position, respective directions of the two first vectors and respective directions of the two second vectors are tilted with respect to the second plane.

This configuration allows the actuator to more accurately detect the angle of rotation of the object to be driven (e.g., the camera unit 30) that has rotated.

In an actuator according to a fifth aspect, which may be implemented in conjunction with any one of the first to fourth aspects, each of respective faces of the pair of first driving magnets 620 and the pair of first magnetic yokes that face each other is an arc-shaped curved face with a center of arc defined by the center 510 of rotation, and each of respective faces of the pair of second driving magnets 621 and the pair of second magnetic yokes that face each other is an arc-shaped curved face with a center of arc defined by the center 510 of rotation.

This configuration makes the gap between an associated pair of first driving magnet 620 and first magnetic yoke and the gap between an associated pair of second driving magnet 621 and second magnetic yoke both constant. This allows, even if the movable unit 60 has rotated, the respective gaps to be kept constant.

In an actuator according to a sixth aspect, which may be implemented in conjunction with any one of the first to fifth aspects, the fixed unit 70 includes a stopper member 80 configured to prevent the movable unit 60 from falling off. The stopper member 80 is provided opposite from the object to be driven with respect to the second plane. This configuration substantially prevents the movable unit 60 from falling off.

In an actuator according to a seventh aspect, which may be implemented in conjunction with the sixth aspect, the stopper member 80 is non-magnetic. This configuration allows the detecting unit 100 to detect, even if the stopper member 80 is provided between the position detecting magnet 650 and the magnetic sensor 92, the rotation of the movable unit 60 accurately.

In an actuator according to an eighth aspect, which may be implemented in conjunction with any one of the first to seventh aspects, the movable unit 60 includes a body 601 provided with a plurality of arms to mount the pair of first driving magnets 620 and the pair of second driving magnets 621 thereon, and the body 601 includes a counterweight (bottom plate 640) opposite from the object to be driven with respect to the second plane.

This configuration allows the actuator to bring the center 510 of rotation into agreement with the center of gravity of the movable unit 60. This reduces the moment of rotation of the movable unit 60 around the axis $1b$ and the moment of rotation of the movable unit 60 around the axis $1c$, thus allowing the movable unit 60 to maintain the neutral position, or rotate around the axes $1b$ and $1c$, with less driving force. This reduces the power consumption of the actuator.

In an actuator according to a ninth aspect, which may be implemented in conjunction with the eighth aspect, the counterweight is non-magnetic. This configuration allows the detecting unit 100 to accurately detect the rotation of the movable unit 60 without being affected by the bottom plate 640.

In an actuator according to a tenth aspect, which may be implemented in conjunction with any one of the first to ninth aspects, a third drive coil (drive coils 730 and 731) configured to rotate the movable unit 60 around the fitting direction is wound around each of the pair of first magnetic yokes and each of the pair of second magnetic yokes. This configuration allows the actuator to electromagnetically drive (i.e., roll) the movable unit 60 (e.g., the camera unit 30) in rotation around the fitting direction (i.e., around the optical axis $1a$).

In an actuator according to an eleventh aspect, which may be implemented in conjunction with any one of the first to tenth aspects, the object to be driven includes an optical element. This configuration allows the actuator to more accurately detect the angle of rotation of the object to be driven, including an optical element, which has rotated.

In an actuator according to a twelfth aspect, which may be implemented in conjunction with any one of the first to eleventh aspects, the object to be driven is a camera unit 30 including a lens and a photodetector. The actuator according to this aspect further includes a plurality of cables 11, each having a first end thereof electrically connected to the camera unit 30 and a second end thereof electrically connected to an external circuit (such as an image processor circuit 15). The plurality of cables 11 is grouped into at least two bundles of cables 11A. Each of the at least two bundles of cables 11A includes a flexible portion (flexible portions 110-113) between the first end and the second end. The respective flexible portions of the at least two bundles of cables 11A are arranged at equal intervals around a circumference of a circle, of which the center is defined by the center 510 of rotation of the movable unit 60. The respective flexible portions of the at least two bundles of cables 11A have an equal length.

This configuration allows the actuator to stabilize the orientation of the camera unit 30 when the movable unit 60 is in the neutral position. This also allows the camera driver 10 to uniformly distribute the tension applied to the movable unit 60 from each bundle of cables 11A.

In an actuator according to a thirteenth aspect, which may be implemented in conjunction with the twelfth aspect, each of the at least two bundles of cables 11A is made up of two or more cables 11. Each of the at least two bundles of cables 11A is provided with a first clamp 120 and a second clamp 130. The first clamp 120 binds the bundle of cables 11A at one end of the flexible portion of the bundle of cables 11A and is secured to the movable unit 60. The second clamp 130 binds the bundle of cables at the other end of the flexible portion and is secured to the fixed unit 70. Between the first clamp 120 and the second clamp 130 of each of the at least two bundles of cables 11A, the two or more cables 11 that form the bundle of cables 11A are separate from each other.

This configuration allows the actuator to reduce the chances of the cables being twisted by the rotation of the camera unit 30.

In an actuator according to a fourteenth aspect, which may be implemented in conjunction with the thirteenth aspect, in the at least two bundles of cables 11A, the flexible portion is provided outside of the movable unit 60 and the fixed unit 70 and bent.

This configuration allows the actuator to decrease the curvature of the bent of the flexible portion and thereby reduce the tension applied from each bundle of cables to the movable unit 60. This enables the camera driver 10 to rotate the camera unit 30 more smoothly.

In an actuator according to a fifteenth aspect, which may be implemented in conjunction with the fourteenth aspect, the fixed unit 70 includes at least two ribs (inlet portions 703) configured to respectively hold the second clamps 130 of the at least two bundles of cables 11A. The at least two ribs are tilted toward a direction in which the camera unit 30 is arranged with respect to a plane intersecting at right angles with an optical axis $1a$ of the camera unit 30 when the movable unit 60 is in the neutral position. This configuration allows the actuator to hold the flexible portions 110-113 in a bent state.

In an actuator according to a sixteenth aspect, which may be implemented in conjunction with the fifteenth aspect, the second clamp 130 provided for each of the at least two bundles of cables includes a movement regulating portion 131 configured to regulate movement of the bundle of cables 11A in inserting and removing directions with respect to the fixed unit 70 by abutting on the ribs. This configuration allows the actuator to reduce the chances of the second clamp 130 being dislocated.

In an actuator according to a seventeenth aspect, which may be implemented in conjunction with any one of the thirteenth to sixteenth aspects, the movable unit 60 includes an outer peripheral guide portion 403. The outer peripheral guide portion 403 is configured to guide, along an outer periphery of the movable unit 60, a part of a portion, running from the first end through the first clamp 120, of one or more bundles of cables 11A among the at least two bundles of cables 11A. This configuration allows the actuator to iron out the difference in the length of that portion of the bundles of cables from the first end through the first clamp 120 while reducing the deterioration in the quality of an electrical signal due to bending the bundle of cables.

A coil unit (which may be one of a first coil unit 52 or a second coil unit 53) according to an eighteenth aspect includes a coil bobbin (which may be one of a coil bobbin 780 or a coil bobbin 781) and a coil (which may be one of a drive coil 720 or a drive coil 721). The coil bobbin has a first curved face (which may be a first curved face 782 or a first curved face 783) and a second curved face (which may be a second curved face 784 or a second curved face 785), which are curved in an arc direction and which face each other. The coil is wound around the coil bobbin in the arc direction. The coil on the first curved face has the same pitch as the coil on the second curved face.

This configuration eliminates the need of ensuring a broad pitch width at both ends of the coil bobbin, because the coil on the first curved face has the same pitch as the coil on the second curved face. Thus, even if the length of the coil unit in the winding direction 1g is shorter than in a conventional coil unit, the number of coil turns may still be as large as that of the conventional coil unit. This enables an actuator including such a coil unit to have a reduced size (e.g., a reduced height, in particular).

In a coil unit according to a nineteenth aspect, which may be implemented in conjunction with the eighteenth aspect, the first curved face and the second curved face have a plurality of grooves (which may be grooves 920 and 922 or 921 and 923). Alternatively, both edges (which may be edges 960 and 962 or 961 and 963), perpendicular to a winding direction of the coil, of the first curved face and both edges (which may be edges 964 and 966 or 965 and 967), perpendicular to the winding direction of the coil, of the second curved face have a plurality of grooves (which may be grooves 920 and 922 or 921 and 923).

This configuration allows a coil wire, forming the coil, to be wound around the coil bobbin along the grooves. This reduces the chances of the coil wire being dislocated in the arc direction on the first curved face and the second curved face.

In a coil unit according to a twentieth aspect, which may be implemented in conjunction with the nineteenth aspect, the first curved face and the second curved face have the plurality of grooves formed thereon by continuously providing, in the arc direction, a plurality of projections, each of which is defined by a first plane parallel to the winding direction of the coil and a second plane perpendicular to the winding direction. Alternatively, both edges of the first curved face and both edges of the second curved face have the plurality of grooves formed thereon by continuously providing, in the arc direction, a plurality of projections, each of which is defined by a first plane parallel to the winding direction of the coil and a second plane perpendicular to the winding direction. In this case, the first plane corresponds to planes 910, 911, 914, and 915, and the second plane corresponds to planes 912, 913, 916, and 917. The projections correspond to a first projection 900 (901) and a second projection 902 (903).

According to this configuration, when the coil wire of the coil comes into contact with the first plane, the force of movement in the arc direction is less than in a situation where the coil wire comes into contact with a curved face. This reduces the chances of the coil wire of the coil being dislocated from the grooves.

An actuator (camera driver 10) according to a twenty-first aspect includes: the coil unit according to the nineteenth or twentieth aspect; and a driving magnet (which may be a first driving magnet 620 or a second driving magnet 621) facing the first curved face and configured to be electromagnetically driven in rotation with respect to the coil unit around an axis of rotation so as to define a circle, of which the circumference is the arc direction.

This configuration contributes to downsizing (in particular, reducing the height of) an actuator including such a coil unit.

REFERENCE SIGNS LIST

10 Camera Driver (Actuator)
11 Cable
11A Bundle of Cables
30 Camera Unit
52 First Coil Unit (Coil Unit)
53 Second Coil Unit (Coil Unit)
60 Movable unit
70 Fixed Unit
80 Stopper Member
92 (92a, 92b, 92c, 92d) Magnetic Sensor
100 Detecting Unit
110-113 Flexible Portion
120 First Clamp
130 Second Clamp
131 Movement Regulating Portion
401 Outlet portion (Guide Portion)
403 Outer Peripheral Guide Portion
510 Center
601 Body
620 First Driving Magnet
621 Second Driving Magnet
640 Bottom Plate (Counterweight)
650 Position Detecting Magnet
700 Driving Unit
703 Inlet portion (Rib)
710 Magnetic Yoke (First Magnetic Yoke)
711 Magnetic Yoke (Second Magnetic Yoke)
720 Drive Coil (First Drive Coil, Coil)
721 Drive Coil (Second Drive Coil, Coil)
730, 731 Drive Coil (Third Drive Coil)
740, 741, 750, 751 Magnetic Yoke Holder
780, 781 Coil Bobbin
780, 781 Coil Bobbin
782, 783 First Curved Face
784, 785 Second Curved Face
900, 901 First Projection
902, 903 Second Projection
910, 911, 914, 915 Plane (First Plane)
912, 913, 916, 917 Plane (Second Plane)
920, 921, 922, 923, 940, 941, 942, 943, 945, 946, 947, 948 Groove
960, 961, 962, 963, 964, 965, 966, 967 Edge
1b Axis (Second Axis, Axis of Rotation)
1c Axis (First Axis, Axis of Rotation)
1g Winding Direction
F1, F2 Magnetic Attraction Force

The invention claimed is:
1. An actuator comprising:
a movable unit configured to hold an object to be driven thereon;
a fixed unit having a second loosely fitting face to be fitted into a first loosely fitting face of the movable unit; and
a driving unit configured to make the movable unit electromagnetically drivable and rotatable with respect to the fixed unit,
one of the first loosely fitting face or the second loosely fitting face having a recess, the other of the first loosely fitting face or the second loosely fitting face having a raised spherical face, a center of rotation of the movable unit being located on a fitting direction in which the raised spherical face is fitted into the recess, the driving unit including:

a pair of first driving magnets provided for the movable unit on a first plane including a first axis and the fitting direction, the first axis being perpendicular to the fitting direction and passing through the center;

a pair of first magnetic yokes facing the pair of first driving magnets and provided for the fixed unit such that a distance from the first magnetic yokes to the center is longer than a distance from the first driving magnets to the center;

a pair of first drive coils wound around the pair of first magnetic yokes;

a pair of second driving magnets provided for the movable unit on a plane including a second axis and the fitting direction, the second axis being perpendicular to the fitting direction and the first axis and passing through the center;

a pair of second magnetic yokes facing the pair of second driving magnets and provided for the fixed unit such that a distance from the second magnetic yokes to the center is longer than a distance from the second driving magnets to the center; and a pair of second drive coils wound around the pair of second magnetic yokes, when the movable unit is in a neutral position in which the movable unit has rotated around neither the first axis nor the second axis, a first synthetic vector and a second synthetic vector being directed toward the object to be driven with respect to a second plane including the first axis and the second axis, the first synthetic vector being defined by synthesizing together two first vectors, pointing toward the first magnetic yokes, of magnetic attraction forces between the pair of first driving magnets and the pair of first magnetic yokes, the second synthetic vector being defined by synthesizing together two second vectors, pointing toward the second magnetic yokes, of magnetic attraction forces between the pair of second driving magnets and the pair of second magnetic yokes.

2. The actuator of claim 1, further comprising a detecting unit including:

a position detecting magnet held by the movable unit; and a magnetic sensor configured to detect rotation of the movable unit based on a variation in magnetism caused by allowing the position detecting magnet to rotate as the movable unit rotates, the detecting unit being provided opposite from the object to be driven with respect to the second plane.

3. The actuator of claim 1, wherein in a range where the movable unit is rotatable around both of the first axis and the second axis, the first synthetic vector and the second synthetic vector are both directed toward the object to be driven with respect to the second plane.

4. The actuator of claim 1, wherein when the movable unit is in the neutral position, respective directions of the two first vectors and respective directions of the two second vectors are tilted with respect to the second plane.

5. The actuator of claim 1, wherein each of respective faces of the pair of first driving magnets and the pair of first magnetic yokes that face each other is an arc-shaped curved face with a center of arc defined by the center of rotation, and each of respective faces of the pair of second driving magnets and the pair of second magnetic yokes that face each other is an arc-shaped curved face with a center of arc defined by the center of rotation.

6. The actuator of claim 1, wherein the fixed unit includes a stopper member configured to prevent the movable unit from falling off, the stopper member being provided opposite from the object to be driven with respect to the second plane.

7. The actuator of claim 6, wherein the stopper member is non-magnetic.

8. The actuator of claim 1, wherein the movable unit includes a body provided with a plurality of aims to mount the pair of first driving magnets and the pair of second driving magnets thereon, and the body includes a counterweight provided opposite from the object to be driven with respect to the second plane.

9. The actuator of claim 8, wherein the counterweight is non-magnetic.

10. The actuator of claim 1, wherein a third drive coil configured to rotate the movable unit around the fitting direction is wound around each of the pair of first magnetic yokes and each of the pair of second magnetic yokes.

11. The actuator of claim 1, wherein the object to be driven includes an optical element.

12. The actuator of claim 1, wherein the object to be driven is a camera unit including a lens and a photodetector, the actuator further includes a plurality of cables, each having a first end thereof electrically connected to the camera unit and a second end thereof electrically connected to an external circuit, the plurality of cables is grouped into at least two bundles of cables, each of the at least two bundles of cables includes a flexible portion between the first end and the second end, the respective flexible portions of the at least two bundles of cables are arranged at equal intervals around a circumference of a circle, of which a center is defined by the center of rotation of the movable unit, and the respective flexible portions of the at least two bundles of cables have an equal length.

13. The actuator of claim 12, wherein each of the at least two bundles of cables is comprised of two or more cables, each of the at least two bundles of cables is provided with a first clamp and a second clamp, the first clamp being configured to bind each said bundle of cables at one end of the flexible portion of the bundle of cables and secured to the movable unit, the second clamp being configured to bind each said bundle of cables at the other end of the flexible portion and secured to the fixed unit, and between the first clamp and the second clamp of each of the at least two bundles of cables, the two or more cables that form each said bundle of cables are separate from each other.

14. The actuator of claim 13, wherein in the at least two bundles of cables, the flexible portion is provided outside of the movable unit and the fixed unit and bent.

15. The actuator of claim 14, wherein the fixed unit includes at least two ribs configured to respectively hold the second clamps of the at least two bundles of cables, and the at least two ribs are tilted toward a direction in which the camera unit is arranged with respect to a plane intersecting at right angles with an optical axis of the camera unit when the movable unit is in the neutral position.

16. The actuator of claim 15, wherein
in each of the at least two bundles of cables, the second clamp provided for each said bundle of cables includes a movement regulating portion configured to regulate movement of each said bundle of cables in inserting and removing directions with respect to the fixed unit by abutting on the ribs.

17. The actuator of claim 13, wherein
the movable unit includes an outer peripheral guide portion configured to guide, along an outer periphery of the movable unit, a part of a portion, running from the first end through the first clamp, of one or more of the at least two bundles of cables.

18. A coil unit comprising:
a coil bobbin having a first curved face and a second curved face, which are curved in an arc direction and which face each other; and
a coil wound around the coil bobbin in the arc direction,
the coil on the first curved face having the same pitch as the coil on the second curved face.

19. The coil unit of claim 18, wherein
either the first curved face and the second curved face or both edges, perpendicular to a winding direction of the coil, of the first curved face and both edges, perpendicular to the winding direction of the coil, of the second curved face have a plurality of grooves.

20. The coil unit of claim 19, wherein
either the first curved face and the second curved face, or both edges of the first curved face and both edges of the second curved face, have the plurality of grooves formed thereon by continuously providing, in the arc direction, a plurality of projections, each of the projections being defined by a first plane parallel to the winding direction of the coil and a second plane perpendicular to the winding direction.

21. An actuator comprising:
the coil unit of claim 19; and
a driving magnet facing the first curved face and configured to be electromagnetically driven in rotation with respect to the coil unit around an axis of rotation so as to define a circle, of which a circumference is the arc direction.

* * * * *